United States Patent
Ishibiki et al.

(10) Patent No.: US 10,162,247 B2
(45) Date of Patent: Dec. 25, 2018

(54) SHUTTER DEVICE AND IMAGE CAPTURING APPARATUS

(71) Applicant: CANON KABUSHIKI KAISHA, Tokyo (JP)

(72) Inventors: Jumpei Ishibiki, Kawasaki (JP); Hironori Imai, Funabashi (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/890,756

(22) Filed: Feb. 7, 2018

(65) Prior Publication Data
US 2018/0224713 A1 Aug. 9, 2018

(30) Foreign Application Priority Data
Feb. 8, 2017 (JP) .................... 2017-020827

(51) Int. Cl.
*G03B 9/22* (2006.01)
*G03B 9/42* (2006.01)

(52) U.S. Cl.
CPC . *G03B 9/22* (2013.01); *G03B 9/42* (2013.01)

(58) Field of Classification Search
None
See application file for complete search history.

(56) References Cited

U.S. PATENT DOCUMENTS

| | | | | |
|---|---|---|---|---|
| 2014/0270748 A1* | 9/2014 | Sakai | ........................ | G03B 9/36 396/447 |
| 2015/0131986 A1* | 5/2015 | Aoshima | ................... | G03B 9/40 396/463 |
| 2018/0004066 A1* | 1/2018 | Nakano | ..................... | G03B 9/14 |
| 2018/0136543 A1* | 5/2018 | Sakai | ......................... | G03B 9/64 |
| 2018/0196333 A1* | 7/2018 | Takayama | ................ | G03B 9/36 |
| 2018/0224713 A1* | 8/2018 | Ishibiki | .................... | G03B 9/22 |

FOREIGN PATENT DOCUMENTS

| | | |
|---|---|---|
| JP | S60-208739 A | 10/1985 |
| JP | H07-56211 A | 3/1995 |

* cited by examiner

*Primary Examiner* — William B Perkey
(74) *Attorney, Agent, or Firm* — Carter, DeLuca, Farrell & Schmidt LLP

(57) ABSTRACT

A shutter device (113, 113a) includes a shutter plate (1) where an opening is formed, a light shielding member (2, 3) movable reciprocally between a closed state where the opening is closed and an open state where the opening is open, a motor (19), a drive member (11, 12, 111, 112) including a cam engaging portion (11b, 12b, 111b, 112b), rotatable in conjunction with the light shielding member, and a cam member (15-1, 15-2, 114, 115) that is to be driven by the motor to rotate, the cam member engages with the cam engaging portion, and includes a first cam surface (15ic, 114i, 115g) and a second cam surface (15hc, 114g, 115i), the first cam surface drives the drive member to move the light shielding member to the closed state, the second cam surface drives the drive member to move it to the open state.

9 Claims, 36 Drawing Sheets

SHUTTER DEVICE AND IMAGE CAPTURING APPARATUS

BACKGROUND OF THE INVENTION

Field of the Invention

The present invention relates to a shutter device including a cam member.

Description of the Related Art

Conventionally, as a mechanism for driving shutter blades, it is known that a technology of driving the shutter blades by changing an engagement state of a cam member whose diameter from a rotation center in a radial direction is different in each area and a drive member driving the shutter blades. Japanese Patent Laid-open No. H07-56211 discloses a shutter device where a drive ring is rotationally driven using a stepping motor so that a cam portion of the drive ring is engaged with cam follower portions of two shutter blades to drive the two shutter blades. In addition, the shutter device disclosed in Japanese Patent Laid-open No. H07-56211 opens and closes an opening portion by reciprocating motion of the two shutter blades.

However, in the shutter device disclosed in Japanese Patent Laid-Open No. H07-56211, distances from the rotation center of the cam to a contact point between the cam and the cam follower are different from each other in a forward motion and a backward motion. Accordingly, forces of the cam acting on the cam follower in the forward motion and the backward motion are different from each other. As a result, the blade running speed is reduced in the backward motion compared to the forward motion, and thus it is difficult to achieve stable blade running.

SUMMARY OF THE INVENTION

The present invention achieves stable blade running in a forward motion and a backward motion of a cam member.

A shutter device as one aspect of the present invention includes a shutter plate where an opening is formed, a light shielding member movable reciprocally between a closed state where the opening is closed and an open state where the opening is open, a motor, a drive member including a cam engaging portion, rotatable in conjunction with the light shielding member, and a cam member configured to be driven by the motor to rotate, wherein the cam member engages with the cam engaging portion, and includes a first cam surface and a second cam surface, the first cam surface drives the drive member to move the light shielding member to the closed state, the second cam surface drives the drive member to move the light shielding member to the open state, the first cam surface and the second cam surface are formed symmetrically with respect to a straight line extending in a radial direction from a rotation center of the cam member, the motor is rotatable in a first direction and a second direction, and the cam member is configured to drive the drive member on the first cam surface according to rotation of the motor in the first direction and drive the drive member on the second cam surface according to rotation of the motor in the second direction.

Further features of the present invention will become apparent from the following description of exemplary embodiments with reference to the attached drawings.

DESCRIPTION OF THE EMBODIMENTS

Exemplary embodiments of the present invention will be described below with reference to the accompanied drawings.

Embodiment 1

Figure 1:
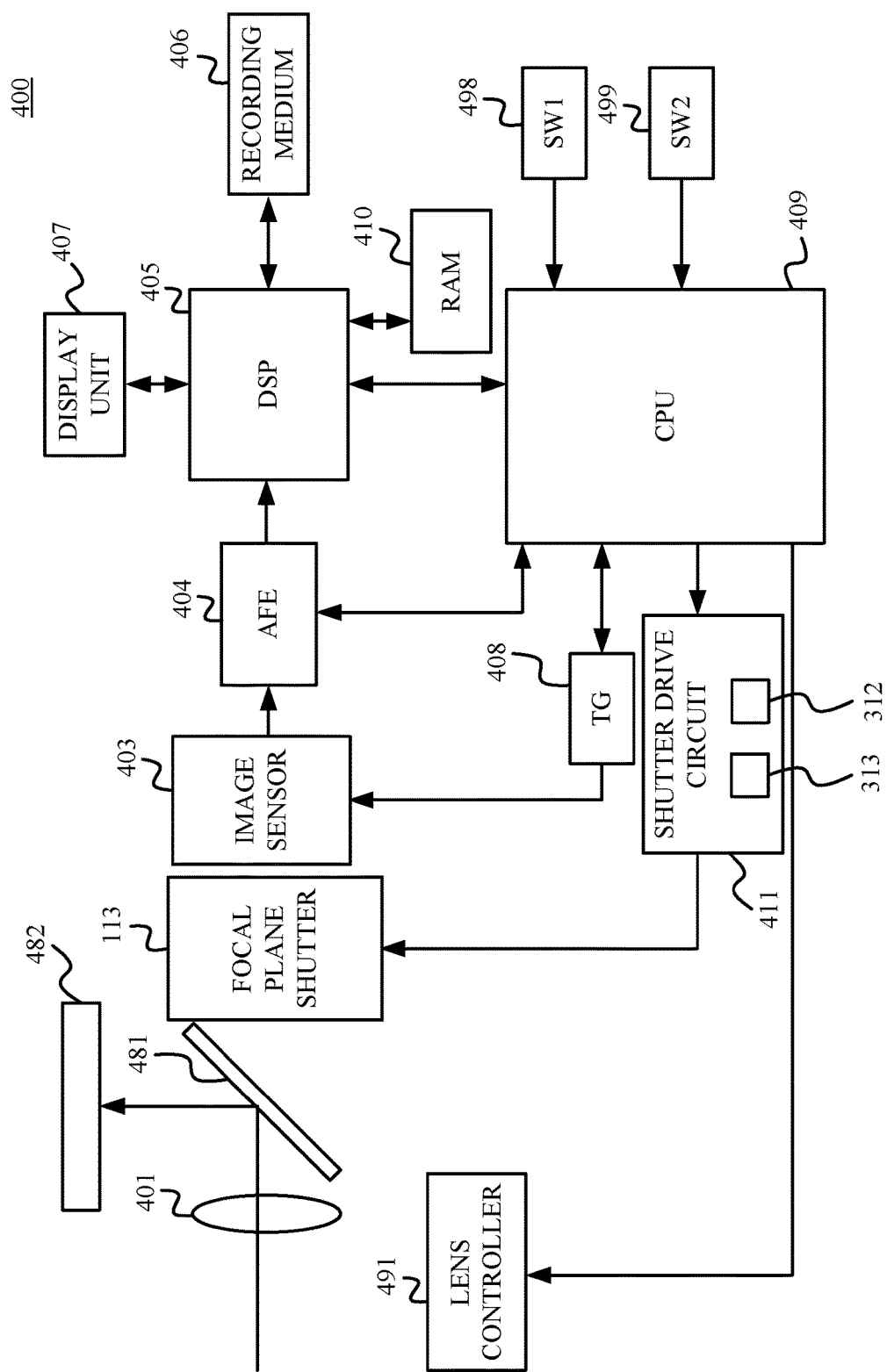
FIG. 1 is a block diagram of an image capturing apparatus in each embodiment.

First, referring to FIG. 1, an image capturing apparatus in Embodiment 1 of the present invention will be described. FIG. 1 is a block diagram of an image capturing apparatus 400. In FIG. 1, reference numeral 401 denotes an image capturing lens (image capturing optical system), reference numeral 113 denotes a focal plane shutter (shutter device), reference numeral 403 denotes an image sensor, reference numeral 481 denotes a mirror member, and reference numeral 482 denotes a finder device. When the image capturing apparatus 400 is in a finder observation state as illustrated in FIG. 1, a part of light beams of object light passing through the image capturing lens 401 is reflected by the mirror member 481 located in a photographing optical path, and is introduced to the finder apparatus 482. As a result, a user can observe an object image via the finder device 482. When the state is moved from the finder observation state to a photographing state or a live view state, the mirror member 481 is retracted from the photographing optical path by a mirror member driving device (not illustrated). As a result, the object light from the image capturing lens 401 is directed to the image sensor 403.

A focal plane shutter 113 is disposed on an object side of the image sensor 403. Reference numeral 411 denotes a shutter drive circuit that drives the focal plane shutter 113. The focal plane shutter 113 has a plurality of blade units (a first blade unit 2 and a second blade unit 3 (see FIG. 1)), and it is driven and controlled by a CPU (controller) 409 via the shutter drive circuit 411. Each of the first blade unit 2 and the second blade unit 3 is a light shielding member that can reciprocate between a closed state and an open state. Further, the focal plane shutter 113 has a motor 19 (see FIG. 1). The motor 19 is rotatable in a first direction (a first rotational direction) and a second direction (a second rotational direction opposite to the first rotational direction), and it rotationally drives cam gears 15-1 and 15-2 according to the direction of rotation of the motor 19. Each of the cam gears 15-1 and 15-2 is a rotating cam member driven by the motor 19. The operation of the motor 19 is controlled by a control circuit 312 and a drive circuit 313 included in the shutter drive circuit 411.

Reference numeral 498 denotes a switch (SW1) for starting photographing preparation, and reference numeral 499 denotes a switch (SW2) for starting photographing. The switch (SW1) 498 and the switch (SW2) 499 are configured as a two-stage switch, and the switch (SW1) 498 is turned on at a first stroke and the switch (SW 2) 499 is turned on at a second stroke.

The image sensor 403 includes a CMOS image sensor or the like, and it photoelectrically converts an object image (optical image) formed via the image capturing lens 401 (image capturing optical system) to output image data (analog image signal). An AFE (Analog Front End) 404 converts the analog image signal output from the image sensor 403 into a digital image signal. A DSP (Discrete Signal Processor) 405 performs various image processing, compression/decompression processing, and the like on the digital image signal output from the AFE 404, and it outputs the processed image data.

A recording medium 406 records the image data processed by the DSP 405. A display unit 407 includes a liquid crystal display (LCD) or the like, and it displays captured images, various menu screens, and the like. The TG 408 is a timing generator, and it drives and controls the image sensor 403. The RAM 410 is connected to the DSP 405, and temporarily stores the image data and the like.

A lens controller 491 outputs lens information such as a focal length, an aperture diameter, an exit pupil diameter, and distance between the exit pupil and the image sensor 403 to the CPU 409. Further, the lens controller 491 drives an aperture stop, a lens, and the like included in the image capturing lens 401 according to control by the (controller) CPU 409. The detection result of each detector included in the lens controller 491 is input to the CPU 409. The CPU 409 controls the AFE 404, the DSP 405, the TG 408, the shutter drive circuit 411, and the lens controller 491.

Figure 2:
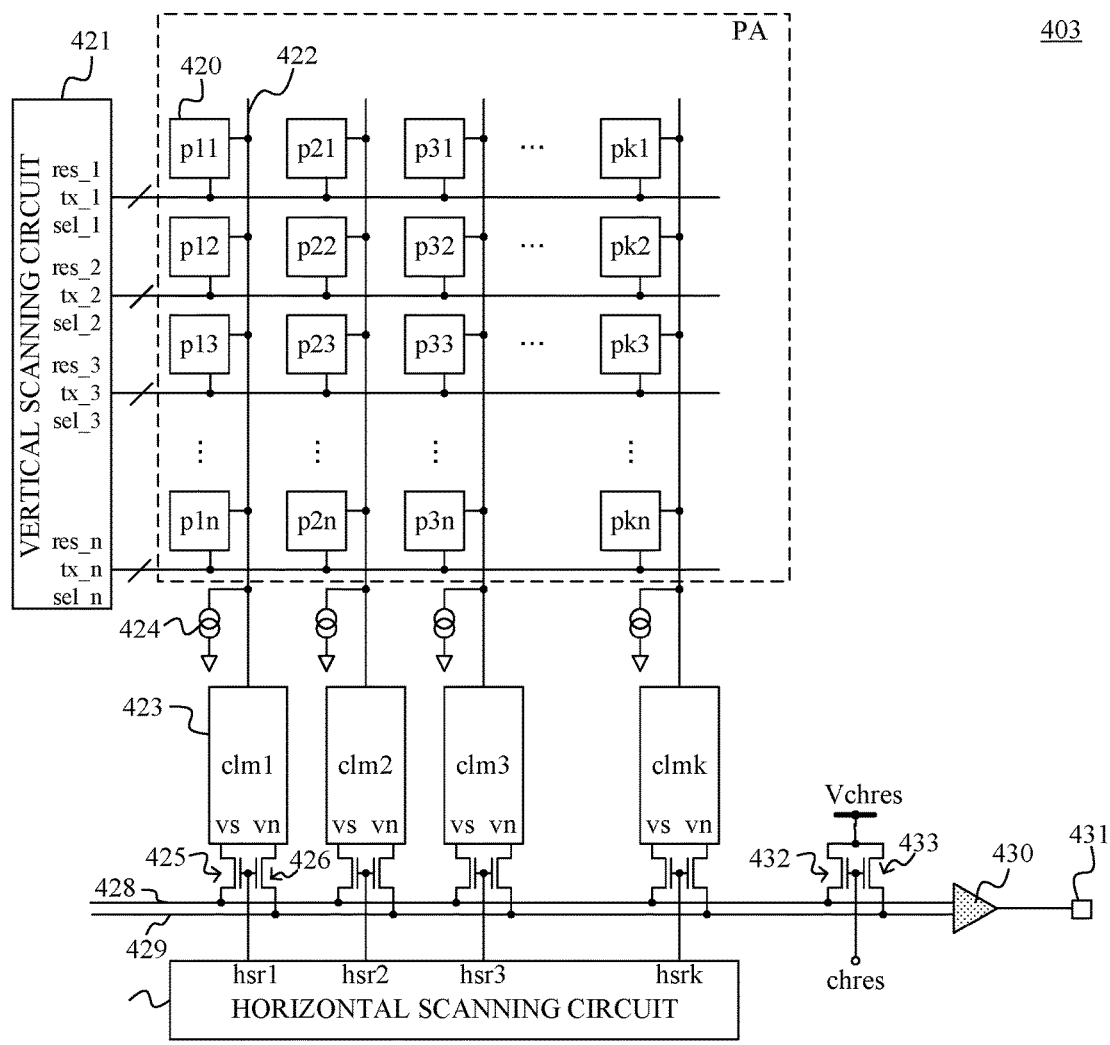
FIG. 2 is an entire configuration diagram of an image sensor in each embodiment.
Figure 3:
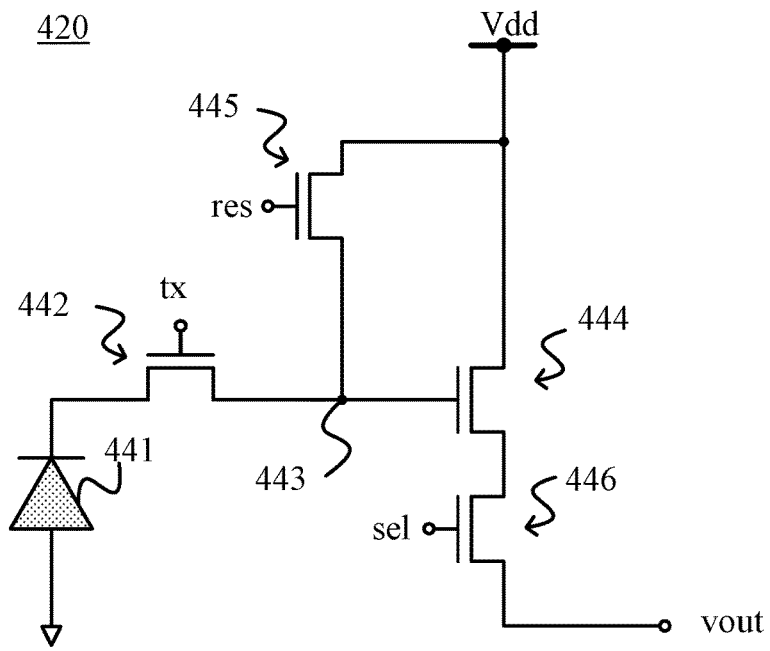
FIG. 3 is a circuit diagram of a pixel portion of the image sensor in each embodiment.

Next, referring to FIGS. 2 and 3, an image capturing operation by the image sensor 403 will be described. FIG. 2 is an overall configuration diagram of the image sensor 403. FIG. 3 is a circuit diagram of one pixel portion 420 of the image sensor 403.

As illustrated in FIG. 2, a plurality of pixel portions 420 (pixel portions p11 to pkn) are arranged in a matrix in a pixel area PA of the image sensor 403. In FIG. 3, a photodiode (PD) 441 photoelectrically converts an incident optical signal and accumulates charges corresponding to an exposure amount. The charges accumulated in the PD 441 is transferred to the FD (floating diffusion) section 443 by setting a signal tx of a transfer gate 442 to a high level. The FD section 443 is connected to a gate of a floating diffusion amplifier (FD amplifier) 444. The FD amplifier 444 converts a charge amount transferred from the PD 441 into a voltage amount.

When a signal res of an FD reset switch 445 is set to a high level, the charges of the FD section 443 is reset. Further, when the charges of the PD 441 is to be reset, by simultaneously setting the signal tx and the signal res to the high level, both of the transfer gate 442 and the FD reset switch 445 are turned on and the PD 441 is reset via the FD section 443. By setting a signal sel of a pixel selection switch 446 to the high level, the pixel signal converted into the voltage by the FD amplifier 444 is output to the output section vout of the pixel portion 420.

In FIG. 2, a vertical scanning circuit 421 supplies driving signals res_1, tx_1, sel_1 and the like to each pixel. These drive signals are connected to res, tx, and sel of each pixel. The output section vout of each pixel is connected to a column common readout circuit 423 (clm1 to clmk) via a vertical output line 422 for each column.

Figure 4:
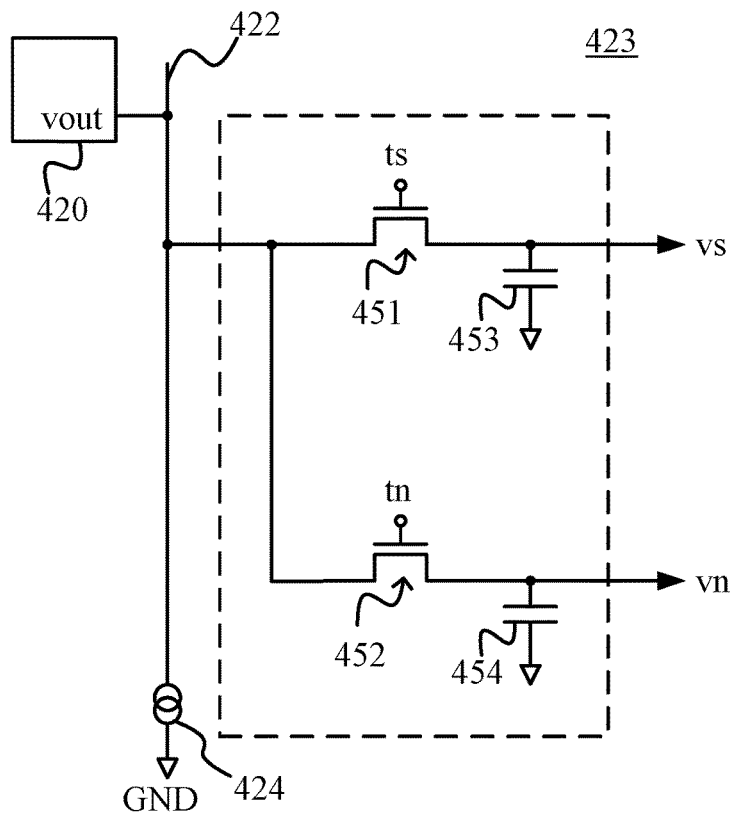
FIG. 4 is a circuit diagram of a column common readout circuit of the image sensor in each embodiment.

Here, referring to FIG. 4, the column common readout circuit 423 will be described. FIG. 4 is a circuit diagram of the column common readout circuit 423 of the image sensor 403. The vertical output line 422 is provided for each column, and the output section vout of the pixel portion 420 for one column is connected to the corresponding vertical output line 422. A current source 424 is connected to the vertical output line 422, and a current follower 424 and the FD amplifier 444 in each pixel of the pixel portion 420 constitute a source follower circuit.

A pixel signal S read from the pixel portion 420 is stored in an S signal holding capacitor 453 via an S signal transfer switch 451 by setting the signal ts to the high level. A noise signal N read from the pixel portion 420 is stored in an N signal holding capacitor 454 via an N signal transfer switch 452 by setting the signal tn to the high level. The S signal holding capacitor 453 and the N signal holding capacitor 454 are connected to the output sections vs and vn of the column common reading circuit 423, respectively.

In FIG. 2, the output sections vs and vn of the column common readout circuit 423 are connected to horizontal transfer switches 425 and 426, respectively. The horizontal transfer switches 425 and 426 are controlled by output signals hsr* ("*" is column numbers 1 to k) of the horizontal scanning circuit 427. As the signal hsr* becomes the high level, the signals of the S signal holding capacitor 453 and the N signal holding capacitor 454 are transferred to horizontal output lines 428 and 429, respectively. The horizontal output lines 428 and 429 are connected to an input section of a differential amplifier 430. The differential amplifier 430 calculates the difference between the S signal and the N signal, and at the same time, it applies a predetermined gain and outputs a final image signal to an output terminal 431. Horizontal output line reset switches 432 and 433 are turned on when a signal chres becomes the high level, and the respective horizontal output lines 428 and 429 are reset to the reset voltage Vchres.

Figure 5:
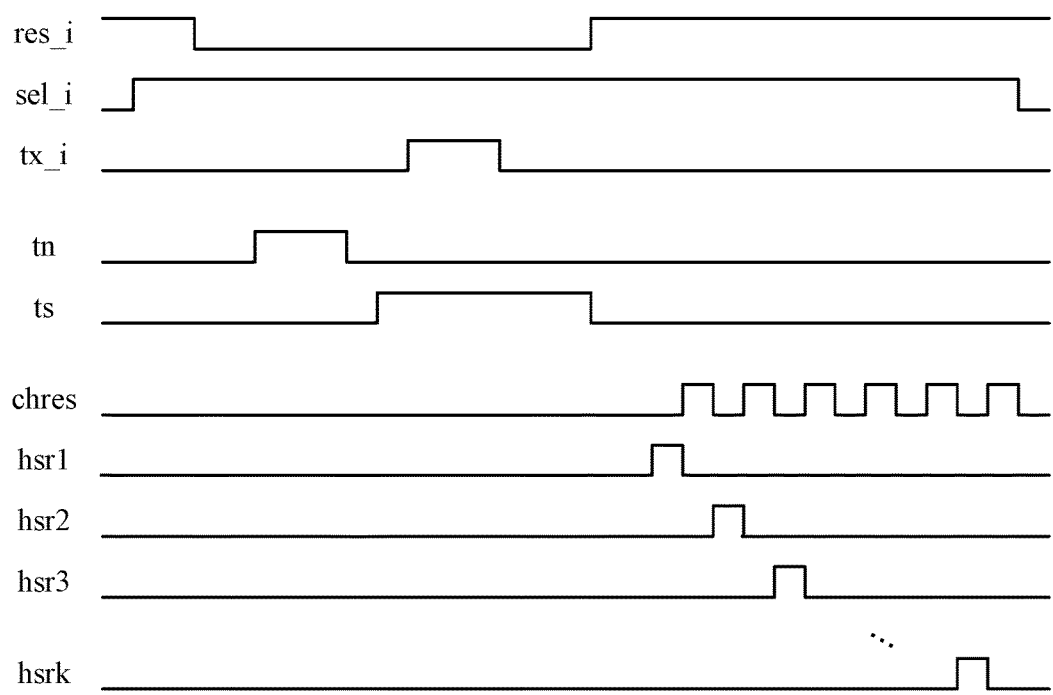
FIG. 5 is a timing chart of illustrating a reset scanning and a still image readout scanning of the image sensor in each embodiment.

Next, referring to FIG. 5, a still image readout scanning of the image sensor 403 will be described. FIG. 5 is a timing chart illustrating the operation per row in reset scanning and still image readout scanning of the image sensor 403. Here, it is assumed that data of an i-th row is read out.

First, the signal sel_i is set to the high level, and the pixel selection switch 446 of the pixel in the i-th row is turned on. Then, the signal res_i is set to the low level, the FD reset switch 445 is turned off, and the reset of the FD unit 443 is released. Next, the signal tn is set to the high level, and the N signal is stored in the N signal holding capacitor 454 via the N signal transfer switch 452. Subsequently, the signal tn is set to the low level, and the N signal transfer switch 452 is turned off, and then the signal ts is set to the high level, the S signal transfer switch 451 is turned on, and the transfer gate 442 is turned on by setting the signal tx_i to the high level. By this operation, the signal accumulated in the selected i-th row PD 441 is output to the vertical output line 422 via the FD amplifier 444 and the pixel selection switch 446, and it is stored in the S signal holding capacitor 453 via the S signal transfer switch 451.

Subsequently, after the signals tx_i and ts are set to the low level to close the transfer gate 442 and the S signal transfer switch 451, the signal res_i is set to the high level to turn on the FD reset switch 445, and the FD section 443 is reset. Thus, the operation of storing the N signal and the S signal of the i-th row in the S signal holding capacitor 453 and the N signal holding capacitor 454 is completed.

Next, an operation of outputting the S signal and the N signal accumulated in the S signal holding capacitor 453 and the N signal holding capacitor 454 from the image sensor 403 is performed. First, when an output hsr1 of the horizontal scanning circuit 427 becomes the high level, the horizontal transfer switches 425 and 426 are turned on, and the signals of the S signal holding capacitor 453 and the N signal holding capacitor 454 are output to the output terminal 431 via the horizontal output lines 428 and 429 and the differential amplifier 430.

The horizontal scanning circuit 427 sequentially sets selected signals hsr1, hsr2, . . . , Hsrk of each column to the high level, thereby outputting all the data of the i-th row. While the signals of the respective columns are read out according to the signals hsr1 to hsrk, by setting the signal chres to the high level, the horizontal output line reset switches 432 and 433 are turned on, and the horizontal output lines 428 and 429 are temporarily reset to the level of the reset voltage Vchres. Thus, the readout operation for one row is completed. By repeating this operation for each row, signals of all the rows of the image sensor 403 are read out.

Figure 6A:
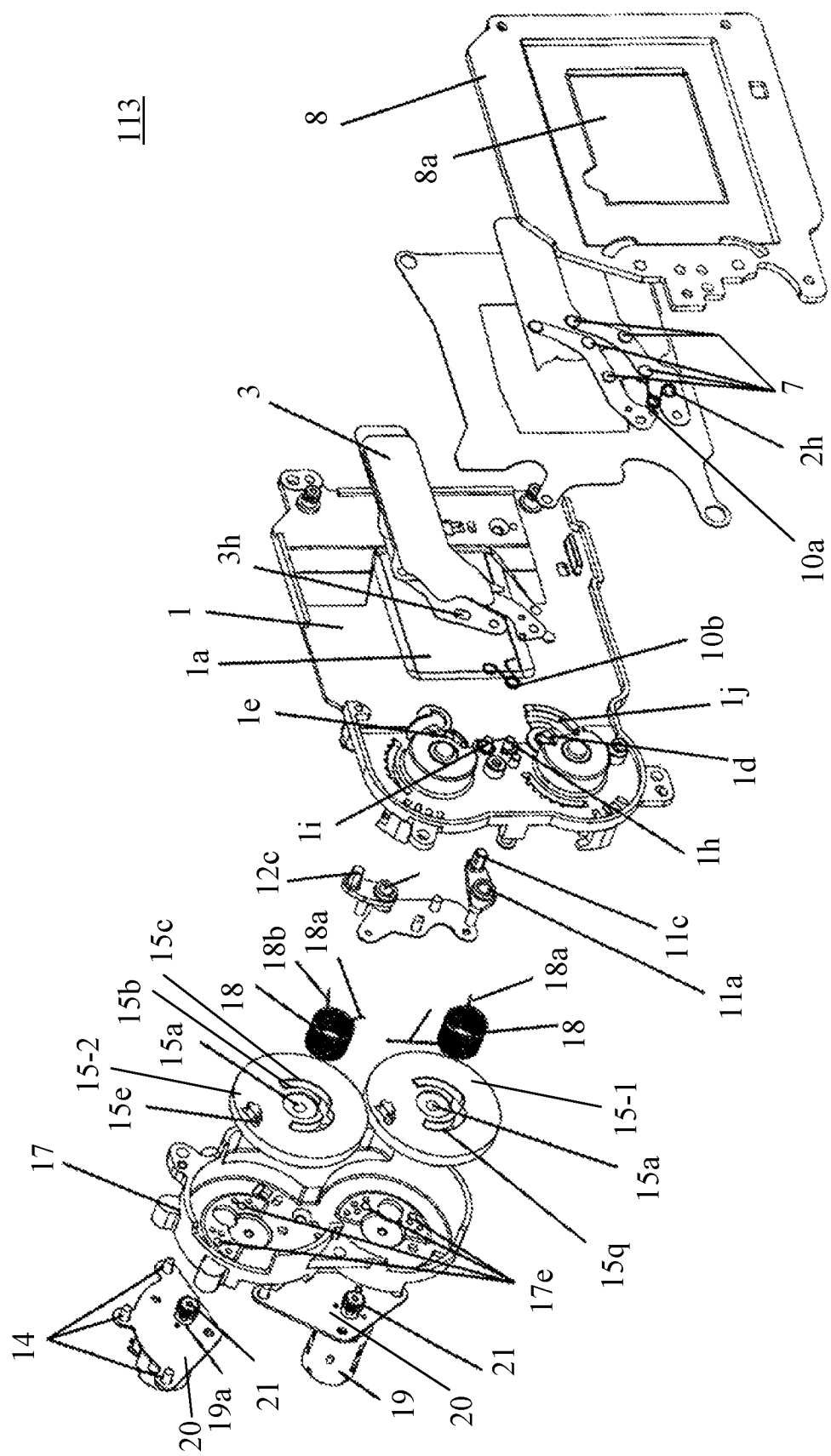
FIG. 6A is an exploded perspective view (seen from an image sensor side) of a focal plane shutter in Embodiment 1.
Figure 6B:
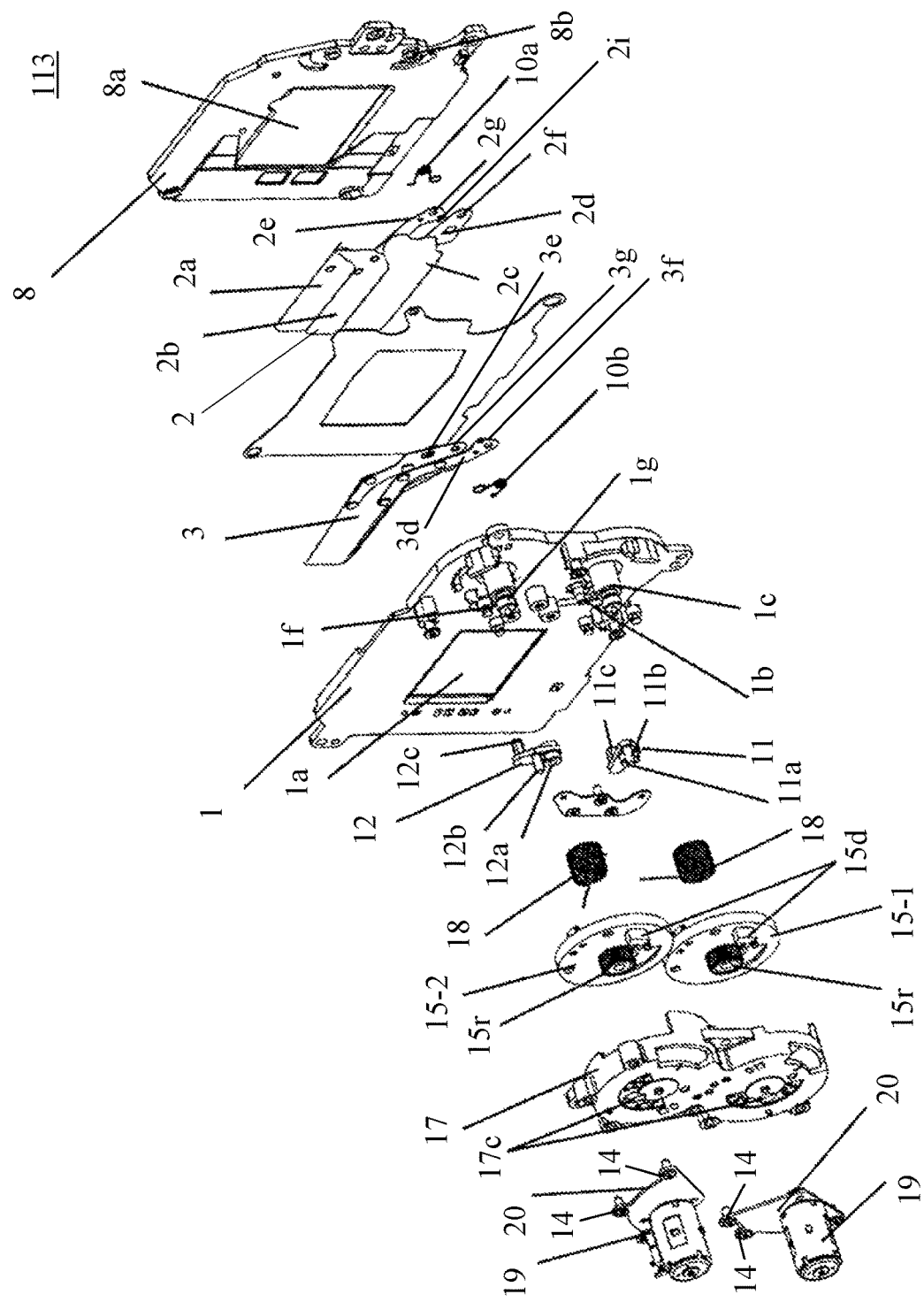
FIG. 6B is an exploded perspective view (seen from an object side) of the focal plane shutter in Embodiment 1.

Next, referring to FIGS. 6A and 6B, the configuration of the focal plane shutter 113 in this embodiment will be described. FIG. 6A is an exploded perspective view of the focal plane shutter 113 when seen from the image sensor 403, and FIG. 6B is an exploded perspective view when seen from the object.

A cover plate 8 is attached to the shutter base plate 1 on the side closer to the image sensor 403. A first blade unit 2 and a second blade unit 3 are provided between the shutter base plate 1 and the cover plate 8. The first blade unit 2 includes blades 2a, 2b, and 2c and blade arms 2d and 2e. The second blade unit 3 includes blades 3a, 3b, and 3c and blade arms 3d and 3e. Apertures 1a and 8a (openings) are formed on the shutter base plate 1 and the cover plate 8, respectively. Shafts 1b, 1c, 1f, and 1g stands on the object side of the shutter base plate 1. A first drive member 11 is rotatably attached to the shaft 1b, a second drive member 12 is rotatably attached to the shaft 1f, a cam gear 15-1 is rotatably attached to the shaft 1c, and a cam gear 15-2 is rotatably attached to the shaft 1g. Shafts 1d, 1e, 1h, and 1i stand on the side closer to the image sensor 403 of the shutter base plate 1, the first blade unit 2 is rotatably attached to the shafts 1d and 1h, and the second blade unit 3 is rotatably attached to the shafts 1e and 1i.

A hole 11a of the first drive member 11 and the shaft 1b of the shutter base plate 1 are fitted, and thus the first drive member 11 is rotatable (rollable). A cam engagement pin 11b (cam engaging portion, or first cam engaging member) of the first drive member 11 slidably is fitted between a cam surface 15b on the side closer to the rotation center of the cam gear 15-1 and a cam surface 15c on the side farther from the rotation center of the cam gear 15-1. With such a configuration, the cam engagement pin 11b drives the first drive member 11 along a cam groove 15q according to the rotation of the cam gear 15-1.

A hole 12a of the second drive member 12 and the shaft 1f of the shutter base plate 1 are fitted, and the second drive member 12 is rotatable (rollable). A cam engagement pin 12b (cam engaging portion, or second cam engaging member) of the second drive member 12 slidably is fitted between a cam surface 15b on the side closer to the rotation center of the cam gear 15-2 and a cam surface 15c on the side farther from the cam surface 15c. With such a configuration, the cam engagement pin 12b drives the second drive member 12 along the cam groove 15q according to the rotation of the cam gear 15-2.

The first blade unit 2 includes two blade arms 2d and 2e and three blades 2a, 2b and 2c. The holes 2f and 2g of the two blade arms 2d and 2e are rotatably pivotally attached to the shafts 1d and 1e on the side closer to the image sensor 403 of the shutter base plate 1, respectively. The three blades 2a, 2b, and 2c are pivotally supported to the other ends of the blade arms 2d and 2e sequentially via a connecting shaft 7. A hole 2h is formed on the blade arm 2d, and the drive pin 11c of the first drive member 11 engages with the hole 2h. With such a configuration, according to the rotation of the first drive member 11, the first blade unit 2 is transferable (reciprocally movable) between a closed state where the blades 2a, 2b, and 2c cover the aperture 1a of the shutter base plate 1 and an open state where they are retracted from the aperture 1a.

The second blade unit 3 includes two blade arms 3d and 3e and three blades 3a, 3b, and 3c. The holes 3f and 3g of the two blade arms 3d and 3e are rotatably pivotally attached to the shafts 1h and 1i on the side closer to the image sensor 403 of the shutter base plate 1, respectively. The three blades 3a, 3b, and 3c are sequentially pivoted to the other ends of the blade arms 3d and 3e via the connecting shaft 7. A hole 3h is formed on the blade arm 3e, and the drive pin 12c of the second drive member 12 engages with the hole 3h. With such a configuration, according to the rotation of the second drive member 12, the second blade unit 3 is transferable (reciprocally movable) between the closed state where the blades 3a, 3b, and 3c cover the aperture 1a of the shutter base plate 1 and the open state where they are retracted from the aperture 1a.

The cam gears 15-1 and 15-2 are configured such that the hole 15a and the shafts 1c and 1g of the shutter base plate 1 are fitted to each other to be rotatable. As will be described below, arm portions 18a and 18b of a drive spring 18 are configured to generate a biasing force by engaging with a notch 15e.

A toggle spring (biasing member) 10a is guided by a rib 1j formed on the shutter base plate 1 and a rib 8b provided on the cover plate 8, and it engages with the hole 2i of the blade arm 2e and the shaft 1i of the shutter base plate 1. As a result, in the open state of the aperture 1a, the blade arm 2e is biased in a direction where the blades 2a, 2b, and 2c open the apertures 1a (i.e., a direction to maintain the open state). On the other hand, in the closed state of the aperture 1a, the blade arm 2e is biased in a direction where the blades 2a, 2b, and 2c close the aperture 1a (i.e., a direction to maintain the closed state). By this biasing force, in the open state of the aperture 1a, the drive pin 11c abuts on the hole 2h of the blade arm 2 via the blades 2a, 2b, and 2c and the connecting shaft 7 on the connection side when the blades 2a, 2b, and 2c drive in a direction to close the aperture 1a in starting movement of the blade running. In the closed state of the aperture 1a, the drive pin 11c abuts on the hole 2h of the blade arm 2 via the blades 2a, 2b, and 2c and the connecting shaft 7 on the connection side when the blades 2a, 2b, and 2c drive in a direction to open the aperture 1a in starting the blade running.

A toggle spring (biasing member) 10b is guided by a rib 1j formed on the shutter base plate 1 and a rib 8b provided on the cover plate 8, and it engages with the hole 3i of the blade arm 3e and the shaft 1e of the shutter base plate 1. As a result, in the open state of the aperture 1a, the blade arm 3e is biased in a direction where the blades 3a, 3b, and 3c open the apertures 1a (i.e., a direction to maintain the open state), and on the other hand, in the closed state of the aperture 1a, the blade arm 3e is biased in a direction where the blades 3a, 3b, and 3c close the aperture 1a (i.e., a direction to maintain the closed state). By this biasing force, in the open state of the aperture 1a, the drive pin 12c abuts on the hole 3h of the blade arm 3 via the blades 3a, 3b, and 3c and the connecting shaft 7 on the connection side when the blades drive in a direction to close the aperture 1a (i.e., a direction to maintain the closed state) in starting movement of the blade running. In the closed state of the aperture 1a, the drive pin 12c abuts on the hole 3h of the blade arm 3 via the blades 3a, 3b, and 3c and the connecting shaft 7 on the connection side when the blades drive in a direction to open the aperture 1a (i.e., a direction to maintain the open state) in starting the blade running.

Accordingly, when the first blade unit 2 and the second blade unit 3 runs to open or close the aperture 1a, in starting the movement of the blade running, there is no backlash between the drive pin 11c of the first drive member 11 and the hole 2h of the blade arm 2d, and between the drive pin 12c of the drive member 12 and the hole 3h of the blade arm 3d. Therefore, it is possible to reduce variations in starting time of the running.

Furthermore, the biasing force of each of the toggle springs 10a and 10b acts such that the cam engagement pins 11b and 12b abut on the cam surface 15c that is located farther from the rotation center of the cam gear 15 in starting the blade running for each of the odd-numbered photographing and the even-numbered photographing. Accordingly, in starting the blade running, it is possible to drive the cam engagement pins 11b and 12b following the cam surface 15c.

An inner diameter portion of the drive spring 18 is guided by a bearing portion of a holder member 17, and the arm portions 18a and 18b are respectively engaged with the corresponding locking portions, and when seen from the object side, the arm portion 18a is charged to generate the biasing force to rotate in a clockwise direction and the arm portion 18b is charged to generate the biasing force to rotate in a counterclockwise direction.

Figure 7A:
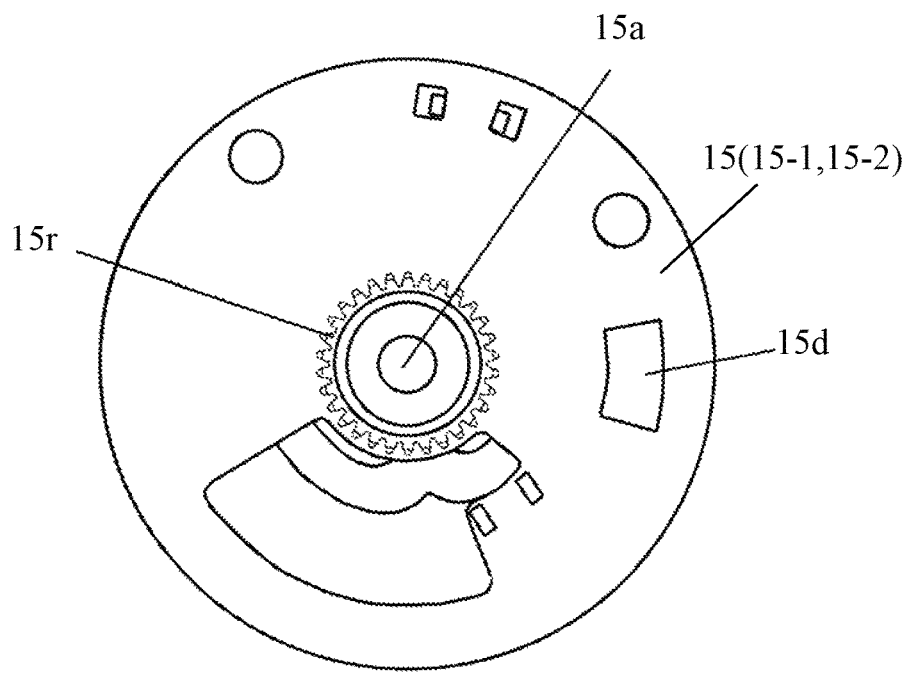
FIGS. 7A and 7B are a front view and a back view of a cam gear of the focal plane shutter in Embodiment 1, respectively.
Figure 7B:
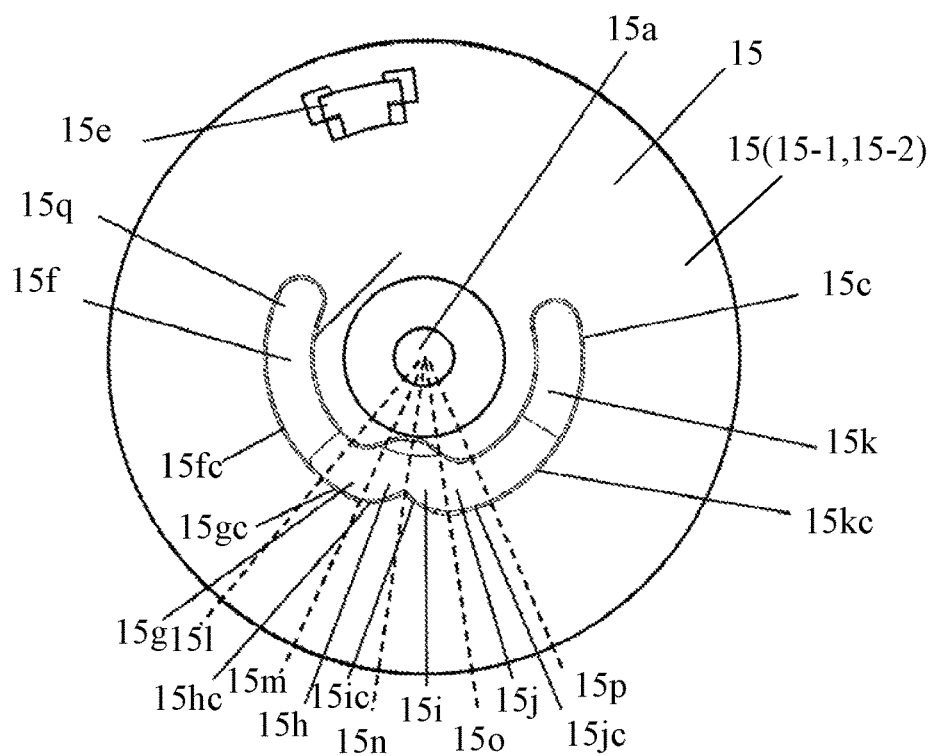

Here, referring to FIGS. 7A and 7B, the configuration of the cam gear 15 (15-1, 15-2) will be described. FIG. 7A is a front view of the cam gear 15 (15-1, 15-2) (a view seen from the object side), and FIG. 7B is a back view (a view seen from the image sensor 403).

The cam groove 15q of the cam gear 15 is concentrically formed with the hole 15a and includes a first free-running drive area 15f and a second free-running drive area 15g for holding the blade unit via the cam engagement pins 11b and 12b in a standby state before running. The cam groove 15q includes a first exposure drive area 15h and a second exposure drive area 15i for driving the blade unit in a deployed state or a overlapped state and moving the aperture 1a to the open state. The cam groove 15q is concentrically formed with the hole 15a and includes a third free-running drive area 15j and a fourth free-running drive area 15k for holding the blade unit via the cam engagement pins 11b and 12b in the running completed state. The cam surface 15c on the side farther from the rotational center of the cam gear 15 includes cam surfaces 15fc, 15gc, 15hc, 15ic, 15jc, and 15kc. The cam surfaces 15fc, 15gc, 15hc, 15ic, 15jc, and 15kc correspond to the first free-running drive area 15f, the second free-running drive area 15g, the first exposure drive area 15h, the second exposure drive area 15i, the third free-running drive area 15j, and the fourth free-running drive area 15k, respectively.

The first free-running drive area 15f and the second free-running drive area 15g are connected via a first switching portion 15l. The second free-running drive area 15g and the first exposure drive area 15h are connected via a second switching portion 15m. The first exposure drive area 15h and the second exposure drive area 15i are connected via a third switching portion 15n. The second exposure drive area 15i and the third free-running drive area 15j are connected via a fourth switching portion 15o. The third free-running drive area 15j and the fourth free-running drive area 15k are connected via a fifth switching portion 15p.

The first free-running drive area 15f and the fourth free-running drive area 15k are symmetrical (in linear symmetry) with respect to a line (straight line extending in the radial direction from the rotation center) connecting the center of the hole 15a and the third switching portion 15n). Similarly, the second free-running drive area 15g and the third free-running drive area 15j are symmetrical (in linear symmetry) with respect to a straight line (straight line extending in the radial direction from the rotation center) connecting the center of the hole 15a and the third switching portion 15n. Similarly, the first exposure drive area 15h and the second exposure drive area 15i are symmetrical (in linear symmetry) with respect to a straight line (a line extending in the radial direction from the rotation center) connecting the center of the hole 15a and the third switching portion 15n.

In this embodiment, the cam member (cam gear 15) includes a cam surface (first cam surface) 15ic for driving the drive member to move the light shielding member to the closed state and a cam surface (second cam surface) 15hc for driving the drive member to move the light shielding member to the open state. Preferably, the cam member further includes cam surfaces (third cam surface) 15k and 15j for slidably holding the drive member to be in the open state, and cam surfaces (fourth cam surface) 15f and 15g for slidably holding the drive member to be in the closed state. More preferably, when moving the light shielding member from the open state to the closed state, the drive member abuts on the first cam surface and it does not abut on the second cam surface. Further, when moving the light shielding member from the closed state to the open state, the drive member abuts on the second cam surface and it does not abut on the first cam surface. The fourth cam surface, the second cam surface, the first cam surface, and the third cam surface are continuously formed.

As illustrated in FIGS. 6A and 6B, the motor 19 is attached to a motor plate 20. The motor plate 20 is screwed to the holder member 17 with screws 14. A pinion gear 21 is attached to an output shaft 19a of the motor 19. The pinion gear 21 passes through the hole 17c of the holder member 17 and engages with the gear portion 15r of the cam gear 15 (15-1, 15-2), and thus the torque from the motor 19 is transmitted to the cam gear 15. The motor 19 is a stepping motor capable of performing a step drive (open-loop drive) where the energization state of the coil is switched to be driven in accordance with a predetermined time interval and two types of feedback drives with different advance angle values.

Figure 8:
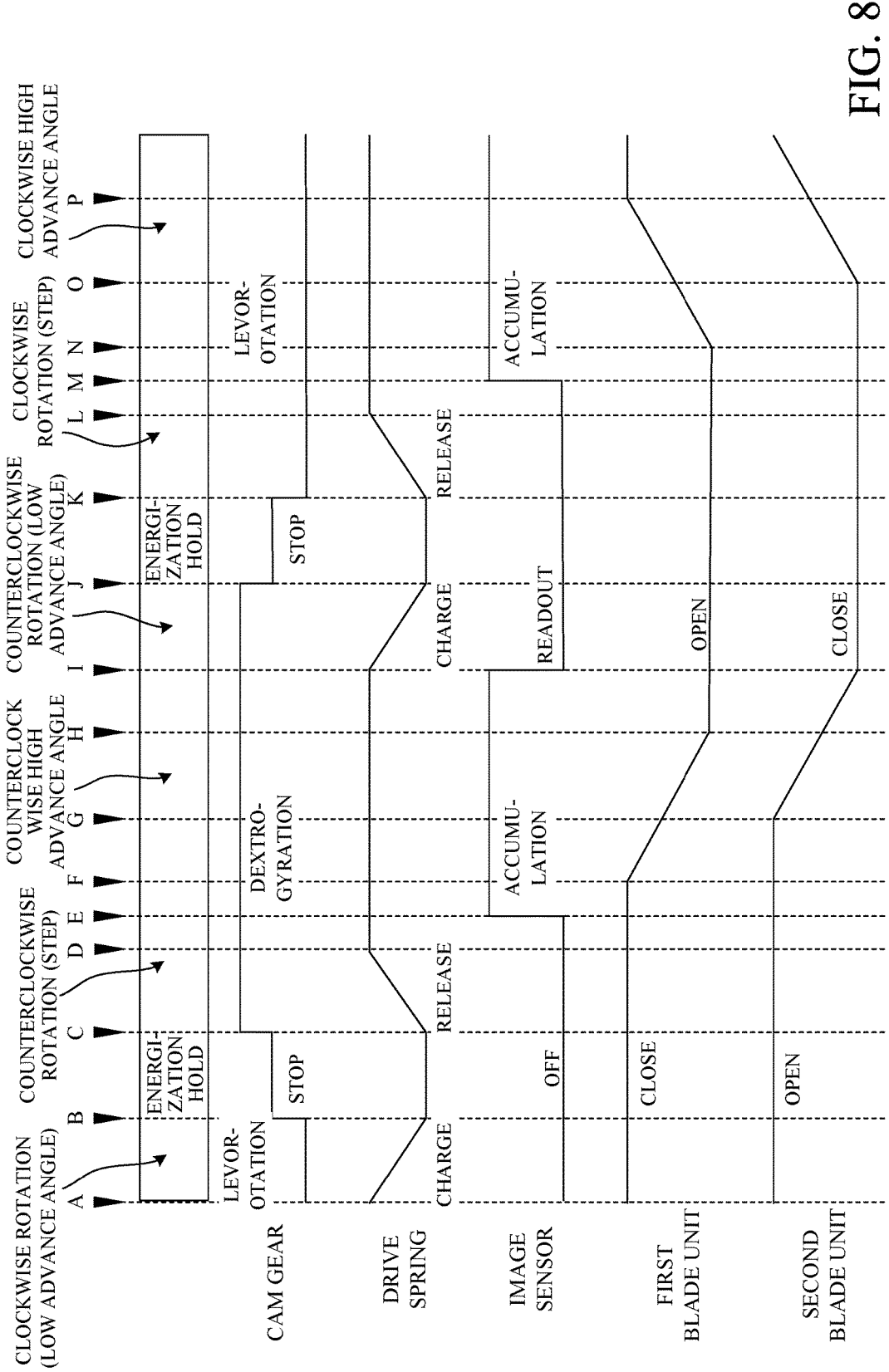
FIG. 8 is a timing chart of a motion of the focal plane shutter in Embodiment 1.

Next, referring to FIGS. 8 to 20B, the operation of the focal plane shutter 113 will be described. FIG. 8 is a timing chart of the operation of the focal plane shutter 113. FIGS. 9A to 20B are explanatory diagrams of the state of the focal plane shutter 113 at timings A to P illustrated in FIG. 8. Each of FIGS. 9A to 20A is a front view (i.e., a view seen from the object side), and each of FIGS. 9B to 20B is a back view (i.e., a view seen from the image sensor 403). In the following description, the rotation direction (right and left) of the cam gear 15-2 is defined by the direction illustrated in each of FIGS. 9A to 20A, and the direction illustrated in FIGS. 9B to 20B are opposite to the direction illustrated in FIGS. 9A to 20A.

The operation of the focal plane shutter 113 in each of the odd-numbered photographing and the even-numbered photographing will be described in performing the reciprocating exposure. The first blade unit 2, the drive member 11, and the cam gear 15-1 have the same configurations as the second blade unit 3, the drive member 12, and the cam gear 15-2, respectively, and therefore their drawings are omitted.

<Odd-Numbered Photographing>
(Photographing Standby State)

Figure 9A:
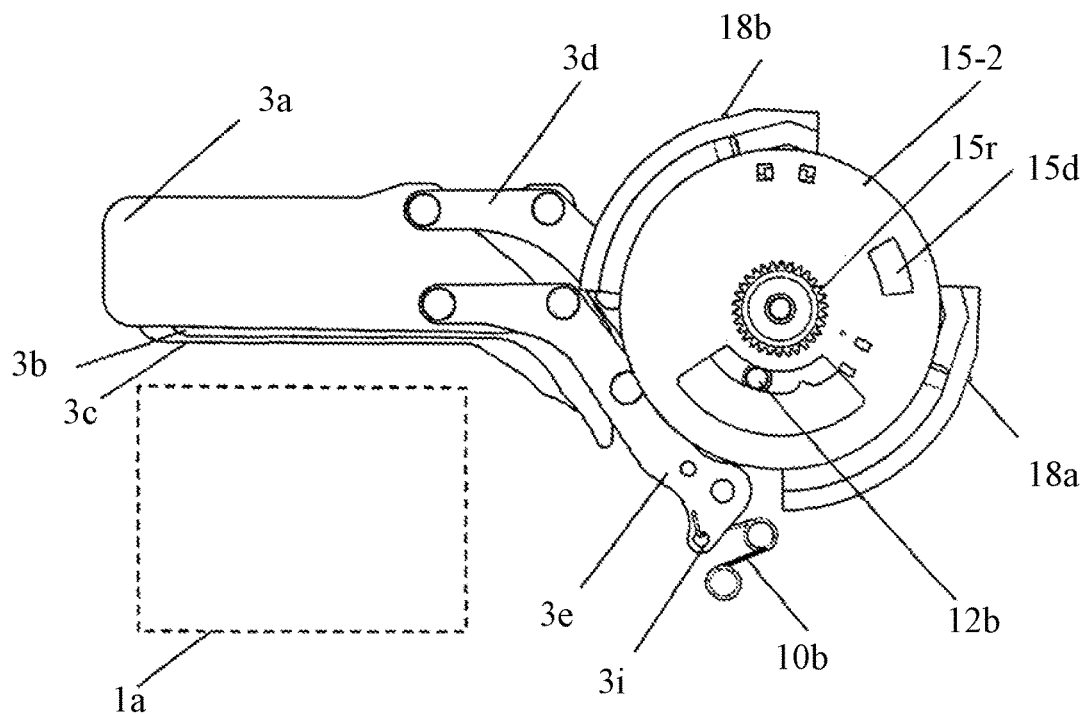
FIGS. 9A and 9B are a front view and a back view of illustrating a standby state of the focal plane shutter before the odd-numbered photographing in Embodiment 1, respectively.
Figure 9B:
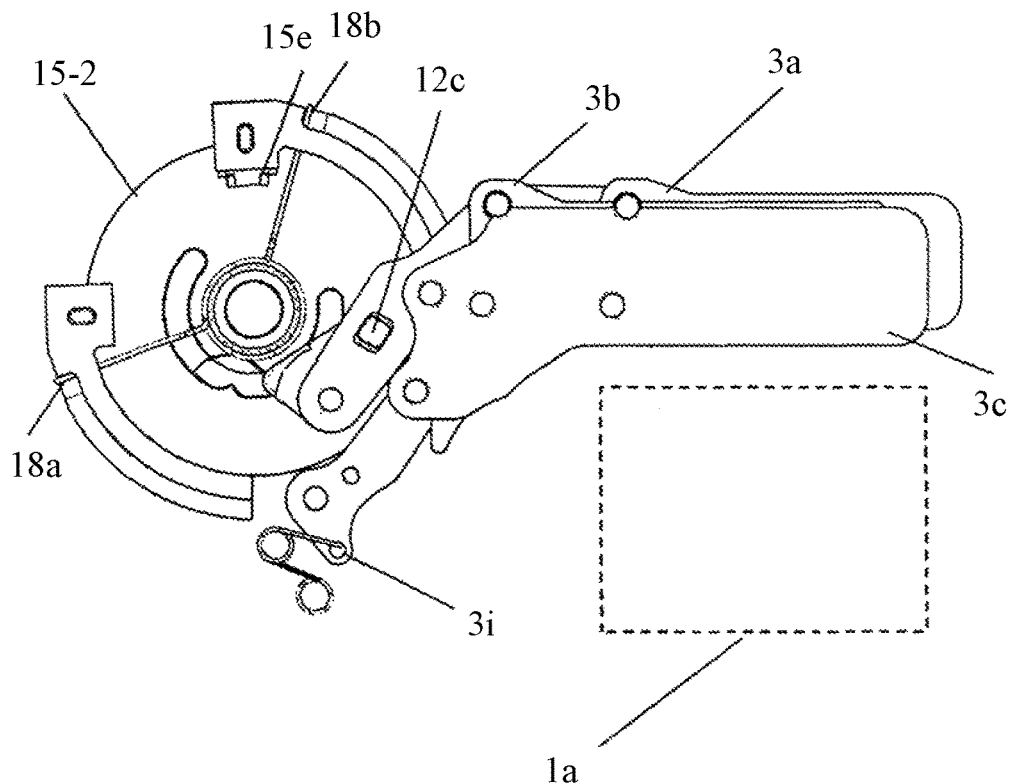

FIGS. 9A and 9B are diagrams of illustrating a standby state (timing A) of the focal plane shutter 113 before photographing. As illustrated in FIGS. 9A and 9B, the blades 3a, 3b, and 3c open the aperture 1a and the blades 2a, 2b, and 2c close the aperture 1a at the timing A when the image capturing apparatus 400 is in the standby state (not illustrated). At this time, the drive pin 12c is biased in a direction to open the aperture 1a by the biasing force of the toggle spring 10*b* hooked on the hole 3*i* of the blade arm 3*e*, and the cam engagement pin 12*b* waits in a state of abutting on the cam surface 15*kc* of the cam gear 15-2 (see FIG. 7B). The drive pin 11*c* of the first drive member 11 is biased in a direction to close the aperture 1*a* by the biasing force of the toggle spring 10*a* hooked on the hole 2*i* of the blade arm 2*e* and the cam engagement pin 11*b* waits in a state of abutting on the cam surface 15*kc* of the cam gear 15-1 (not illustrated). At this time, the notch 15*e* disposed on the cam gear 15 does not abut on the arm portion 18*b* on the right side of the drive spring 18, and the drive spring 18 is not charged, which is in a natural state.

(Charged State)

When the switch (SW1) 498 is turned on at the timing A, the motor 19 is driven in the clockwise direction in the feedback drive mode with a low advance angle. Therefore, the cam gear 15 rotates in the counterclockwise direction from the state of FIGS. 9A and 9B. Here, since the pinion gear 21 of the motor 19 and the gear portion 15*r* of the cam gear 15 are engaged with each other, the rotational direction of the motor 19 and the rotational direction of the cam gear 15 are opposite to each other.

When the cam gear 15 rotates in the counterclockwise direction from the state (timing A) in FIGS. 9A and 9B, the notch 15*e* disposed on the cam gear abuts on the drive spring 18 and rotates while charging. In this section, since the cam gear 15 rotates in the counterclockwise direction while charging the drive spring 18, the load fluctuation of the motor 19 increases. However, since the motor 19 is driven in the feedback drive mode with the low advance angle, the motor 19 does not step out.

Figure 10A:
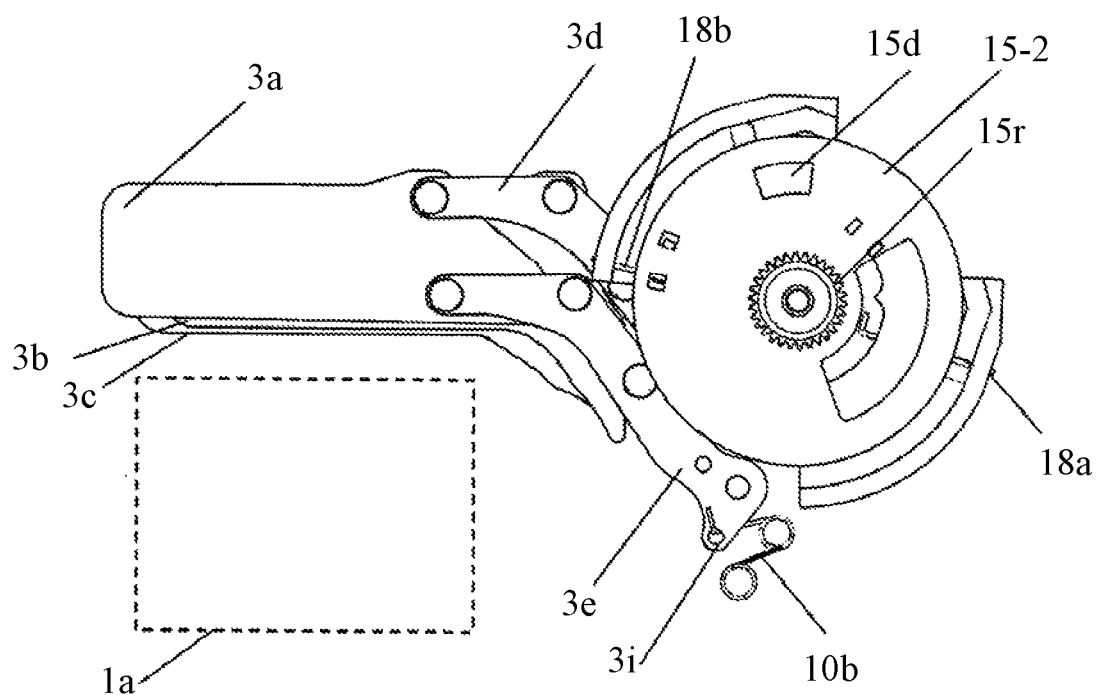
FIGS. 10A and 10B are a front view and a back view of illustrating a state where the cam gear of the focal plane shutter charges a drive spring at the time of the odd-numbered photographing in Embodiment 1, respectively.
Figure 10B:
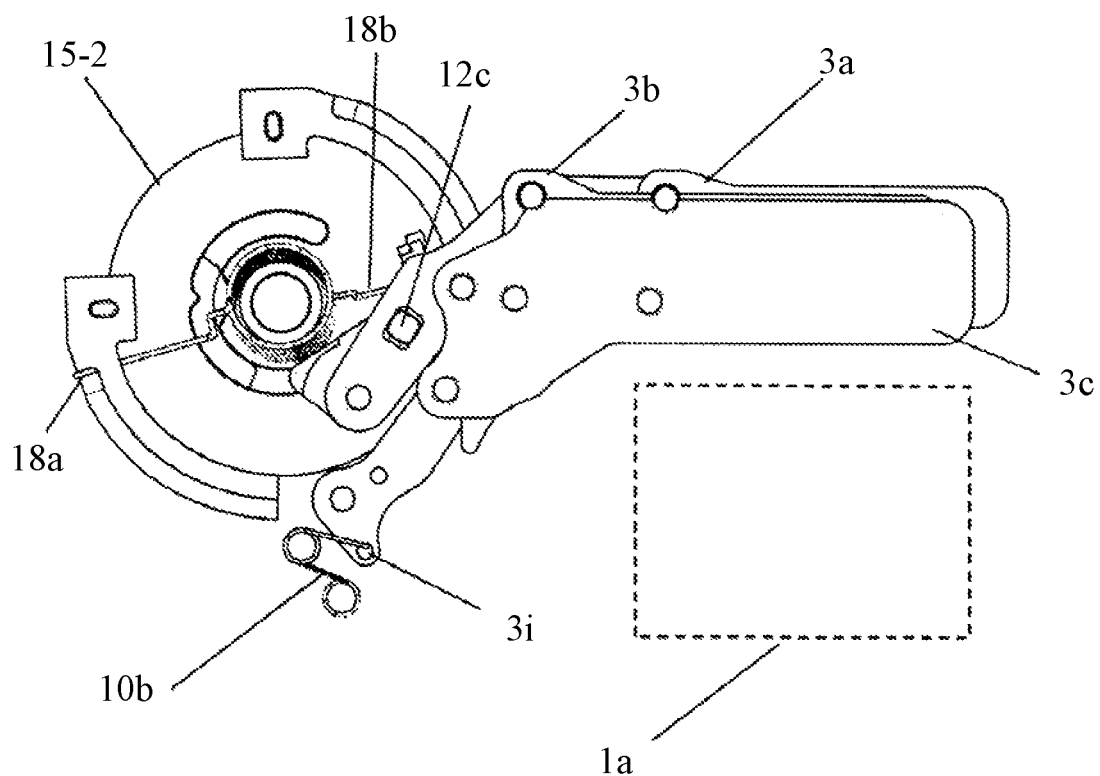

In a state of FIGS. 10A and 10B (timing B), since the drive spring 18 is in a charged state, the cam gear 15 is biased in the clockwise direction by the drive spring 18. The control circuit 312 starts energizing the motor 19 and rotates the cam gear 15 by the number of steps equal to or greater than the number of steps by which a movable end portion 15*d* of the cam gear 15 makes contact with a contact surface 17*e* of the holder member, and then it controls the drive circuit 313 to keep the energization of the motor 19. Therefore, the movable end portion 15*d* of the cam gear 15 abuts on the contact surface 17*e* of the holder member 17, and the rotation of the cam gear 15 is stopped. As illustrated in FIGS. 10A and 10B, at the timing B, the blades 3*a*, 3*b*, and 3*c* open the aperture 1*a*. On the other hand, the blades 2*a*, 2*b*, and 2*c* close the aperture 1*a* (not illustrated).

When the switch (SW1) 498 of the image capturing apparatus 400 is turned on at the timing A, a distance measurer (focus detector) (not illustrated) measures a distance to the object, and the lens controller 491 performs the photographing preparation such as driving the image capturing lens to focus.

(Step Drive, Fourth and Third Free-Running Drive Sections)

At a timing C after the passage of a predetermined time since the switch (SW2) 499 is turned on, the cam gears 15 rotate so as to move the blades 2*a*, 2*b*, and 2*c* in the direction to open the aperture 1*a* and the blades 3*a*, 3*b*, and 3*c* in the direction to close the aperture 1*a*. At this time, the motor 19 is energized in the direction opposite to that at the time of charging, and the run-up drive in the step drive mode starts. In the run-up drive, the control circuit 312 gradually decreases the width of the predetermined drive pulse to gradually increase the rotational speed of the motor 19 (timings D, E, and F).

When the energization to the motor 19 is started, the biasing force of the drive spring 18 is received, the cam gear 15 rotates in the clockwise direction to start performing the run-up. The cam engagement pin 11*b* starts acceleration while abutting on the cam surfaces 15*kc* and 15*jc* in the fourth free-running drive area 15*k* and the third free-running drive area 15*j*, respectively, of the cam groove 15*q* of the cam gear 15 sequentially by the biasing force of the toggle spring 10*a* hooked on the hole 2*i* of the blade arm 2*e*. The cam engagement pin 12*b* starts acceleration while abutting on the cam surfaces 15*kc* and 15*jc* in the fourth free-running drive area 15*k* and the third free-running drive area 15*j*, respectively, of the cam groove 15*q* of the cam gear 15 sequentially by the biasing force of the toggle spring 10*b* hooked on the hole 3*i* of the blade arm 3*e*.

(Start Driving Blades (Step Drive to High Advance Angle Drive))

The control circuit 312 controls the drive circuit 313 so as to drive the cam gear 15 in the clockwise direction in the feedback drive mode with a high advance angle after predetermined steps from timing C.

Figure 11A:
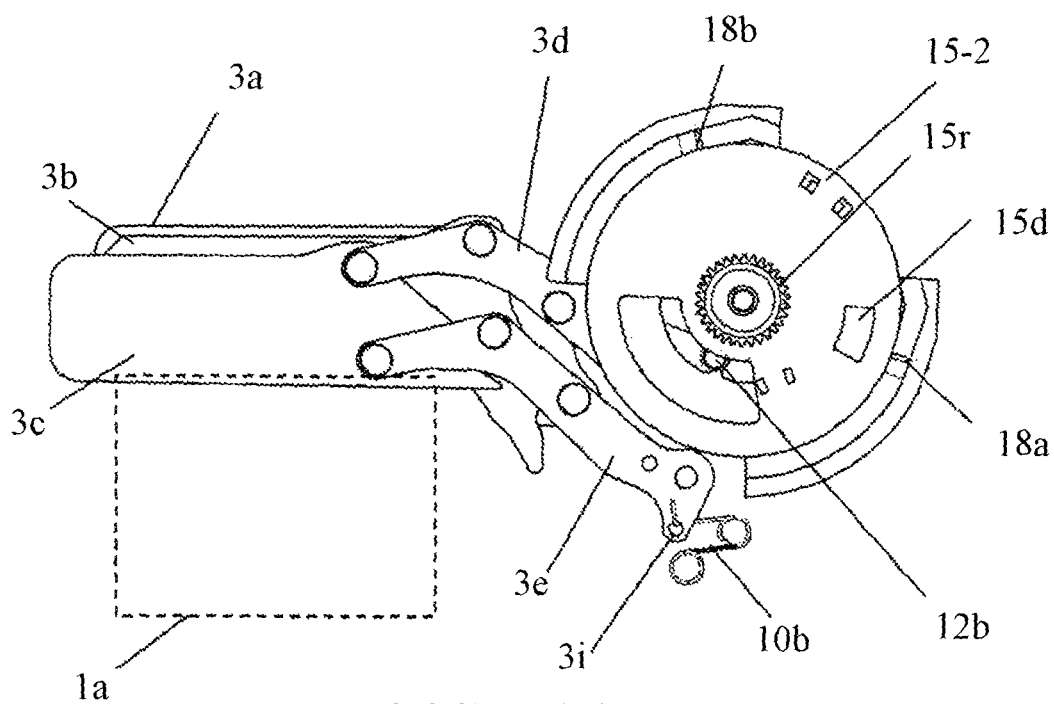
FIGS. 11A and 11B are a front view and a back view of illustrating a state where the drive member of the focal plane shutter is driven by the cam gear in an exposure motion at the time of the odd-numbered photographing in Embodiment 1, respectively.
Figure 11B:
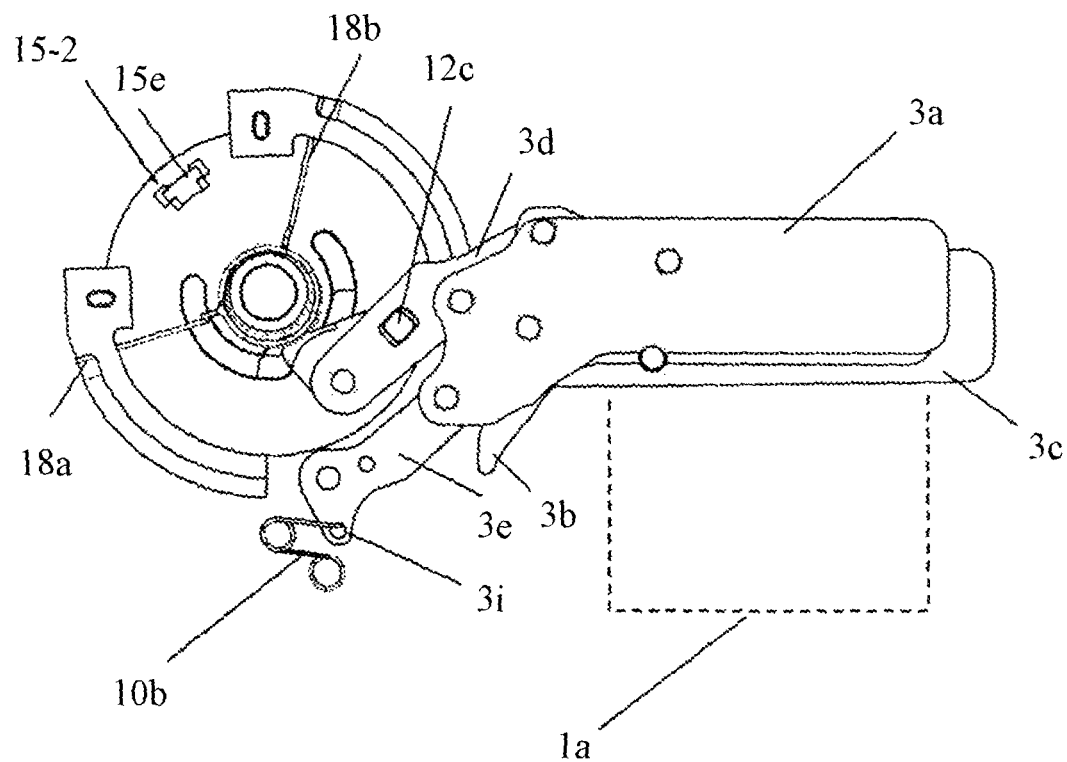

When the cam gear 15 rotates in the clockwise direction from the state (timing C) in FIGS. 10A and 10B, the state is as illustrated in FIGS. 11A and 11B (timing G). In this section, the cam engagement pin 11*b* of the first drive member 11 and the cam engagement pin 12*b* of the second drive member 12 are moved from the third free-running drive area 15*j* which is the concentric circular cam of the cam gear 15 to the second exposure drive area 15*i*. As a result, the cam surface 15*ic* is traced to rotate the first drive member 11 and the second drive member 12.

Figure 12A:
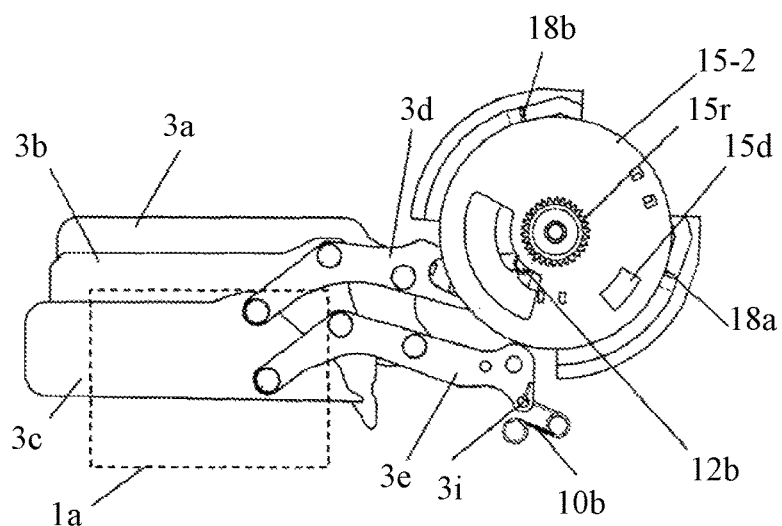
FIGS. 12A to 12C are a front view and a back view of illustrating a state where the blade is running while the drive member of the focal plane shutter is separated from a cam surface of the cam gear in the exposure motion at the time of the odd-numbered photographing, and a plan view of the cam gear in Embodiment 1, respectively.
Figure 12B:
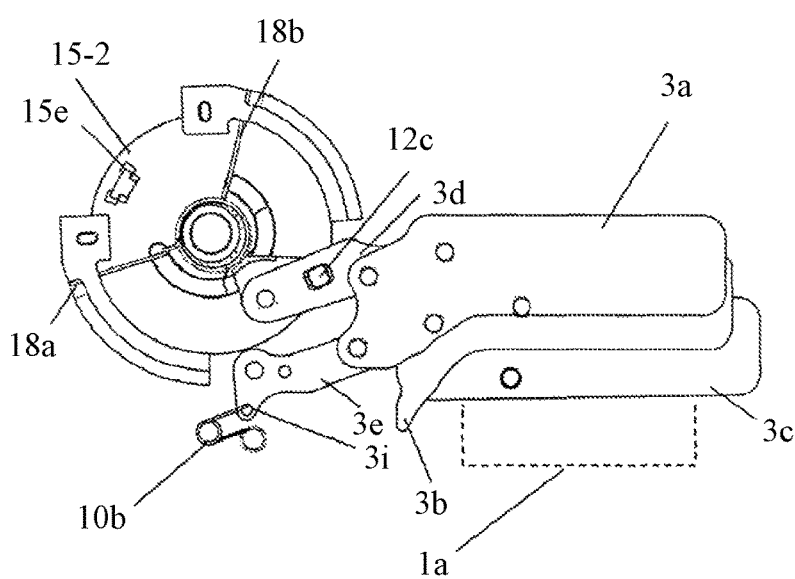
Figure 12C:
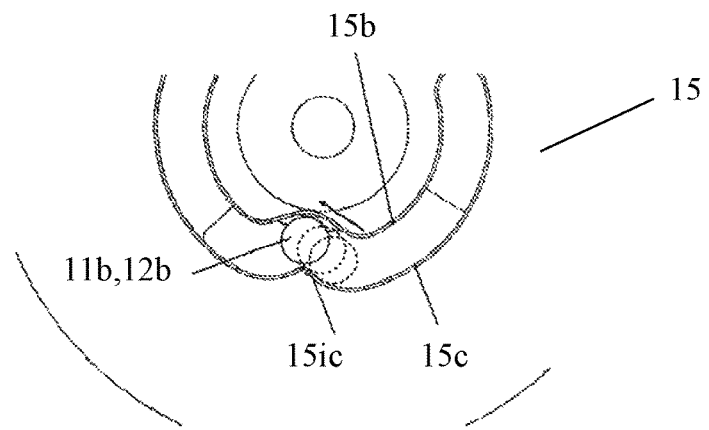

Further, as illustrated in FIGS. 12A and 12B, the cam engagement pins 11*b* and 12*b* move from the second exposure drive area 15*i* to the first exposure drive area 15*h* (timing H). At this time, as illustrated in FIG. 12C which is a plan view of the cam gear 15, the cam engagement pin 11*b* of the first drive member 11 and the cam engagement pin 12*b* of the second drive member 12 separate from the cam surface 15*ic*. The first drive member 11 rotates due to the inertia force of the first blade unit 2 rotating in conjunction with the first drive member 11, and the second drive member 12 rotates due to the inertia force of the second blade unit 3 rotating in conjunction with the second drive member 12. Accordingly, in the first exposure drive area 15*h*, the cam engagement pin 11*b* of the first drive member 11 and the cam engagement pin 12*b* of the second drive member 12 do not abut on the cam surface 15*b* and the cam surface 15*c* of the cam gear 15.

The biasing direction of the toggle spring 10*a* hooked on the hole 2*i* of the blade arm 2*e* and the hole 3*i* of the blade arm 3*e* is switched in the vicinity of the third switching portion 15*n*, and the first drive member 11 and the second drive member 12 is biased in the clockwise direction by its biasing force. Thus, the blades 2*a*, 2*b*, and 2*c* which close the aperture 1*a* are opening the aperture 1*a* and the blades 3*a*, 3*b*, and 3*c* which open the aperture 1*a* are closing the aperture 1*a*. As a result, the first blade unit 2 and the second blade unit 3 perform exposure on the image sensor 403 at the shutter speed set by the user.

Therefore, at the time of exposure driving, it is necessary to drive the motor 19 at high speed, and the load fluctuation increases during the drive of the motor 19. At this time, since the motor 19 is driven in the feedback drive mode with a high advance angle, the motor 19 will not step out due to the high-speed drive or the load fluctuation. In addition, since the rotational speed of the motor 19 is sufficiently high by the run-up drive, the motor 19 can be driven at a high speed in the feedback drive mode with a high advance angle. When the running of the blades starts, the change in the rotational driving force of the motor 19 has a relatively small influence on the rotational speed of the cam gear 15 and the degree of synchronization with the electric signal. Therefore, even if the load of the motor 19 fluctuates to some extent, the blades can run stably without causing step-out.
(Exposure Running Completed)

Figure 13A:
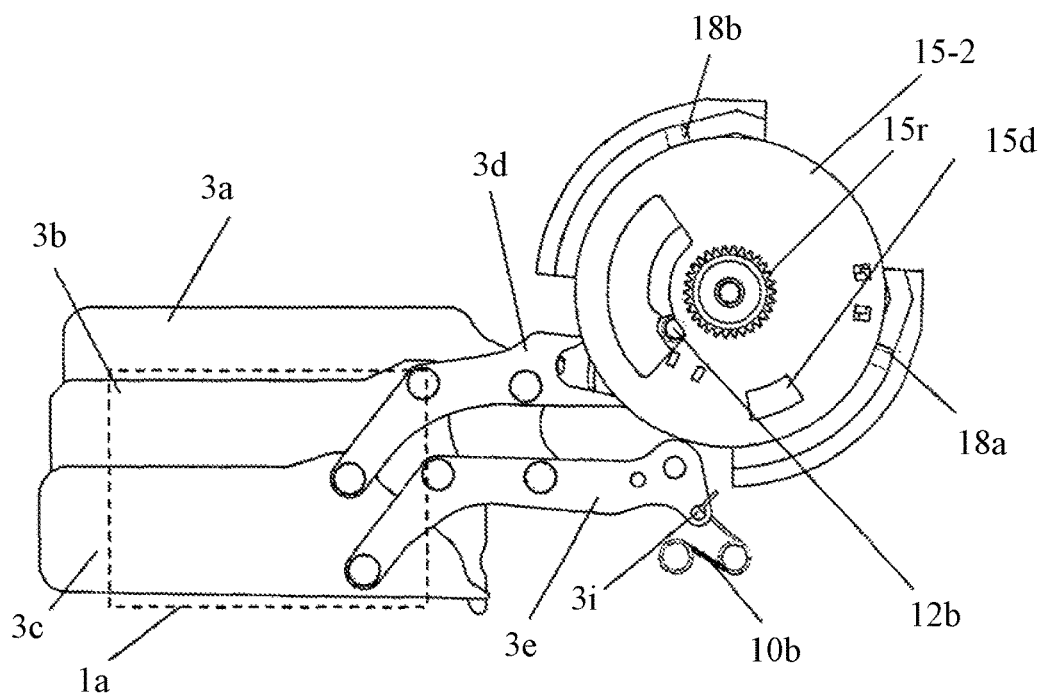
FIGS. 13A and 13B are a front view and a back view of illustrating a state where the drive member of the focal plane shutter is driven by the cam gear in the exposure motion at the time of the odd-numbered photographing in Embodiment 1, respectively.
Figure 13B:
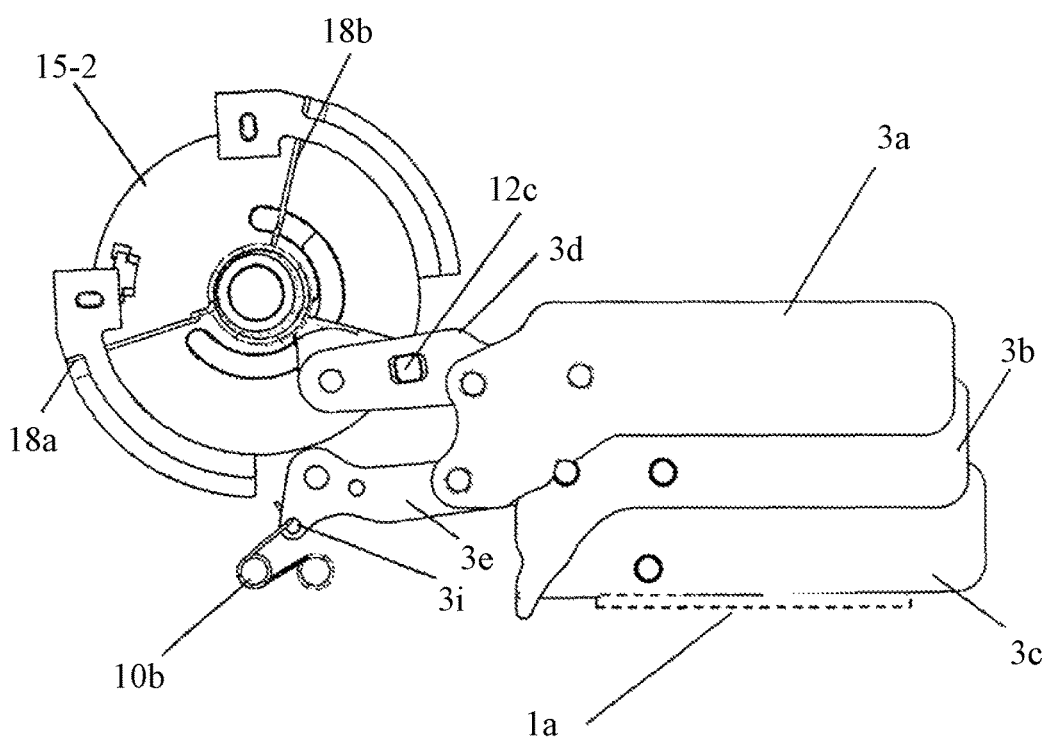

As illustrated in FIGS. 13A and 13B, in the second free-running drive area 15g, each of the cam engagement pin 11b of the first drive member 11 and the cam engagement pin 12b of the second drive member 12 start abutting on the cam surface 15b on the side closer to the rotation center of the cam gear 15. Then, the cam engagement pins 11b and 12b trace the cam surface 15b to rotate the first drive member 11 and the second drive member 12, respectively.

Figure 14A:
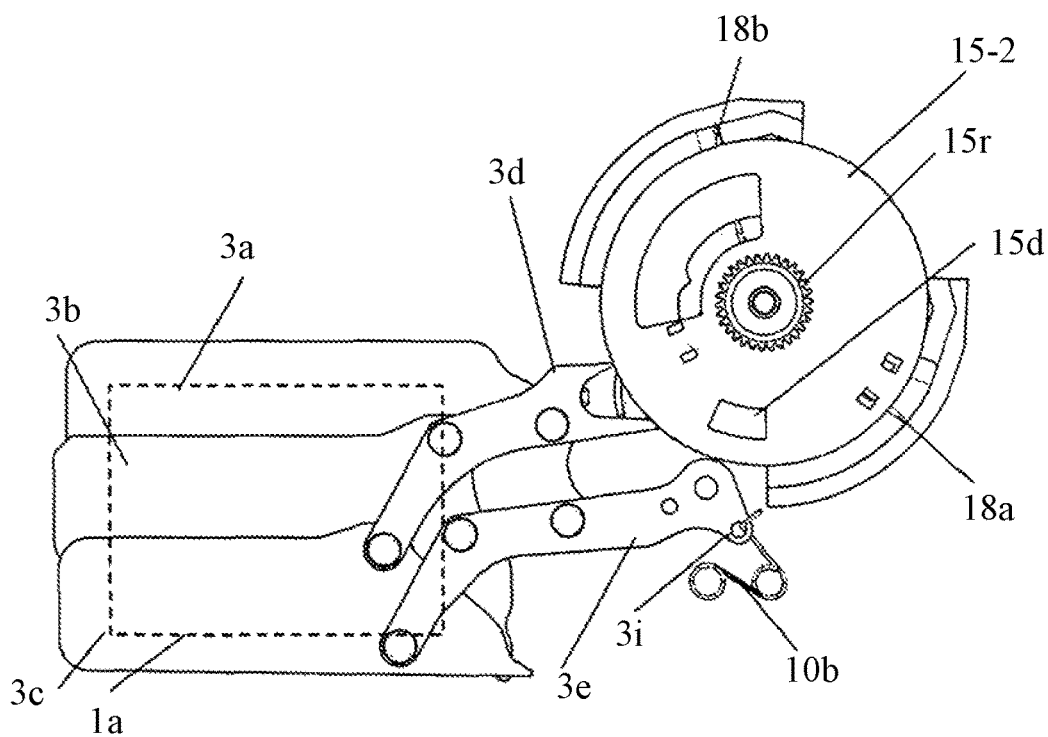
FIGS. 14A and 14B are a front view and a back view of illustrating a blade running completion state of the focal plane shutter at the time of the odd-numbered photographing in Embodiment 1, respectively.
Figure 14B:
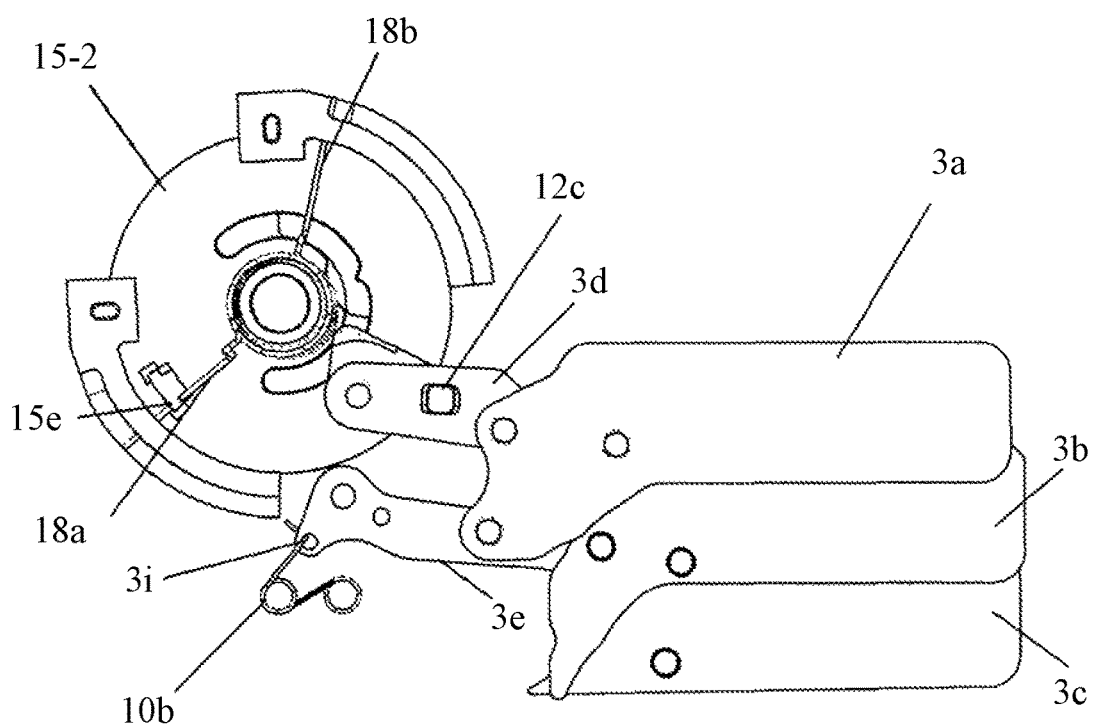

The cam engagement pins 11b and 12b move from the second free-running drive area 15g in the state of FIGS. 13A and 13B to the first free-running drive area 15f in the state of FIGS. 14A and 14B. At this time, the cam engagement pin 11b of the first drive member 11 and the cam engagement pin 12b of the second drive member 12 are each slidably fitted and held between the cam surface 15b and the cam surface 15c. The cam engagement pin 11b of the first drive member 11 and the cam engagement pin 12b of the second drive member 12 are concentric with the hole 15a in the first free-running drive area 15f of the cam gear 15, which does not cause a half-opened state due to bounding.
<Even-Numbered Photographing>
(Photographing Standby State)

Figure 15A:
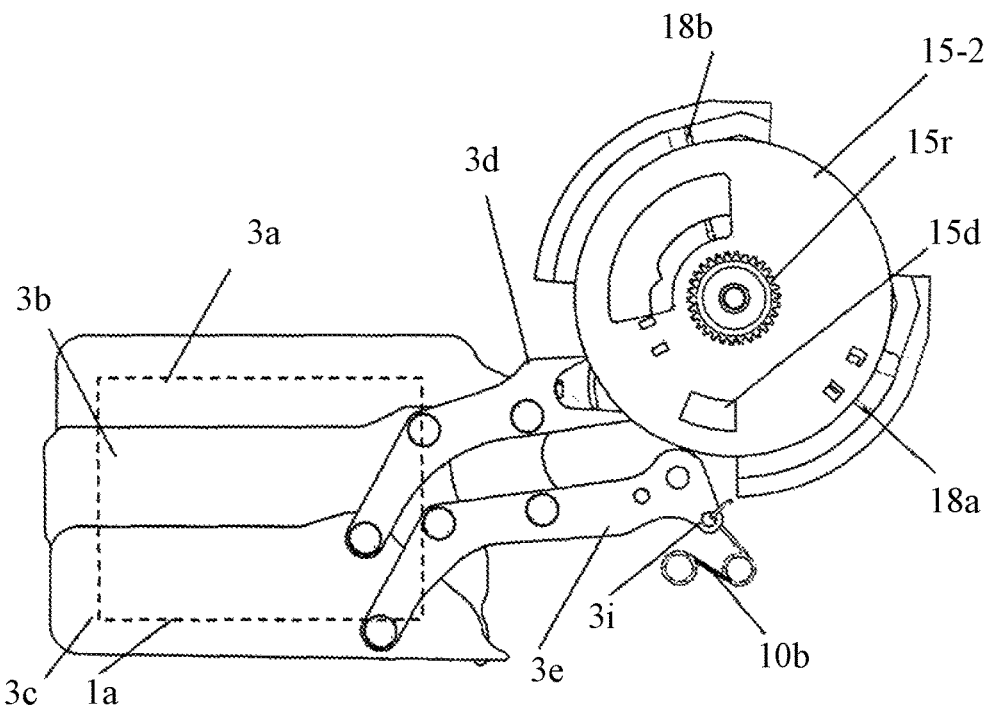
FIGS. 15A and 15B are a front view and a back view of illustrating a standby state of the focal plane shutter before the even-numbered photographing in Embodiment 1, respectively.
Figure 15B:
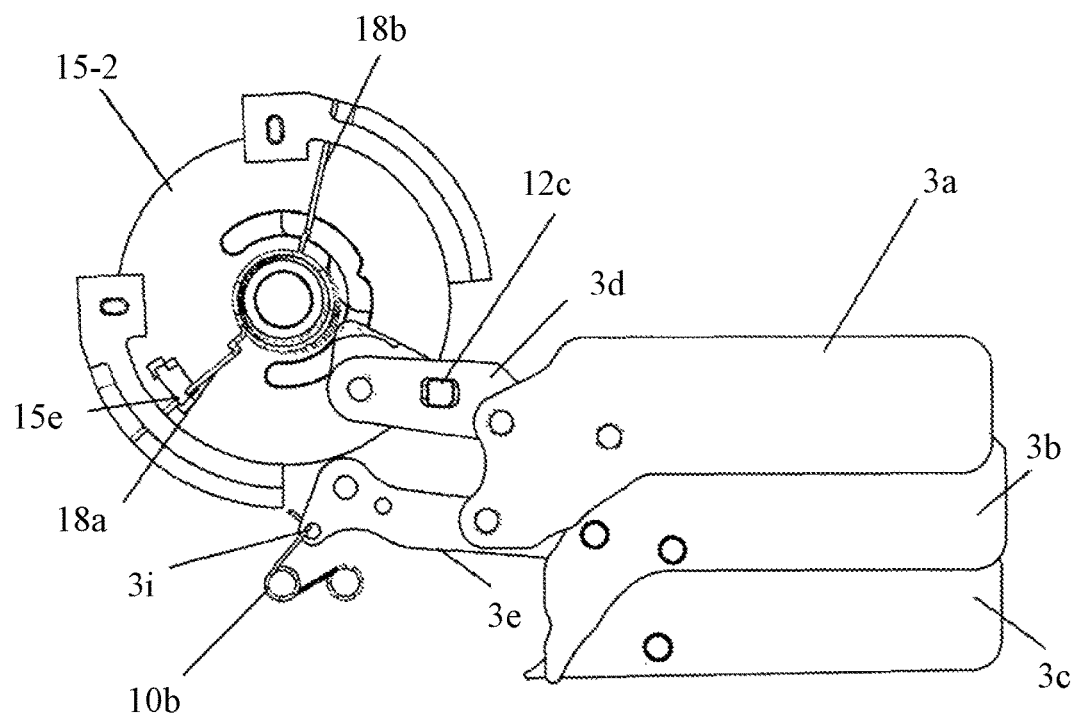

FIGS. 15A and 15B are diagrams illustrating the standby state (timing I) of the focal plane shutter 113 before the even-numbered photographing. As illustrated in FIGS. 15A and 15B, at the timing I which is the standby state of the image capturing apparatus 400, the blades 3a, 3b, and 3c close the aperture 1a and the blades 2a, 2b, and 2c open the aperture 1a (not illustrated). At this time, the drive pin 12c of the second drive member 12 is biased in the direction to close the aperture 1a by the biasing force of the toggle spring 10b hooked on the hole 3i of the blade arm 3e, and the cam engagement pin 12b waits while abutting on the cam surface 15fc of the cam gear 15-2. The drive pin 11c of the first drive member 11 is biased in the direction to open the aperture 1a by the biasing force of the toggle spring 10a hooked on the hole 2i of the blade arm 2e, and the cam engagement pin 11b waits while abutting on the cam surface 15fc of the cam gear 15-1. At this time, the notch 15e disposed on the cam gear 15 does not abut on the right arm portion 18a of the drive spring 18, and the drive spring 18 is not charged, which is in the natural state.
(Charged State)

When the switch (SW1) 498 is turned on at the timing I, the motor 19 is driven in the counterclockwise direction in the feedback advance drive mode with a low advance angle, and accordingly the cam gear 15 rotates in the clockwise direction from the state of FIGS. 15A and 15 B. Since the pinion gear 21 of the motor 19 and the gear portion 15r of the cam gear 15 are engaged with each other, the rotational direction of the motor 19 and the rotational direction of the cam gear 15 are opposite to each other.

When the cam gear 15 rotates in the clockwise direction from the state (timing I) in FIGS. 15A and 15B, the notch 15e disposed on the cam gear 15 abuts on the drive spring 18 and rotates while charging. In this section, since the cam gear 15 rotates in the clockwise direction while charging the drive spring 18, the load fluctuation of the motor 19 increases. However, since the motor 19 is driven in the feedback drive mode with a low advance angle, the motor 19 does not step out.

Figure 16A:
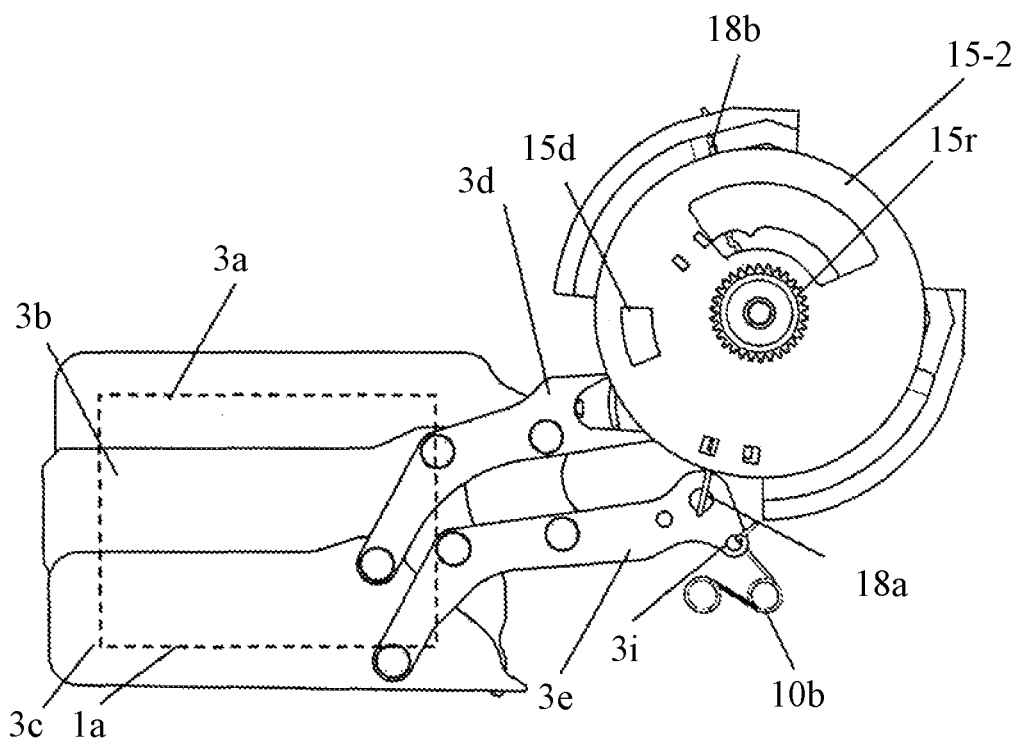
FIGS. 16A and 16B are a front view and a back view of illustrating a state where the cam gear of the focal plane shutter charges the drive spring at the time of the even-numbered photographing in Embodiment 1, respectively.
Figure 16B:
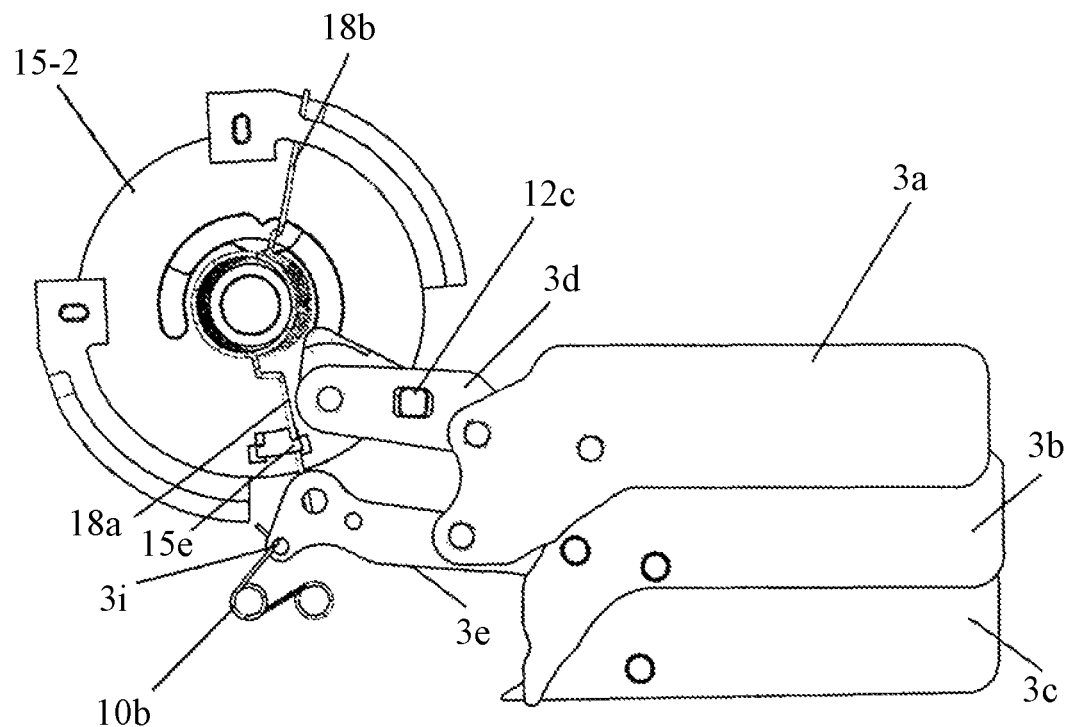

In the state (timing J) of FIGS. 16A and 16B, the drive spring 18 is in a charged state, and therefore the cam gear 15 is biased in the counterclockwise direction by the drive spring 18. The control circuit 312 starts energizing the motor 19 and rotates the cam gear 15 by the number of steps equal to or greater than the number of steps by which the movable end portion 15d of the cam gear 15 makes contact with the contact surface 17e of the holder member, and then it controls the drive circuit 313 to keep energizing the motor 19. Accordingly, the movable end portion 15d of the cam gear 15 abuts on the contact surface 17e of the holder member 17, and the rotation of the cam gear 15 is stopped. As illustrated in FIGS. 16A and 16B, at the timing J, the blades 3a, 3b, and 3c close the aperture 1a. On the other hand, the blades 2a, 2b, and 2c open the aperture 1a (not illustrated).

When the switch (SW1) 498 of the image capturing apparatus 400 is turned on at the timing I, a distance measurer (focus detector) (not illustrated) measures a distance to the object, and the lens controller 491 performs the photographing preparation such as driving the image capturing lens to focus.
(Step Drive, First and Second Free-Running Drive Sections)

At a timing K after the passage of a predetermined time since the switch (SW2) 499 is turned on, the energization starts such that the cam gears 15 rotate so as to move the blades 2a, 2b, and 2c in the direction to close the aperture 1a and the blades 3a, 3b, and 3c in the direction to open the aperture 1a. At this time, the motor 19 is energized in the direction opposite to that at the time of charging, and the run-up drive in the step drive mode starts. In the run-up drive, the control circuit 312 gradually decreases the width of the predetermined drive pulse to gradually increase the rotational speed of the motor 19 (timings L, M, and N).

When the energization to the motor 19 is started, the biasing force of the drive spring 18 is received, the cam gear 15 rotates in the counterclockwise direction to start performing the run-up. The cam engagement pin 11b starts acceleration while abutting on the cam surfaces 15fc and 15gc in the first free-running drive area 15f and the second free-running drive area 15g, respectively, of the cam groove 15q of the cam gear 15 sequentially by the biasing force of the toggle spring 10a hooked on the hole 2i of the blade arm 2e. The cam engagement pin 12b starts acceleration while abutting on the cam surfaces 15fc and 15gc in the first free-running drive area 15f and the second free-running drive area 15g, respectively, of the cam groove 15q of the cam gear 15 sequentially by the biasing force of the toggle spring 10b hooked on the hole 3i of the blade arm 3e.
(Start Driving Blades (Step Drive to High Advance Angle Drive))

The control circuit 312 controls the drive circuit 313 so that the cam gear 15 is driven in the counterclockwise direction in the feedback drive mode with a high advance angle after a predetermined step (timing O) from the timing K.

Figure 17A:
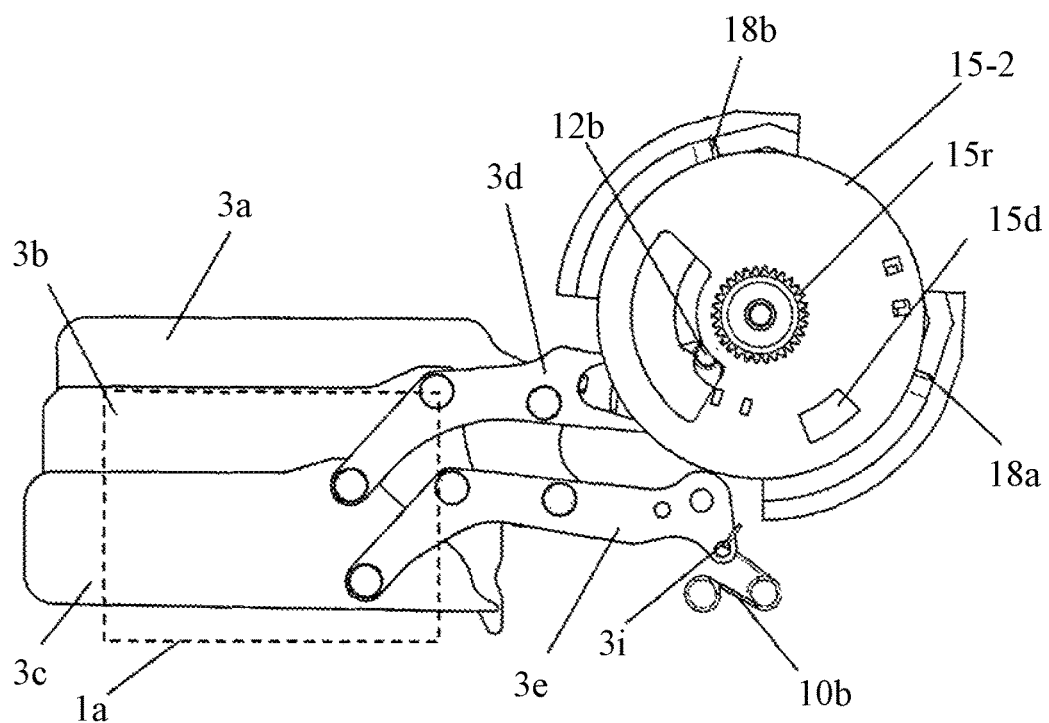
FIGS. 17A and 17B are a front view and a back view of illustrating a state where the drive member of the focal plane shutter is driven by the cam gear in the exposure motion at the time of the even-numbered photographing in Embodiment 1, respectively.
Figure 17B:
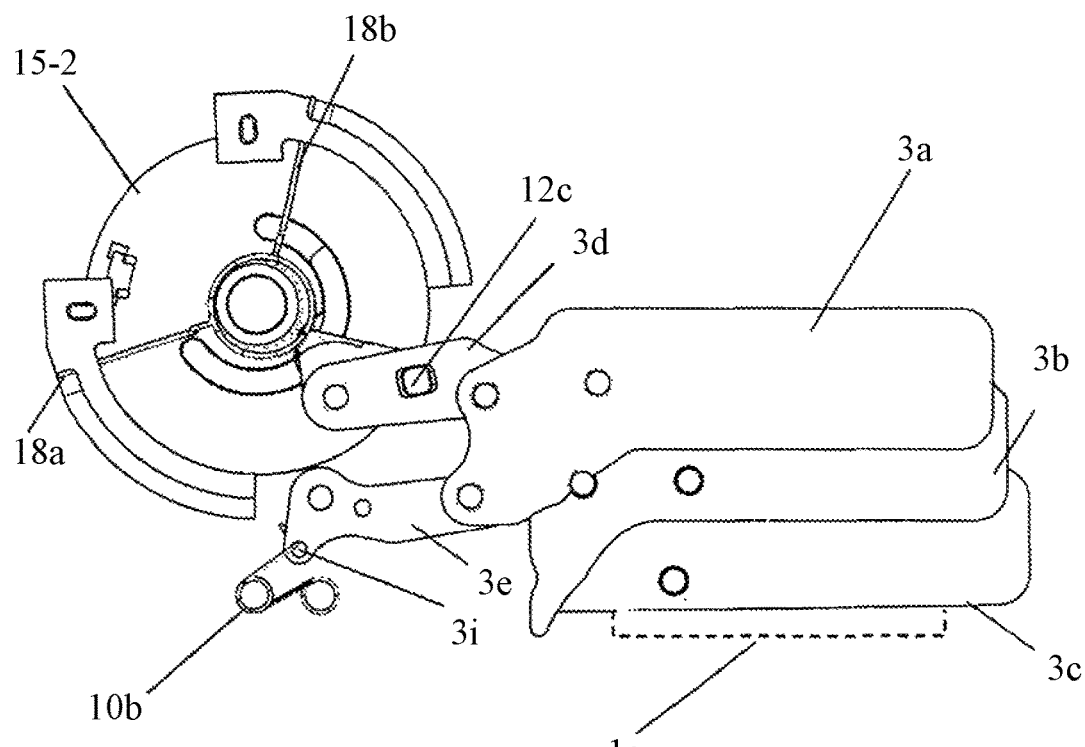

When the cam gear 15 rotates in the counterclockwise direction from the state (timing K) in FIGS. 16A and 16B, the state as illustrated in FIGS. 17A and 17B is attained (timing O). In this section, the cam engagement pin 11b of the first drive member 11 and the cam engagement pin 12b of the second drive member 12 are moved from the second free-running drive area 15g which is the concentric circular cam of the cam gear 15 to the first exposure drive area 15h. As a result, the cam surface 15hc is traced to rotate the first drive member 11 and the second drive member 12.

Figure 18A:
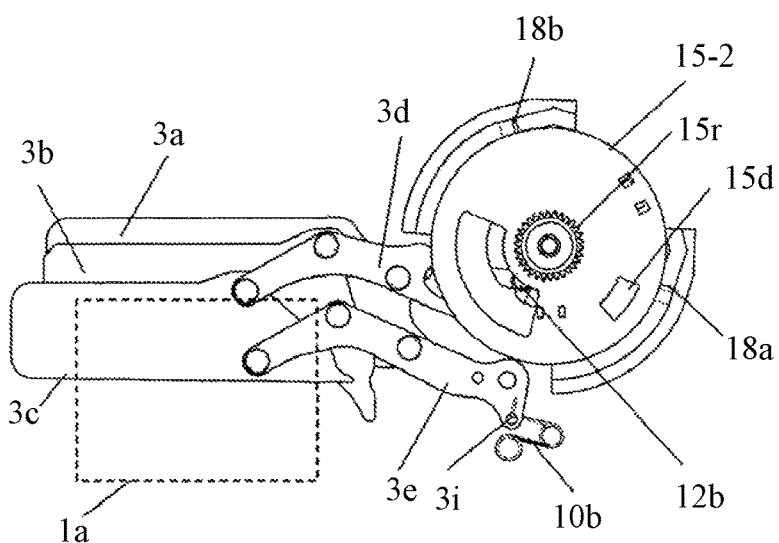
FIGS. 18A to 18C are a front view and a back view of illustrating a state where the blade is running while the drive member of the focal plane shutter is separated from the cam surface of the cam gear in the exposure motion at the time of the even-numbered photographing, and a plan view of the cam gear in Embodiment 1, respectively.
Figure 18B:
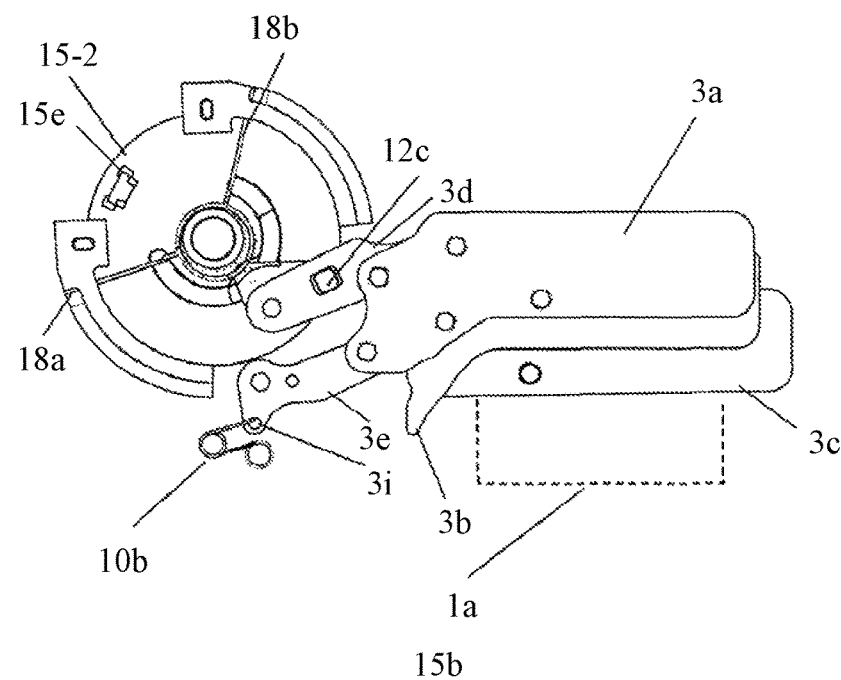
Figure 18C:
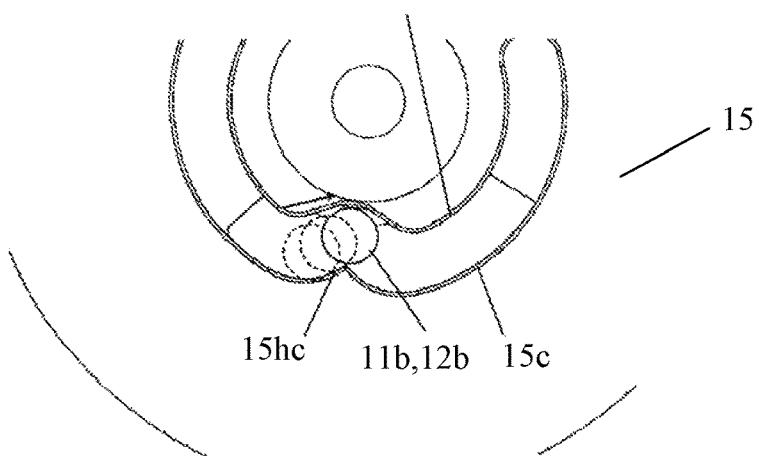

Further, as illustrated in FIGS. 18A and 18B, the cam engagement pins 11*b* and 12*b* move from the first exposure drive area 15*h* to the second exposure drive area 15*i* (timing P). At this time, the cam engagement pin 11*b* of the first drive member 11 and the cam engagement pin 12*b* of the second drive member 12 separate from the cam surface 15*hc*. The first drive member 11 rotates due to the inertia force of the first blade unit 2 rotating in conjunction with the first drive member 11, and the second drive member 12 rotates due to the inertia force of the second blade unit 3 rotating in conjunction with the second drive member 12. Accordingly, in the second exposure drive area 15*i*, the cam engagement pin 11*b* of the first drive member 11 and the cam engagement pin 12*b* of the second drive member do not abut on the cam surface 15*b* and the cam surface 15*c* of the cam gear 15, respectively, as illustrated in FIG. 18C which is a plan view of the cam gear 15.

The biasing direction of the toggle springs 10*a* and 10*b* hooked on the hole 2*i* of the blade arm 2*e* and the hole 3*i* of the blade arm 3*e* is switched in the vicinity of the third switching portion 15*n*, and the first drive member 11 and the second drive member 12 is biased in the clockwise direction by its biasing force. Therefore, the blades 3*a*, 3*b*, and 3*c* which close the aperture 1*a* are opening the aperture 1*a* and the blades 2*a*, 2*b*, and 2*c* which open the aperture 1*a* are closing the aperture 1*a*. Thus, the first blade unit 2 and the second blade unit 3 perform exposure on the image sensor 403 at the shutter speed set by the user.

Therefore, at the time of exposure driving, it is necessary to drive the motor 19 at high speed, and the load fluctuation increases during the drive of the motor 19. At this time, since the motor 19 is driven in the feedback drive mode with a high advance angle, the motor 19 will not step out due to the high-speed drive or the load fluctuation. In addition, since the rotational speed of the motor 19 is sufficiently high by the run-up drive, the motor 19 can be driven at a high speed in the feedback drive mode with a high advance angle. When the running of the blades starts, the change in the rotational driving force of the motor 19 has a relatively small influence on the rotational speed of the cam gear 15 and the degree of synchronization with the electric signal. Therefore, even if the load of the motor 19 fluctuates to some extent, the blades can run stably without causing step-out.

Figure 21:
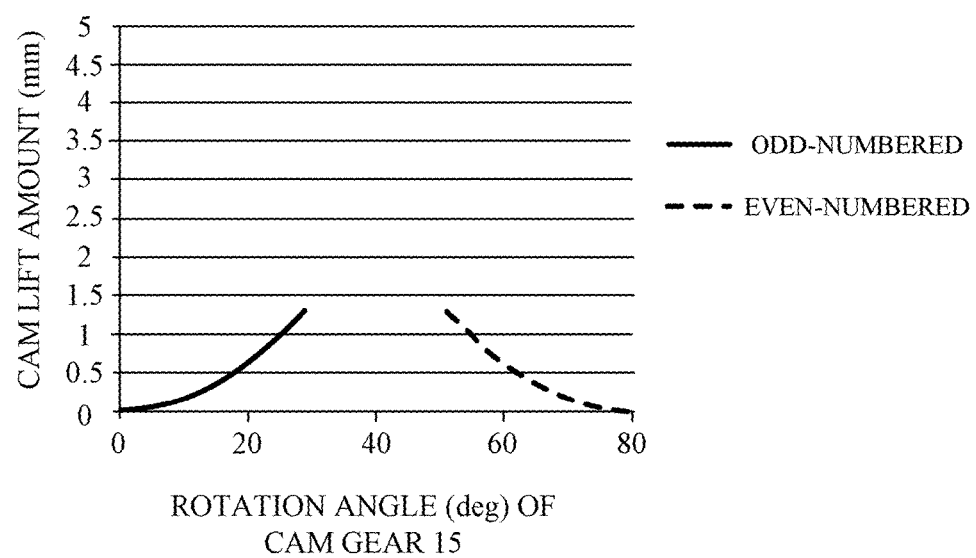
FIG. 21 is a cam diagram of the cam gear of the focal plane shutter in Embodiment 1.

In this embodiment, each blade unit is driven by tracing the cam surface (first cam surface) 15*ic* in the odd-numbered exposure operation and the cam surface (second cam surface) 15*hc* in the even-numbered exposure operation. The cam surface (first cam surface) 15*ic* and the cam surface (second cam surface) 15*hc* of the cam gear 15 are formed symmetrically (in linear symmetry) with respect to a straight line connecting the center of the hole 15*a* and the third switching portion 15*n* (i.e., a straight line extending in the radial direction from the rotation center). As a result, as illustrated in FIG. 21, the cam diagrams drawn by the cam surface 15*ic* and the cam surface 15*hc* are bilaterally symmetrical (symmetrical cam diagrams), and amounts of change are equal. FIG. 21 is a cam diagram of the cam gear 15, where the horizontal axis indicates the rotation angle of the cam gear 15 and the vertical axis indicates a cam lift amount.

Further, in the operation where the first blade unit 2 is closing and opening the aperture 1*a*, the manner of change in the distance from the rotation center of the cam gear 15 to the contact point between the cam surface 15*b* and the cam engagement pin 11*b* are equal to each other. Further, in the operation where the second blade unit 3 is closing and opening the aperture 1*a*, the manner of change in the distance from the rotation center of the cam gear 15 to the contact point between the cam surface 15*b* and the cam engagement pin 12*b* are equal to each other. Accordingly, in the exposure operation, the magnitude of the force acting on the cam engagement pins 11*b* and 12*b* from the cam surface 15*c* is equal in the odd-numbered times and the even-numbered times. As a result, the forces for driving the blades become equal, and a constant exposure operation can be performed regardless of the number of photographs.

(Exposure Running Completed)

Figure 19A:
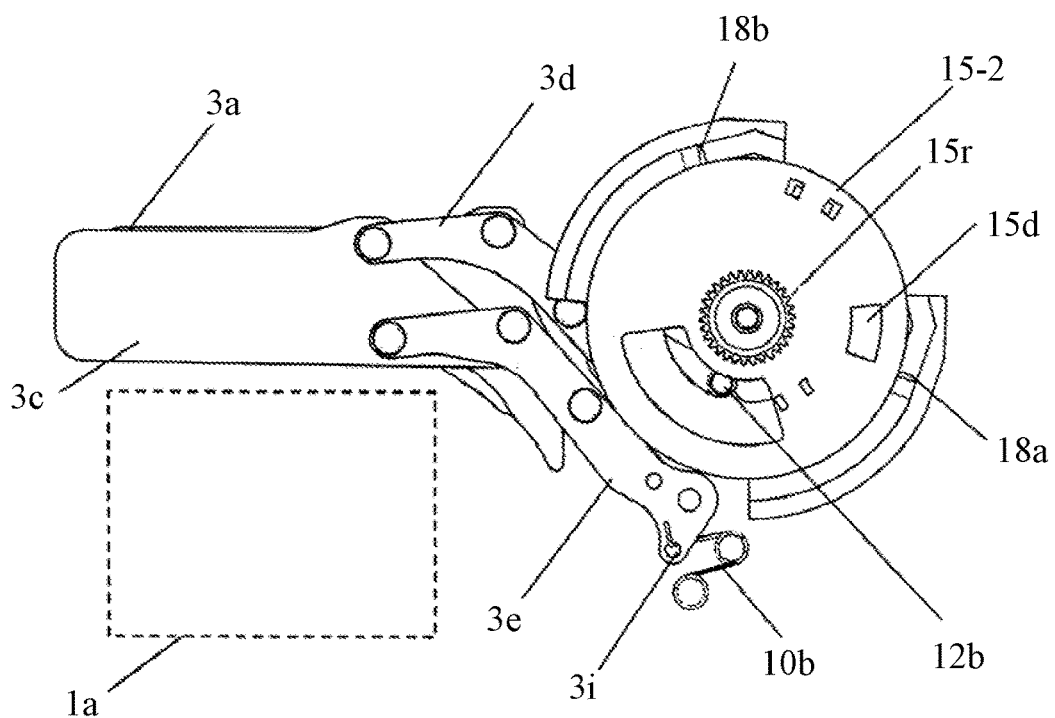
FIGS. 19A and 19B are a front view and a back view of illustrating a state where the drive member of the focal plane shutter is driven by the cam gear in the exposure motion at the time of the even-numbered photographing in Embodiment 1, respectively.
Figure 19B:
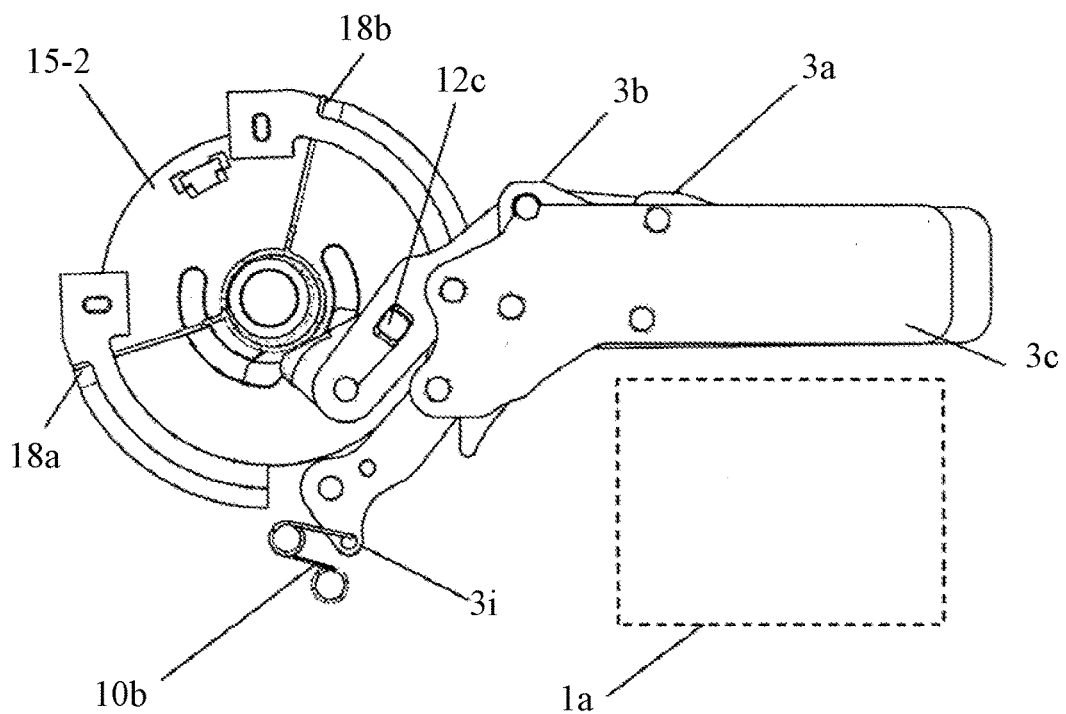

As illustrated in FIGS. 19A and 19B, in the third free-running drive area 15*j*, the cam engagement pins 11*b* and 12*b* start abutting on the cam surface 15*b* on the side closer to the rotation center of the cam gear 15. Then, the cam engagement pins 11*b* and 12*b* trace the cam surface 15*b* to rotate the first drive member 11 and the second drive member 12, respectively.

Figure 20A:
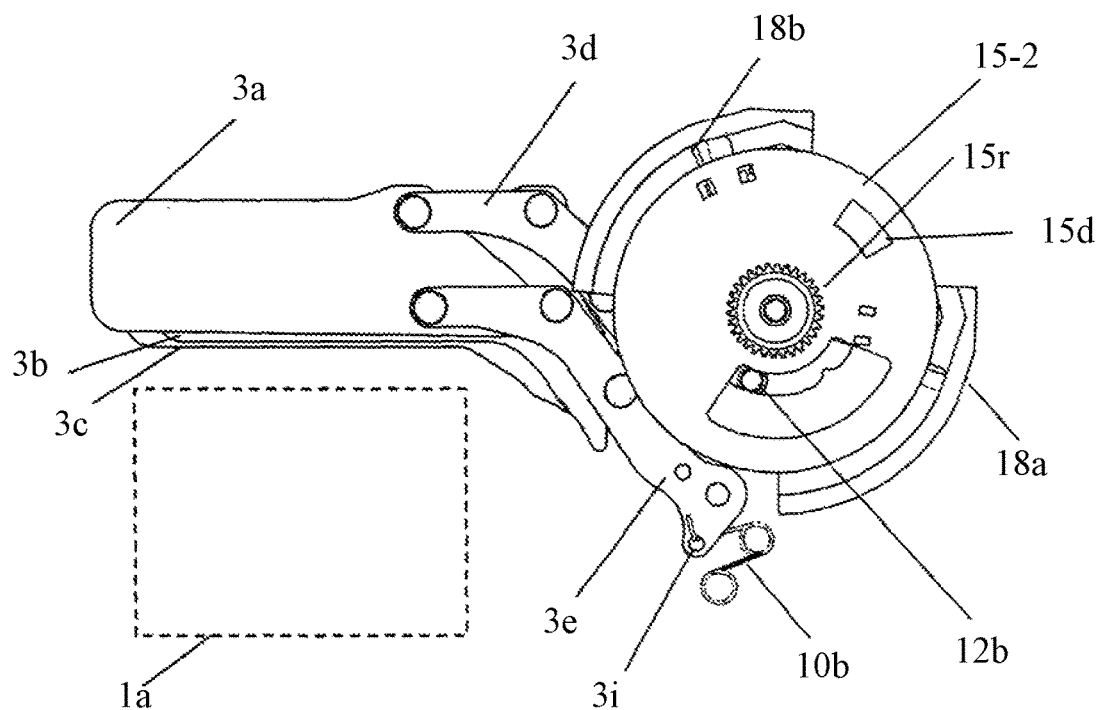
FIGS. 20A and 20B are a front view and a back view of illustrating the blade running completion state of the focal plane shutter at the time of the even-numbered photographing in Embodiment 1, respectively.
Figure 20B:
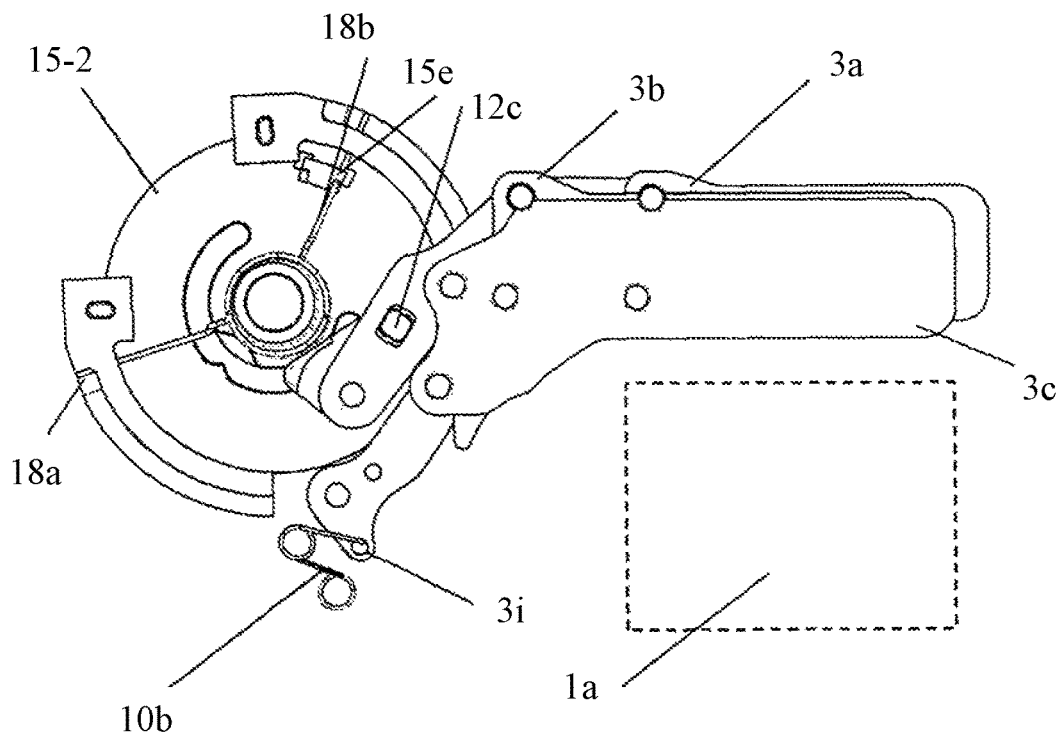

The cam engagement pins 11*b* and 12*b* move from the third free-running drive area 15*j* in the state of FIGS. 19A and 19B to the fourth free-running drive area 15*k* in the state of FIGS. 20A and 20B. At this time, the cam engagement pin 11*b* of the first drive member 11 and the cam engagement pin 12*b* of the second drive member 12 are each slidably fitted and held between the cam surface 15*b* and the cam surface 15*c*. The cam engagement pins 11*b* and 12*b* are concentric with the hole 15*a* in the first free-running drive area 15*k* of the cam gear 15, which does not cause the half-opened state due to bounding.

Embodiment 2

Figure 22A:
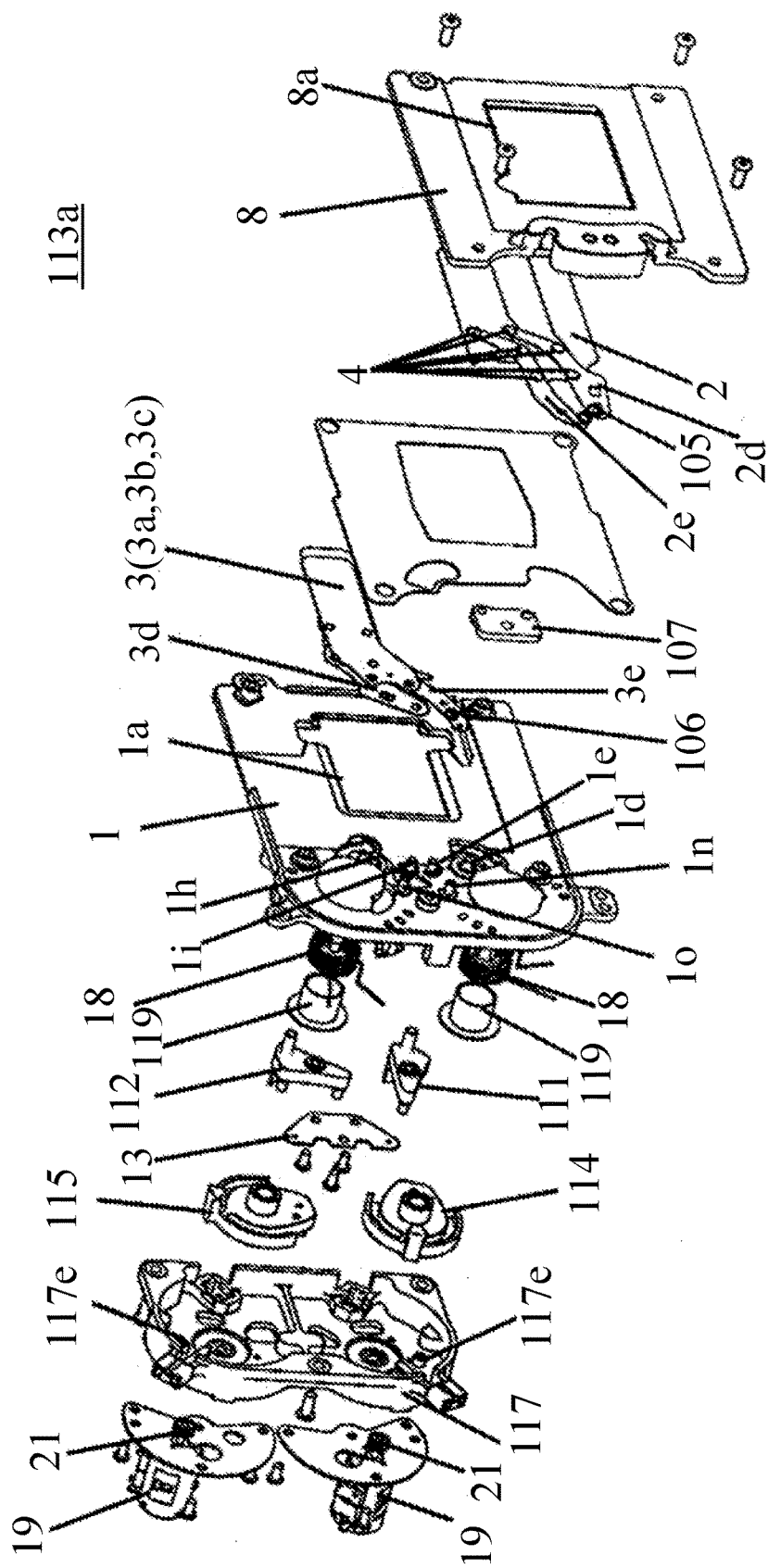
FIG. 22A is an exploded perspective view (seen from the image sensor side) of the focal plane shutter in Embodiment 2 or 3.
Figure 22B:
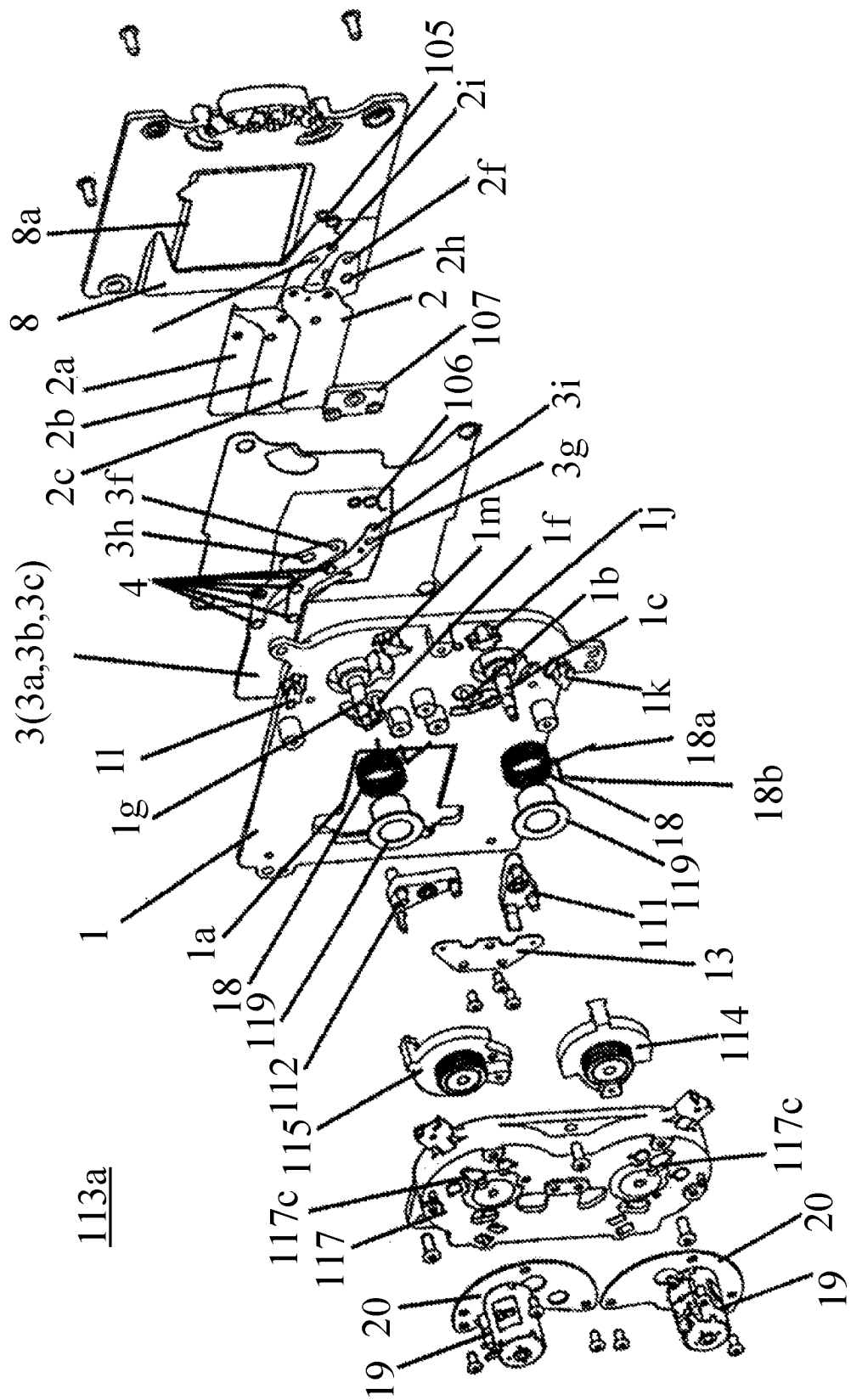
FIG. 22B is an exploded perspective view (seen from the object side) of the focal plane shutter in Embodiment 2 or 3.

Next, referring to FIGS. 22A and 22B, the configuration of a focal plane shutter 113*a* in Embodiment 2 of the present invention will be described. FIG. 22A is an exploded perspective view of the focal plane shutter 113*a* when seen from the image sensor 403, and FIG. 22B is an exploded perspective view when seen from the object side.

A cover plate 8 is attached to the shutter base plate 1 on the side closer to the image sensor 403. A first blade unit 2 and a second blade unit 3 are provided between the shutter base plate 1 and the cover plate 8. The first blade unit 2 includes blades 2*a*, 2*b*, and 2*c* and blade arms 2*d* and 2*e*. The second blade unit 3 includes blades 3*a*, 3*b*, and 3*c* and blade arms 3*d* and 3*e*. Apertures 1*a* and 8*a* (openings) are formed on the shutter base plate 1 and the cover plate 8, respectively. Shafts 1*b*, 1*c*, 1*f*, and 1*g* stands on the object side of the shutter base plate 1. A first drive member 111 is rotatably attached to the shaft 1*b*, a second drive member 112 is rotatably attached to the shaft 1*f*, a cam gear (first cam gear) 114 is rotatably attached to the shaft 1*c*, and a cam gear (second cam gear) 115 is rotatably attached to the shaft 1*g*. Shafts 1*d*, 1*e*, 1*h*, and 1*i* stand on the side closer to the image sensor 403 of the shutter base plate 1, the first blade unit 2 is rotatably attached to the shafts 1*d* and 1*e*, and the second blade unit 3 is rotatably attached to the shafts 1*h* and 1*i*.

Figure 23:
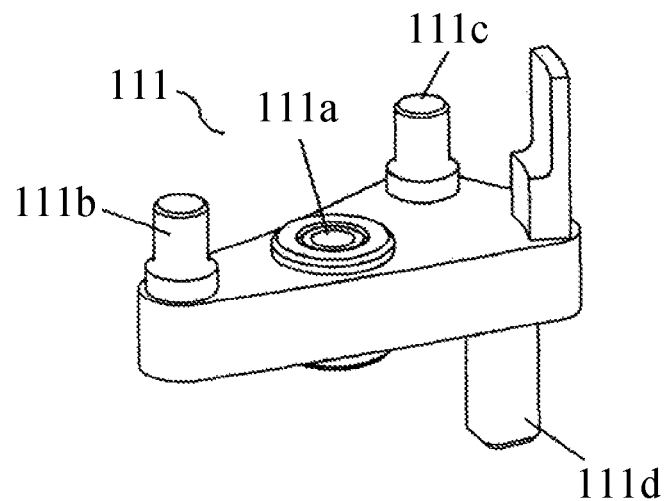
FIG. 23 is a perspective view of a first drive member of the focal plane shutter in Embodiment 2 or 3.
Figure 24:
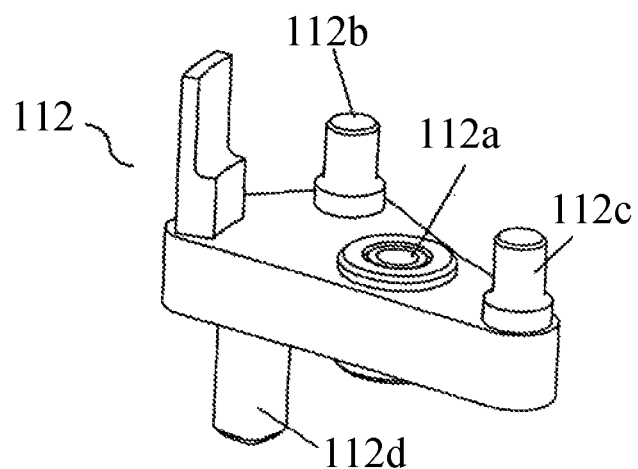
FIG. 24 is a perspective view of a second drive member of the focal plane shutter in Embodiment 2 or 3.

FIG. 23 is a perspective view of the first drive member 111. FIG. 24 is a perspective view of the second drive member 112. The first drive member 111 is rotatable with the hole 111*a* and the shaft 1*b* of the shutter base plate 1 fitted. A first cam engagement pin (first cam engagement member) 111*b* and a second cam engagement pin (first cam engagement member) 111*c* of the first drive member 111 abut on a plurality of cam surfaces of a cam gear 114 described below, and the first drive member 111 is driven according to the rotation of the cam gear 114. The second drive member 112 is rotatable with the hole 112*a* and the shaft 1*f* of the shutter base plate 1 fitted. A first cam engagement pin (second cam engagement member) 112b and a second cam engagement pin (second cam engagement member) 112c of the second drive member 112 abut on a plurality of cam surfaces of the cam gears 115, and the second drive member 112 is driven according to the rotation of the cam gear 115. The first cam engagement pin 111b and the second cam engagement pin 111c of the first drive member 111, and the first cam engagement pin 112b and the second cam engagement pin 112c of the second drive member 112 constitute a cam engaging portion.

The first blade unit 2 includes two blade arms 2d and 2e and three blades 2a, 2b and 2c. The holes 2f and 2g of the two blade arms 2d and 2e are rotatably pivotally attached to the shafts 1d and 1e on the side closer to the image sensor 403 of the shutter base plate 1, respectively. The three blades 2a, 2b, and 2c are pivotally supported to the other ends of the blade arms 2d and 2e sequentially via a connecting shaft 4. A hole 2h is formed on the blade arm 2, and the drive pin 111d of the first drive member 111 engages with the hole 2h. With such a configuration, according to the rotation of the first drive member 111, the first blade unit 2 is transferable (movable) between a closed state where the blades 2a, 2b, and 2c cover the aperture 1a of the shutter base plate 1 and an open state where they are retracted from the aperture 1a.

The second blade unit 3 includes two blade arms 3d and 3e and three blades 3a, 3b, and 3c. The holes 3f and 3g of the two blade arms 3d and 3e are rotatably pivotally attached to the shafts 1h and 1i on the side closer to the image sensor 403 of the shutter base plate 1, respectively. The three blades 3a, 3b, and 3c are sequentially pivoted to the other ends of the blade arms 3d and 3e via the connecting shaft 4. A hole 3h is formed on the blade arm 3d, and the drive pin 112c of the second drive member 112 engages with the hole 3h. With such a configuration, according to the rotation of the second drive member 112, the second blade unit 3 is transferable (movable) between the closed state where the blades 3a, 3b, and 3c cover the aperture 1a of the shutter base plate 1 and the open state where they are retracted from the aperture 1a.

A first toggle spring (biasing member) 105 is engaged with a shaft 1n provided on the shutter base plate 1 and a hole 2i of the blade arm 2e. As a result, in the open state of the aperture 1a, the blade arm 2e is biased in a direction where the blades 2a, 2b, and 2c open the apertures 1a (i.e., a direction to maintain the open state). On the other hand, in the closed state of the aperture 1a, the blade arm 2e is biased in a direction where the blades 2a, 2b, and 2c close the aperture 1a (i.e., a direction to maintain the closed state). By this biasing force, in the open state of the aperture 1a, the drive pin 111d of the first drive member 111 abuts via the blades 2a, 2b, and 2c and the connecting shaft 4 on the connection side when the blade of the hole 2h of the blade arm 2d drives in a direction to close the aperture 1a. In the closed state of the aperture 1a, the drive pin 111d of the first drive member 111 abuts via the blades 2a, 2b, and 2c and the connecting shaft 4 on the connection side when the blade of the hole 2h of the blade arm 2d drives in a direction to open the aperture 1a. A motion of the toggle spring 105 in a direction toward the shaft in is restricted by a toggle spring holding member 107.

A second toggle spring (biasing member) 106 is engaged with a shaft 1o provided on the shutter base plate 1 and a hole 3i of the blade arm 3e. As a result, in the open state of the aperture 1a, the blade arm 3e is biased in a direction where the blades 3a, 3b, and 3c open the apertures 1a (i.e., a direction to maintain the open state). On the other hand, in the closed state of the aperture 1a, the blade arm 3e is biased in a direction where the blades 3a, 3b, and 3c close the aperture 1a (i.e., a direction to maintain the closed state). By this biasing force, in the open state of the aperture 1a, the drive pin 112d of the second drive member 112 abuts via the blades 3a, 3b, and 3c and the connecting shaft 4 on the connection side when the blade of the hole 3h of the blade arm 3d drives in a direction to close the aperture 1a. In the closed state of the aperture 1a, the drive pin 112d of the second drive member 112 abuts via the blades 3a, 3b, and 3c and the connecting shaft 4 on the connection side when the blade of the hole 3h of the blade arm 3d drives in a direction to open the aperture 1a. A motion of the second toggle spring 106 in a direction toward the shaft 1o is restricted by a toggle spring holding member 107.

A spring guide member 119 is externally fitted around the shaft 1c and the shaft 1g of the shutter base plate 1. An inner diameter portion of the drive spring 18 is guided by the outer periphery of the spring guide member 119, the arm portion 18a is locked on locking portions 1j and 1l of the shutter base plate 1, and the arm portion 18b is locked on locking portion 1k and 1m of the shutter base plate 1. The arm portions 18a and 18b are charged by the cam gears 114 and 115 described below, respectively, such that the biasing force occur in the clockwise direction for the arm portion 18a and in the counterclockwise direction for the arm portion 18b when seen from the object side.

Figure 25A:
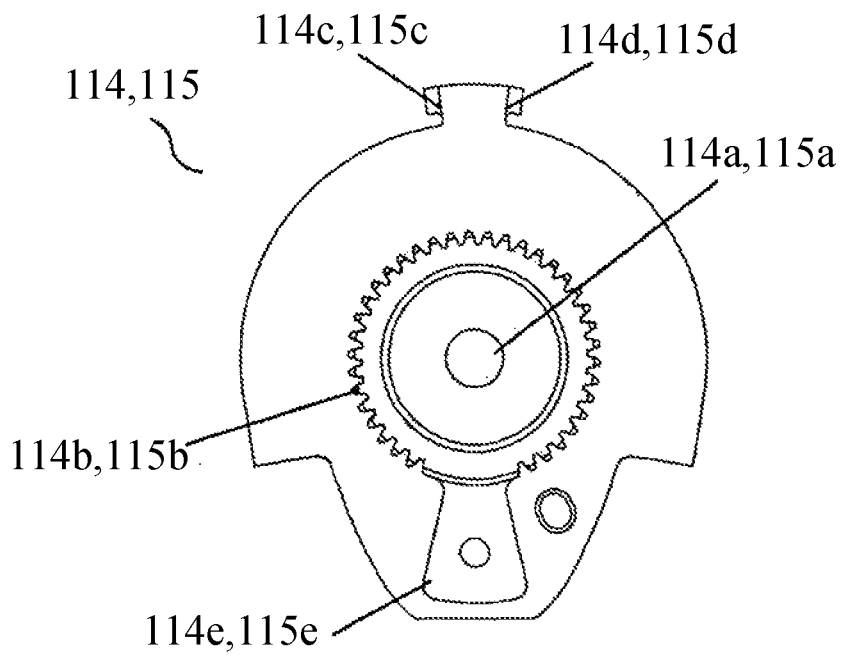
FIGS. 25A and 25B are a front view and a back view of the cam gear of the focal plane shutter in Embodiment 2 or 3, respectively.
Figure 25B:
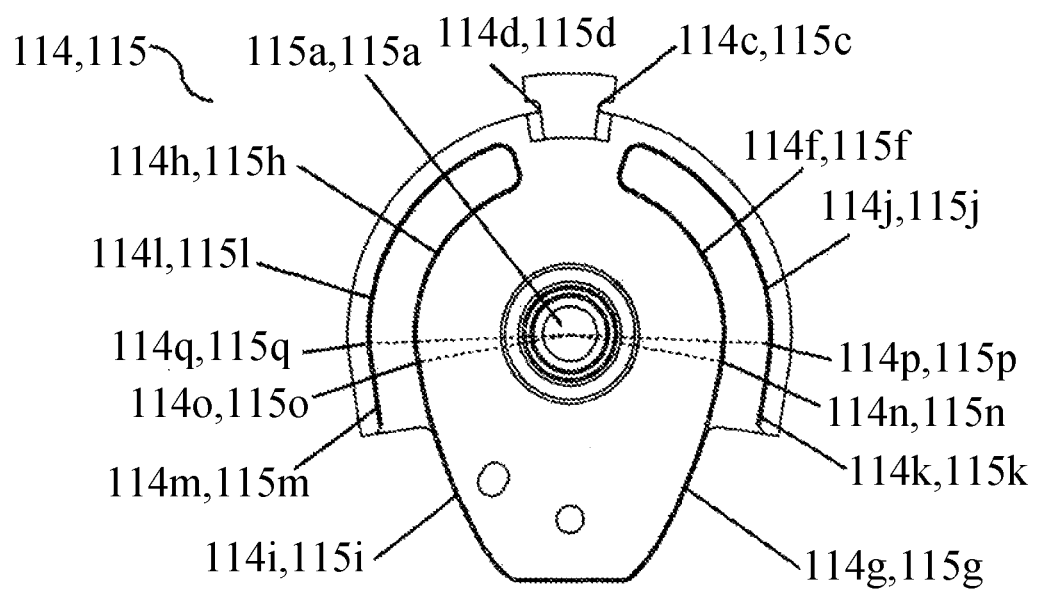
Figure 36:
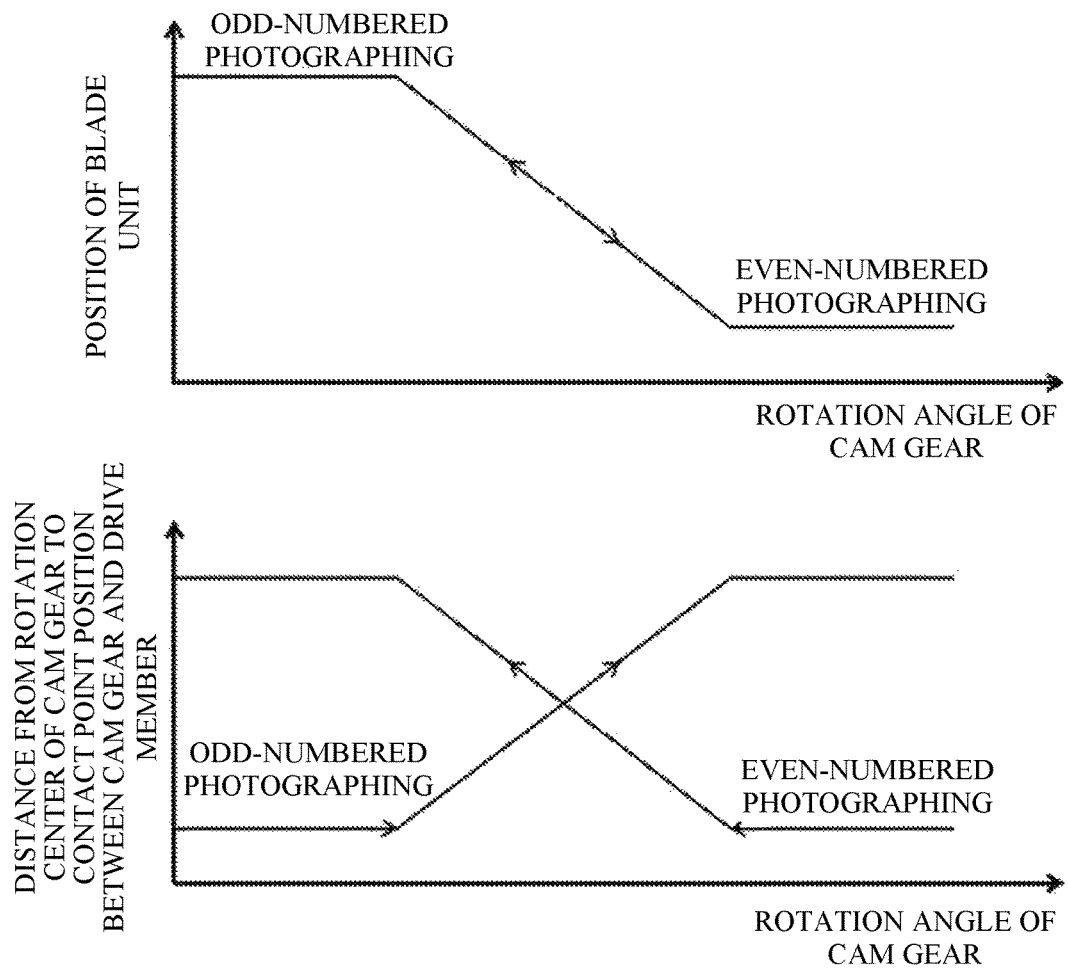
FIG. 36 is a diagram of illustrating a relationship between a rotation angle and a blade position of the cam gear of the focal plane shutter and a cam diagram of the cam gear in Embodiment 2 or 3.

Next, referring to FIGS. 25A and 25B and FIG. 36, the configuration of the cam gears 114 and 115 will be described. The cam gear 114 is rotatable while a hole 114a of the cam gear 114 and the shaft 1c of the shutter base plate 1 are fitted. The cam gear 114 is provided with notches 114c and 114d. When the cam gear 114 rotates by a predetermined angle in the counterclockwise direction as seen from the object side, the arm portion 18a of the drive spring 18 engages with the notch 114c, and the cam gear 114 receives a biasing force in the clockwise direction as seen from the object side. When the cam gear 114 further rotates in the counterclockwise direction as seen from the object side, a movable end portion 114e of the cam gear 114 comes into contact with the contact surface 117e of the holder member 117, and a rotation phase of the cam gear 114 is regulated. When the cam gear 114 rotates by a predetermined angle in the clockwise direction as seen from the object side, the arm portion 18b of the drive spring 18 engages with the notch 114d, and the cam gear 114 receives a biasing force in the counterclockwise direction as seen from the object side. When the cam gear 114 further rotates in the clockwise direction as seen from the object side, the movable end portion 114e of the cam gear 114 comes into contact with the contact surface 117e of the holder member 117, and the rotation phase of the cam gear 114 is regulated.

The cam gear 114 is concentrically formed with the hole 114a and has a first free-running drive cam surface 114f and a first exposure drive cam surface 114g. The first free-running drive cam surface 114f holds the first blade unit 2 in an expanded state via the first cam engagement pin 111b of the drive member 111. The first exposure drive cam surface (second cam surface) 114g drives the blade unit 2 from the expanded state to a overlapped state via the cam engagement pin 111b, and it moves the aperture 1a from the closed state to the open state. The first free-running drive cam surface 114f and the first exposure drive cam surface 114g are smoothly connected at the first switching portion 114n. Further, the cam gear 114 includes a second free-running drive cam surface 114h and a second exposure drive cam surface 114i that are formed concentrically with the hole 114a. The second free-running drive cam surface 114h holds the first blade unit 2 in the overlapped state via the second cam engagement pin 111c of the drive member 111. The second exposure drive cam surface (first cam surface) 114i drives the blade unit 2 from the overlapped state to the expanded state via the cam engagement pin 111c, and it moves the aperture 1a from the open state to the closed state. The second free-running drive cam surface 114h and the second exposure drive cam surface 114i are smoothly connected at the second switching portion 114o.

The smaller the difference in radius between the first free-running drive cam surface 114f and the second free-running drive cam surface 114h is, the smaller the difference in drive force between the first exposure drive cam surface 114g and the second exposure drive cam surface 114g received by the drive member 111 at the moment when the blade unit 2 starts to be driven. It is preferable that the radii of the first free-running drive cam surface 114f and the second free-running drive cam surface 114h are equal to each other in order to equalize the expanding speed and the overlapping speed of the first blade unit 2 by the drive force of the cam gear 114. In this embodiment, as illustrated in FIG. 36, when the drive conditions of the motor are equal in the odd-numbered photographing and the even-numbered photographing described below, the drive member 111 traces the first exposure drive cam surface 114g and the second exposure drive cam surface 114i that are illustrated in the same (symmetrical) cam diagrams. As a result, the drive speeds of the first blade unit 2 becomes equal.

Further, the cam gear 114 includes a first holding cam surface 114j concentrically formed with the hole 114a, and a first receiving cam surface 114k smoothly connected to the first holding cam surface 114j at a third switching portion 114p. The first free-running drive cam surface 114f and the first holding cam surface 114j have a predetermined width, and the width of the first free-running drive cam surface 114f, the first exposure drive cam surface 114g, and the first receiving cam surface 114k is widened from the third switching portion 114p toward the other end. The cam gear 114 includes a second holding cam surface 114l concentrically formed with the hole 114a, and a second receiving cam surface 114m smoothly connected to the second holding cam surface 114l at a fourth switching portion 114q. The second free-running drive cam surface 114h and the second holding cam surface 114l have a predetermined width, and the width of the second free-running drive cam surface 114h, the second exposure drive cam surface 114i, and the second receiving cam surface 114m is widened from the fourth switching portion 114q toward the other end.

The cam gear 115 is rotatable while the hole 115a and the shaft 1g of the shutter base plate 1 are fitted. The cam gear 115 is provided with notches 115c and 115d, and when the cam gear 115 rotates by a predetermined angle in the counterclockwise direction as seen from the object side, the arm portion 18a of the drive spring 18 is engaged with the notch 115c and the cam gear 115 receives a biasing force in the clockwise direction as seen from the object side. When the cam gear 115 further rotates by a predetermined angle in the counterclockwise direction as seen from the object side, the movable end portion 115e of the cam gear 115 comes into contact with the contact surface 117e of the holder member 117, and the rotation phase of the cam gear 115 is regulated. When the cam gear 115 rotates by a predetermined angle in the clockwise direction as seen from the object side, the arm portion 18b of the drive spring 18 is engaged with the notch 115d, and the cam gear 115 receives a biasing force in the counterclockwise direction as seen from the object side. When the cam gear 115 further rotates by a predetermined angle in the clockwise direction as seen from the object side, the movable end portion 115e of the cam gear 115 comes into contact with the contact surface 117e of the holder member 117, and the rotation phase of the cam gear 115 is regulated.

The cam gear 115 includes a first free-running drive cam surface 115f formed concentrically with the hole 115a, and a first exposure drive cam surface 115g. The cam gear 115 holds the second blade unit 3 in the overlapped state via the first cam engagement pin 112b of the drive member 112 on the first free-running drive cam surface 115f. Further, the cam gear 115 drives the blade unit 3 from the overlapped state to the expanded state via the cam engagement pin 112b on the first exposure drive cam surface (first cam surface) 115g to move the aperture 1a from the open state to the closed state. The first free-running drive cam surface 115f and the first exposure drive cam surface 115g are smoothly connected at the first switching portion 115n.

Further, the cam gear 115 includes a second free-running drive cam surface 115h concentrically formed with the hole 115a, and a second exposure drive cam surface 115i. The cam gear 115 holds the second blade unit 3 in the expanded state via the second cam engagement pin 112c of the drive member 112 on the second free-running drive cam surface 115h. Further, the cam gear 115 drives the second blade unit 3 from the expanded state to the overlapped state via the cam engagement pin 112c on the second exposure drive cam surface (second cam surface) 115i to move the aperture 1a from the closed state to the open state. The second free-running drive cam surface 115h and the second exposure drive cam surface 115i are smoothly connected at the second switching portion 115o.

The smaller the difference in radius between the first free-running drive cam surface 115f and the second free-running drive cam surface 115h is, the smaller the difference in drive force between the first exposure drive cam surface 115g and the second exposure drive cam surface 115g received by the drive member 112 at the moment when the blade unit 3 starts to be driven. It is preferable that the radii of the first free-running drive cam surface 115f and the second free-running drive cam surface 115h are equal to each other in order to equalize the expanding speed and the overlapping speed of the second blade unit 3 by the drive force of the cam gear 115. In this embodiment, as illustrated in FIG. 36, when the drive conditions of the motor are equal in the odd-numbered photographing and the even-numbered photographing described below, the drive member 112 traces the first exposure drive cam surface 115g and the second exposure drive cam surface 115i that are illustrated in the same (symmetrical) cam diagrams. As a result, the drive speeds of the second blade unit 3 becomes equal.

Further, the cam gear 115 includes a first holding cam surface 115j concentrically formed with the hole 115a, and a first receiving cam surface 115k smoothly connected to the first holding cam surface 115j at a third switching portion 115p. The first free-running drive cam surface 115f and the first holding cam surface 115j have a predetermined width, and the width of the first free-running drive cam surface 115f, the first exposure drive cam surface 115g, and the first receiving cam surface 115k is widened from the third switching portion 115p toward the other end. The cam gear 115 includes a second holding cam surface 115l concentrically formed with the hole 115a, and a second receiving cam surface 115m smoothly connected to the second holding cam surface 115l at a fourth switching portion 115q. The second free-running drive cam surface 115h and the second holding cam surface 115l have a predetermined width, and the width of the second free-running drive cam surface 115h, the second exposure drive cam surface 115*i*, and the second receiving cam surface 115*m* is widened from the fourth switching portion 115*q* toward the other end.

In this embodiment, when moving the light shielding member from the open state to the closed state, the drive member (111, 112) abuts on the first cam surface (114*i*, 115*g*) and it does not abut on the second cam surface (114*g*, 115*i*). Further, when moving the light shielding member from the closed state to the open state, the drive member abuts on the second cam surface and it does not abut on the first cam surface. Preferably, the cam engaging portion includes the first cam engagement member (111*b*, 112*c*) and the second cam engagement member (111*c*, 112*b*), and while the first cam engagement member abuts on the first cam surface, the second cam engagement member does not abut on the second cam surface. Further, while the second cam engagement member abuts on the second cam surface, the first cam engagement member does not abut on the first cam surface.

As illustrated in FIGS. 22A and 22B, the motor 19 is attached to the motor plate 20, and the motor plate 20 is attached to the holder member 117. A pinion gear 21 is attached to an output shaft of the motor 19. The pinion gear 21 passes through the hole 117*c* of the holder member 117 and engages with the gear portions 114*b* and 115*b* of the cam gear 114 and 115, and thus the torque from the motor 19 is transmitted to the cam gears 114 and 115. The motor 19 is a stepping motor capable of performing a step drive (open-loop drive) where the energization state of the coil is switched to be driven in accordance with a predetermined time interval.

Figure 26:
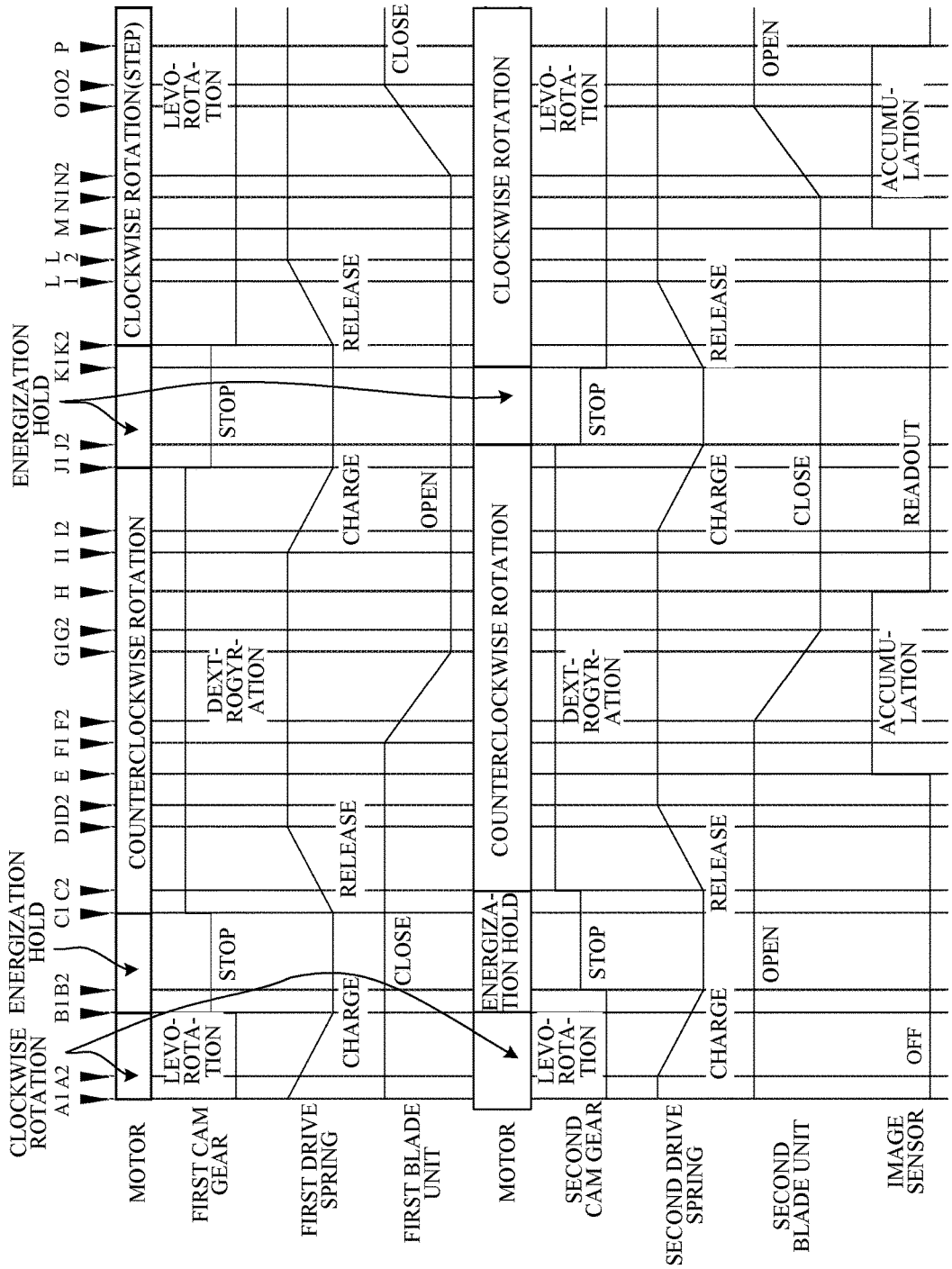
FIG. 26 is a motion timing of the focal plane shutter in Embodiment 2.

Next, referring to FIGS. 26 to 34D, the operation of a rear curtain and front curtain mechanical shutter of the focal plane shutter 113*a* in this embodiment will be described. FIG. 26 is a timing chart of describing the operation of the focal plane shutter 113*a*. FIGS. 27A to 34D are explanatory diagrams of the state of the focal plane shutter 113*a* at the timing (timings A1 to P) illustrated in FIGS. 27A to 34D. In FIGS. 27A to 34D, FIGS. 27A to 34A and FIGS. 27B to 34B illustrate the cam gear 114, the first drive member 111, and the first blade unit 2, FIGS. 27C to 34C and FIGS. 27D to 34D illustrate the cam gear 115, the second drive member 112, and the second blade unit 3. In each drawing, FIGS. 27A to 34A and FIGS. 27C to 34C are front views (views as seen from the object side), FIGS. 27B to 34B and FIGS. 27D to 34D are rear views (views as seen from the image sensor side). The rotation direction (right and left) is defined as the direction of FIGS. 27A to 34A and FIGS. 27C to 34C in each drawing. Accordingly, in each drawing, the left and right direction in FIGS. 27A to 34A is opposite to that in FIGS. 27B to 34B, and the left and right direction in FIGS. 27C to 34C is opposite to that in FIGS. 27D to 34D. Hereinafter, the operation of the focal plane shutter 113*a* in the odd-numbered photographing and the even-numbered photographing in performing the reciprocating exposure will be described.

<Odd-Numbered Photographing>

(Photographing Standby State)

Figure 27A:
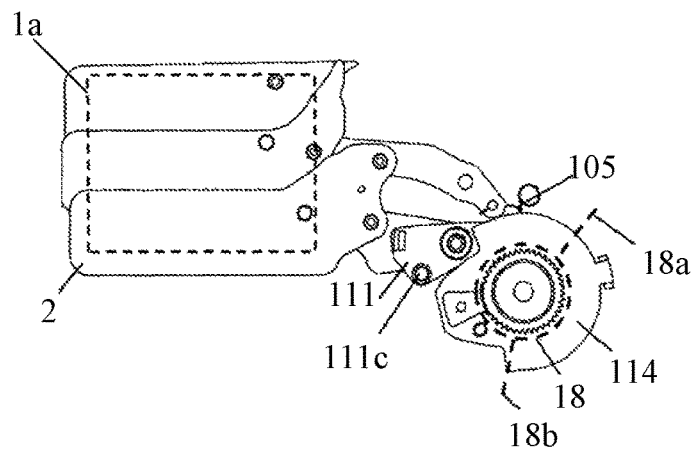
FIGS. 27A to 27D are front views and back views of illustrating a standby state of the focal plane shutter before the odd-numbered photographing in Embodiment 2 or 3.
Figure 27B:
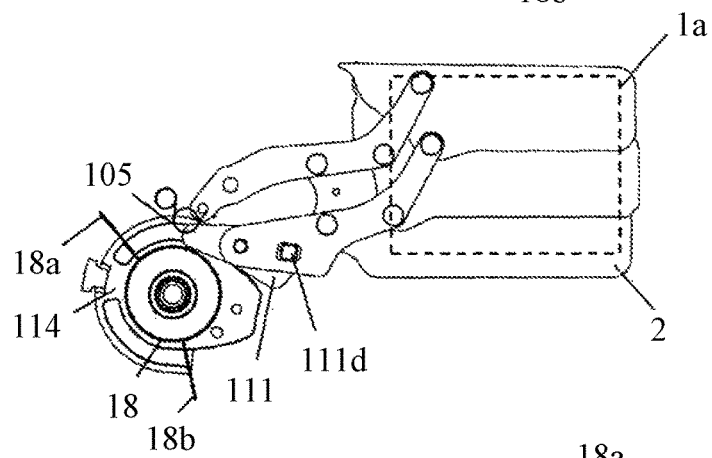

FIGS. 27A to 27D are diagrams of illustrating an odd-numbered standby state of the focal plane shutter 113*a* before photographing. As illustrated in FIGS. 27A and 27B, the blades 2*a*, 2*b*, and 2*c* close the aperture 1*a* at the timing A1 when the image capturing apparatus 400 is in the standby state. At the timing A1, the drive pin 111*d* of the first drive member 111 is biased in a direction where the first blade unit 2 closes the aperture 1*a* by the biasing force of the toggle spring 105 hooked on the hole 2*i* of the blade arm 2*e*. Further, at the timing A1, the first cam engagement pin 111*b* abuts on the first free-running drive cam surface 114*f* of the cam gear 114. At this time, the notch 114*c* disposed on the cam gear 114 does not abut on the arm portion 18*a* of the drive spring 18, and the drive spring 18 is not charged, which is in a natural state.

Figure 27C:
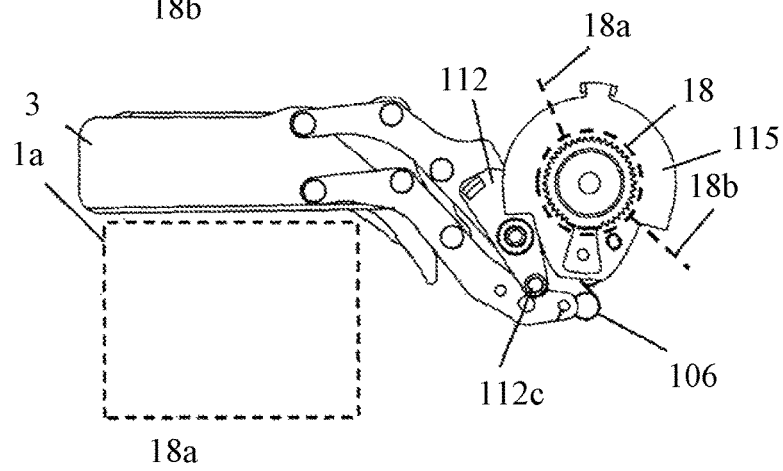
Figure 27D:
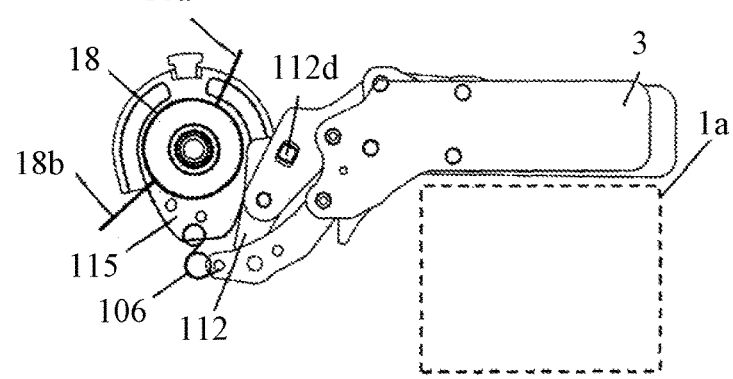

As illustrated in FIGS. 27C and 27D, the blades 3*a*, 3*b*, and 3*c* open the aperture 1*a* at the timing A2 when the image capturing apparatus 400 is in the standby state. At the timing A2, the drive pin 112*d* of the second drive member 112 is biased in a direction where the second blade unit 3 opens the aperture 1*a* by the biasing force of the toggle spring 106 hooked on the hole 3*i* of the blade arm 3*e*. Further, at the timing A2, the first cam engagement pin 112*b* abuts on the first free-running drive cam surface 115*f* of the cam gear 115. At this time, the notch 115*c* disposed on the cam gear 115 does not abut on the arm portion 18*a* of the drive spring 18, and the drive spring 18 is not charged, which is in a natural state.

(Charged State)

When the switch (SW1) 498 is turned on at the timing A1, the motor 19 is driven in the clockwise direction, and accordingly the cam gear 114 rotates in the counterclockwise direction from the state of FIGS. 27A and 27B. Here, since the pinion gear 21 of the motor 19 and the gear portion 114*b* of the cam gear 114 are engaged with each other, the rotational direction of the motor 19 and the rotational direction of the cam gear 114 are opposite to each other.

When the cam gear 114 rotates in the counterclockwise direction from the state (timing A1) in FIGS. 27A and 27B, the notch 114*c* disposed on the cam gear 114 abuts on the arm portion 18*a* of the drive spring 18 and it rotates while charging. The drive circuit 313 starts energizing the motor 19 and rotates the cam gear 114 by the number of steps equal to or greater than the number of steps by which the movable end portion 114*e* of the cam gear 114 makes contact with the contact surface 117*e* of the holder member 117, and then it holds the motor 19 by the energization. Accordingly, the movable end portion 114*e* of the cam gear 114 comes into contact with the contact surface 117*e* of the holder member 117, and the rotation of the cam gear 114 is stopped.

Figure 28A:
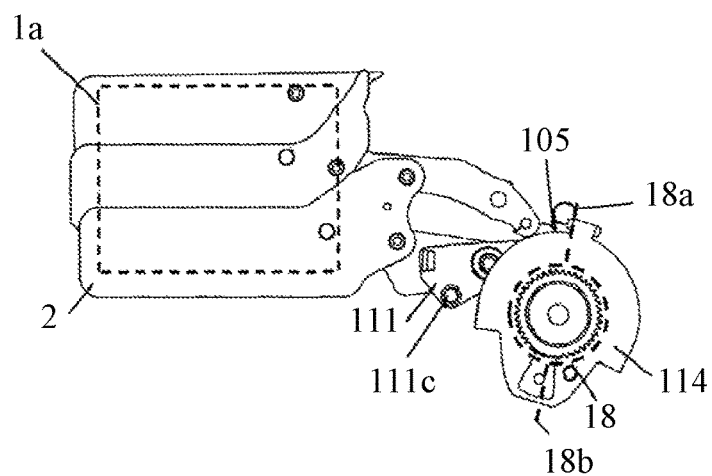
FIGS. 28A to 28D are front views and back views of illustrating a state where the cam gear of the focal plane shutter charges the drive spring at the time of the odd-numbered photographing in Embodiment 2 or 3.
Figure 28B:
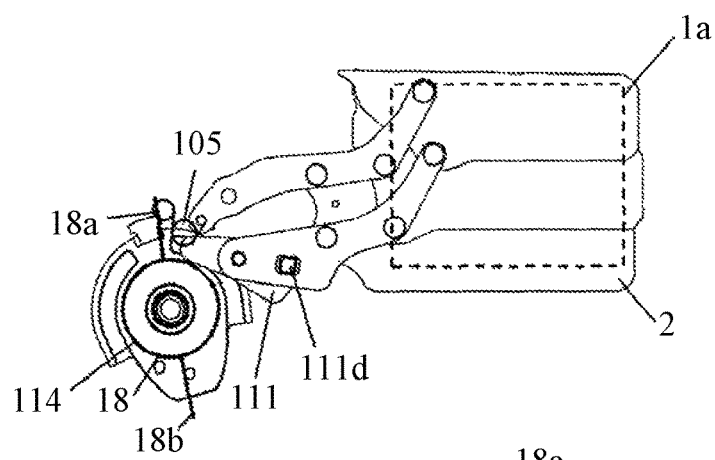

In a state of FIGS. 28A and 28B (timing B1), since the drive spring 18 is in a charged state, the cam gear 114 is biased in the clockwise direction by the drive spring 18. As illustrated in FIGS. 28A and 28B, the blades 2*a*, 2*b*, and 2*c* close the aperture 1*a* at the timing B1.

When a predetermined time elapses from the timing A1, the timing A1 is transferred to the timing A2, and the motor 19 is driven in the clockwise direction. Accordingly, the cam gear 115 rotates in the counterclockwise direction from the state of FIGS. 27C and 27D. Here, since the pinion gear 21 of the motor 19 and the gear portion 115*b* of the cam gear 115 are engaged with each other, the rotational direction of the motor 19 and the rotational direction of the cam gear 114 are opposite to each other.

When the cam gear 115 rotates in the counterclockwise direction from the state (timing A2) in FIGS. 27C and 27D, the notch 115*c* disposed on the cam gear 115 abuts on the arm portion 18*a* of the drive spring 18 and it rotates while charging. The drive circuit 313 starts energizing the motor 19 and rotates the cam gear 115 by the number of steps equal to or greater than the number of steps by which the movable end portion 115*e* of the cam gear 115 makes contact with the contact surface 117*e* of the holder member 117, and then it holds the motor 19 by the energization. Accordingly, the movable end portion 115*e* of the cam gear 115 comes into contact with the contact surface 117*e* of the holder member 117, and the rotation of the cam gear 115 is stopped.

Figure 28C:
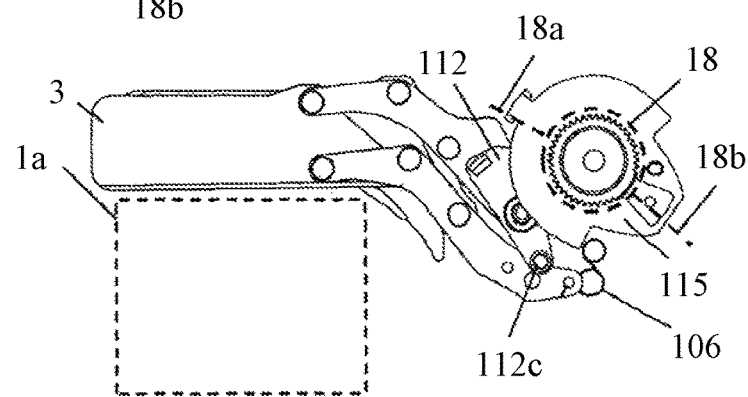
Figure 28D:
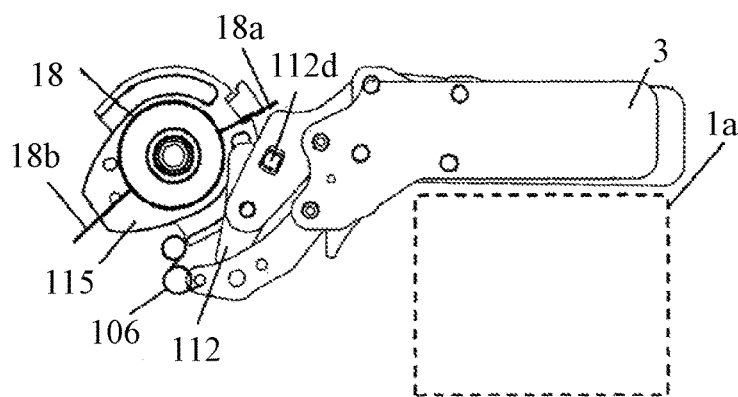

In the state illustrated in FIGS. 28C and 28D (timing B2), since the drive spring 18 is in the charged state, the cam gear 115 is biased in the clockwise direction by the drive spring 18. As illustrated in FIGS. 28A and 28B, the blades 3a, 3b, and 3c open the aperture 1a at the timing B2. When the switch (SW1) 498 of the image capturing apparatus 400 is turned on at the timing AI, a distance measurer (focus detector) (not illustrated) measures a distance to the object, and the lens controller 491 performs the photographing preparation such as driving the image capturing lens to focus.

(Run-Up Drive)

At a timing C1 after the passage of a predetermined time since the switch (SW2) 499 is turned on, the motor 19 is energized in the direction opposite to that in charged state such that the cam gear 114 rotates so as to move the blades 2a, 2b, and 2c in the direction to open the aperture 1a. Further, at a timing C2 after the passage of a predetermined time, the motor 19 is energized in the direction opposite to that in charged state to start run-up drive such that the cam gear 115 rotates so as to move the blades 3a, 3b, and 3c in the direction to close the aperture 1a. In the run-up drive, the width of the predetermined drive pulse is gradually decreased to gradually increase the rotational speed of the motor 19.

When the energization to the motor 19 is started, the cam gear 114 receives the biasing force of the drive spring 18 and it rotates in the clockwise direction to start the run-up. The drive member 111 is biased in a direction where the first blade unit 2 closes the aperture 1a by the biasing force of the toggle spring 105 hooked on the hole 2i of the blade arm 2e. The cam gear 114 starts to accelerate while the first cam engagement pin 111b abuts on the first free-running drive cam surface 114f.

When the energization to the motor 19 is started, the cam gear 115 receives the biasing force of the drive spring 18 and it rotates in the clockwise direction to start the run-up. The drive member 112 is biased in a direction where the second blade unit 3 opens the aperture 1a by the biasing force of the toggle spring 106 hooked on the hole 3i of the blade arm 3e. The cam gear 115 starts to accelerate while the first cam engagement pin 112b abuts on the first free-running drive cam surface 115f. Further, the image sensor 403 performs a reset scanning at a timing E after the passage of a predetermined time since the switch (SW2) 499 is turned on, and it starts accumulation for each line.

(Start Driving Blades)

The drive circuit 313 drives the cam gears 114 and 115 in the clockwise direction in a predetermined step (at timings F1 and F2) after timings C1 and C2. The cam gear 114 rotates in the clockwise direction from the state (timing C1) in FIGS. 28A and 28B. At this time, the first cam engagement pin 111b of the drive member 111 moves from the first free-running drive cam surface 114f, which is the concentric circular cam of the cam gear 114, to the first exposure drive cam surface 114g (timing F1). The first cam engagement pin 111b traces the exposure drive cam surface 114g to rotate the drive member 111, and thus the first blade unit 2 moves the aperture 1a from the closed state to the open state.

Figure 29A:
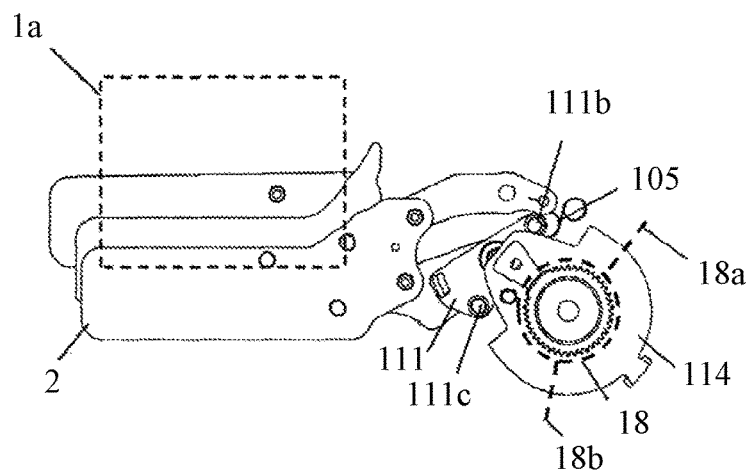
FIGS. 29A to 29D are front views and back views of illustrating a state where the drive member of the focal plane shutter is driven by the cam gear in the exposure motion at the time of the odd-numbered photographing in Embodiment 2 or 3.
Figure 29B:
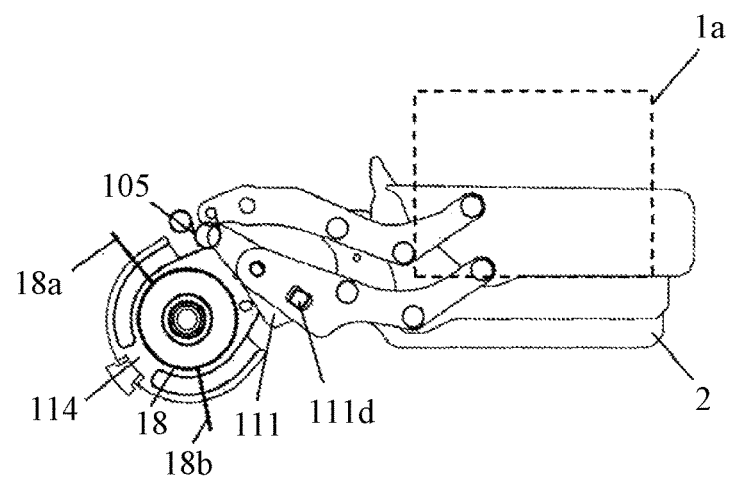

When the cam gear 114 further rotates in the clockwise direction from the state of FIGS. 29A and 29B, the first cam engagement pin 111b of the drive member 111 is separated from the first exposure drive cam surface 114g of the cam gear 114. Then, due to the inertia force of the drive member 111 and the first blade unit 2 rotating in conjunction with the drive member 111, the drive member 111 rotates in the direction where the first blade unit 2 opens the aperture 1a. At this time, the biasing force of the toggle spring 105 is switched, and the drive member 111 is biased by the biasing force of the toggle spring 105 hooked on the hole 2i of the blade arm 2e in the direction where the first blade unit 2 opens the aperture 1a. Therefore, the rotation speed of the drive member 111 and the first blade unit 2 rotating in conjunction with the drive member 111 does not decrease.

The cam gear 115 rotates in the clockwise direction from the state (timing C2) of FIGS. 28C and 28D. At this time, the first cam engagement pin 112b of the drive member 112 moves from the first free-running drive cam surface 115f, which is the concentric circular cam of the cam gear 115, to the first exposure drive cam surface 115g (timing F2). As a result, the first cam engagement pin 112b traces the exposure driving cam surface 115g to rotate the drive member 112, and thus the second blade unit 3 moves the aperture 1a from the open state to the closed state.

Figure 29C:
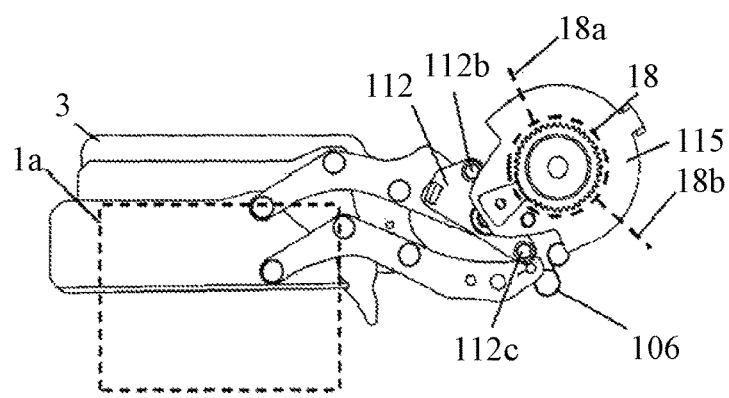
Figure 29D:
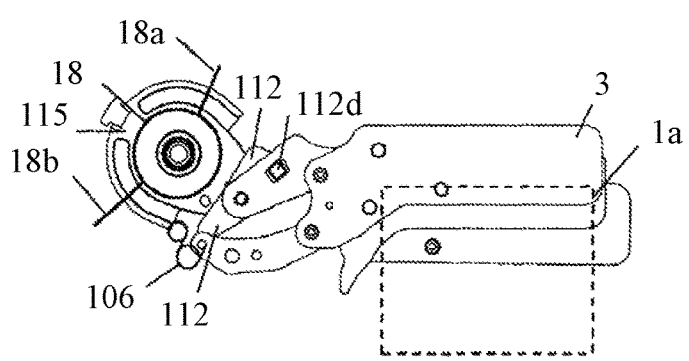

When the cam gear 115 further rotates in the clockwise direction from the state of FIGS. 29C and 29D, the first cam engagement pin 112b of the drive member 112 is separated from the first exposure drive cam surface 115g of the cam gear 115. Then, due to the inertia force of the drive member 112 and the second blade unit 3 rotating in conjunction with the drive member 112, the drive member 112 rotates in the direction where the second blade unit 3 closes the aperture 1a. At this time, the biasing force of the toggle spring 106 is switched, and the drive member 112 is biased by the biasing force of the toggle spring 106 hooked on the hole 3i of the blade arm 3e in the direction where the second blade unit 3 closes the aperture 1a. Therefore, the rotation speed of the drive member 112 and the second blade unit 3 rotating in conjunction with the drive member 112 does not decrease.

As described above, the blades 2a, 2b, and 2c which close the aperture 1a are opening the aperture 1a and the blades 3a, 3b, and 3c which open the aperture 1a are closing the aperture 1a. Thus, the first blade unit 2 and the second blade unit 3 perform exposure on the image sensor 403 at the shutter speed set by the user.

(Exposure Running Completed)

Figure 30A:
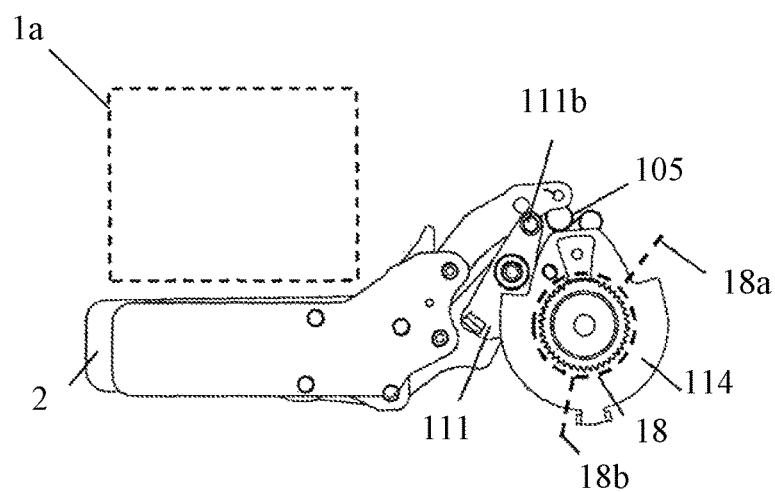
FIGS. 30A to 30D are front views and back views of illustrating the blade running completion state of the focal plane shutter at the time of the odd-numbered photographing in Embodiment 2 or 3.
Figure 30B:
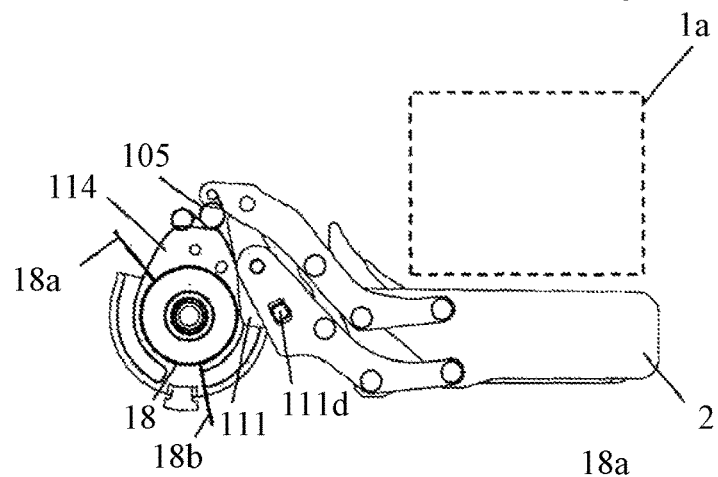

After the cam gear 114 rotates by a predetermined angle from the state of FIGS. 29A and 29B, the state transfers to the state (timing G1) illustrated in FIGS. 30A and 30B. At this time, the second cam engagement pin 111c of the drive member 111 abuts on the second exposure drive cam surface 114i of the cam gear 114, and it decelerates while tracing the second exposure drive cam surface 114i. Therefore, no great impact is applied to the drive member 111 and the first blade unit 2. Further, the second cam engagement pin 111c is induced by the second receiving cam surface 114m of the cam gear 114, and is slidably held by the second free-running drive cam surface 114h and the second holding cam surface 114l. Accordingly, transferring to a half-opened state caused by bounding is avoided.

Figure 30C:
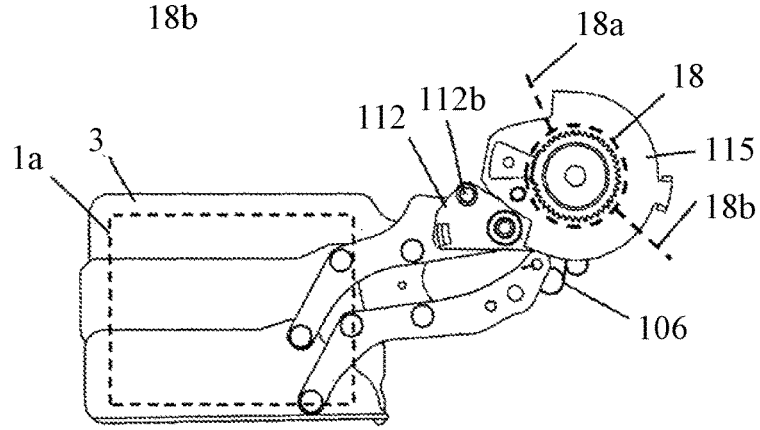
Figure 30D:
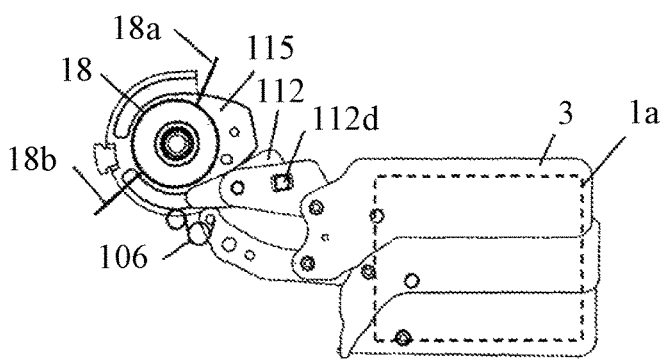

After the cam gear 115 rotates by a predetermined angle from the state of FIGS. 29C and 29D, the state transfers to the state (timing G2) illustrated in FIGS. 30C and 30D. At this time, the second cam engagement pin 112c of the drive member 112 abuts on the second exposure drive cam surface 115i of the cam gear 115, and it decelerates while tracing the second exposure drive cam surface 115i. Therefore, no great impact is applied to the drive member 112 and the second blade unit 3. Further, the second cam engagement pin 112c is induced by the second receiving cam surface 115m of the cam gear 115, and is slidably held by the second free-running drive cam surface 115h and the second holding cam surface 115l. Accordingly, transferring to a half-opened state caused by bounding is avoided.

After the passage of a predetermined time since the completion of the exposure (at timing H), the image capturing apparatus 400 starts still-image readout scanning of the image sensor 403 since the image sensor 403 is shielded by the second blade unit 3.

<Even-Numbered Photographing>
(Photographing Standby State)

Figure 31A:
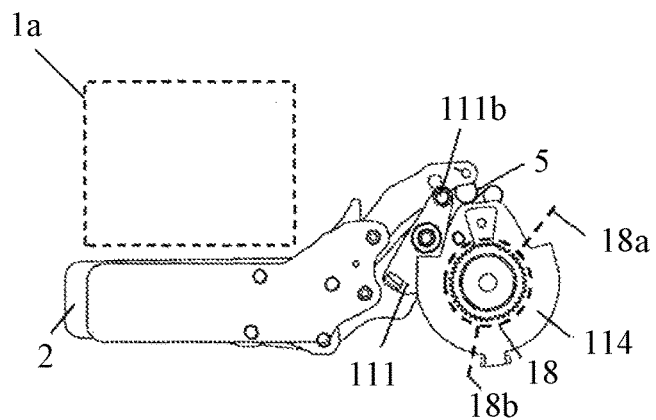
FIGS. 31A to 31D are front views and back views of illustrating the standby state of the focal plane shutter before the odd-numbered photographing in Embodiment 2 or 3.
Figure 31B:
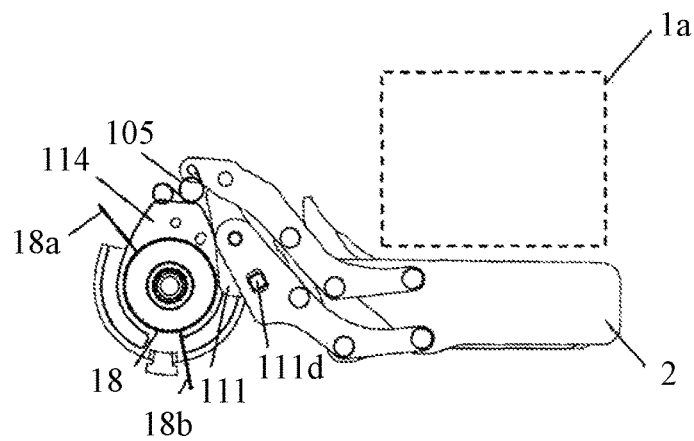

FIGS. 31A to 31D are diagrams of illustrating an even-numbered standby state of the focal plane shutter 113a before photographing. As illustrated in FIGS. 31A and 31B, the blades 2a, 2b, and 2c open the aperture 1a at the timing I1 when the image capturing apparatus 400 is in the standby state. At the timing I1, the drive pin 111d of the first drive member 111 is biased in a direction where the first blade unit 2 closes the aperture 1a by the biasing force of the toggle spring 105 hooked on the hole 2i of the blade arm 2e. The second cam engagement pin 111c abuts on the second free-running drive cam surface 114h of the cam gear 114. At this time, the notch 114d disposed on the cam gear 114 does not abut on the arm portion 18a of the drive spring 18, and the drive spring 18 is not charged, which is in a natural state.

Figure 31C:
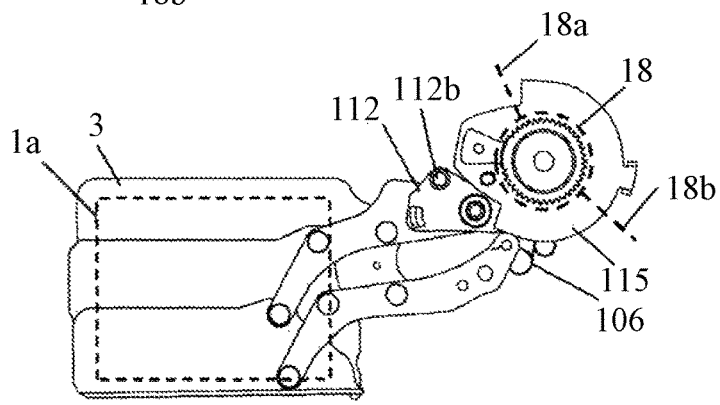
Figure 31D:
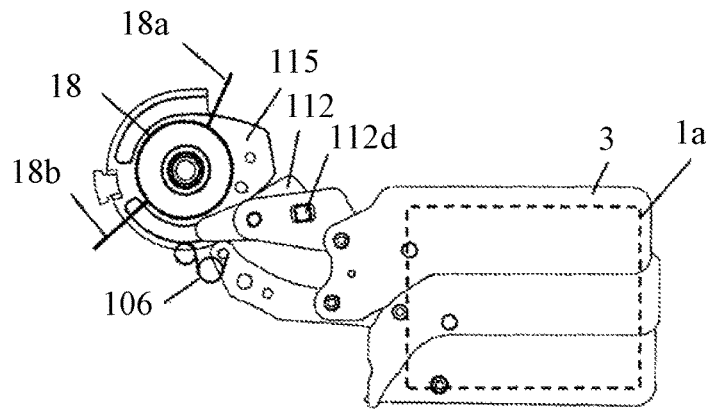

As illustrated in FIGS. 31C and 31D, the blades 3a, 3b, and 3c close the aperture 1a at the timing 12 when the image capturing apparatus 400 is in the standby state. At the timing 12, the drive pin 112d of the second drive member 112 is biased in a direction where the second blade unit 3 closes the aperture 1a by the biasing force of the toggle spring 106 hooked on the hole 3i of the blade arm 3e. The second cam engagement pin 112c abuts on the second free-running drive cam surface 115h of the cam gear 115. At this time, the notch 115d disposed on the cam gear 115 does not abut on the arm portion 18b of the drive spring 18, and the drive spring 18 is not charged, which is in a natural state.

(Charged State)

When the switch (SW1) 498 is turned on at the timing I1, the motor 19 is driven in the counterclockwise direction, and accordingly the cam gear 114 rotates in the clockwise direction from the state of FIGS. 31A and 31B. Here, since the pinion gear 21 of the motor 19 and the gear portion 114b of the cam gear 114 are engaged with each other, the rotational direction of the motor 19 and the rotational direction of the cam gear 114 are opposite to each other.

When the cam gear 114 rotates in the clockwise direction from the state (timing I1) of FIGS. 31A and 31B, the notch 114d disposed on the cam gear 114 abuts on the arm portion 18b of the drive spring 18 and it rotates while charging. The drive circuit 313 starts energizing the motor 19 and rotates the cam gear 114 by the number of steps equal to or greater than the number of steps by which the movable end portion 114e of the cam gear 114 makes contact with the contact surface 117e of the holder member 117, and then it holds the motor 19 by the energization. Accordingly, the movable end portion 114e of the cam gear 114 comes into contact with the contact surface 117e of the holder member 117, and the rotation of the cam gear 114 is stopped.

Figure 32A:
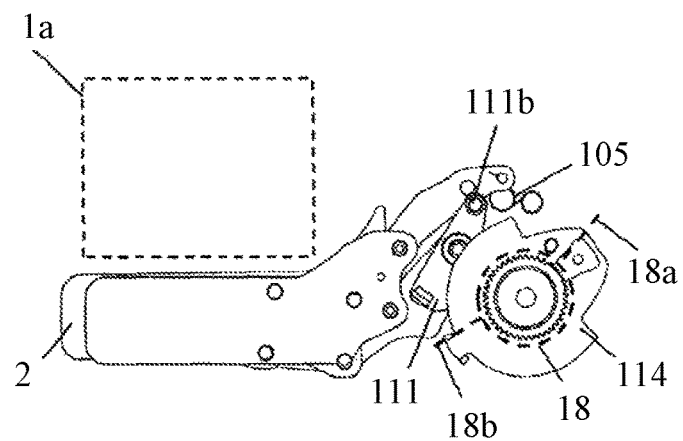
FIGS. 32A to 32D are front views and back views of illustrating the state where the cam gear of the focal plane shutter charges the drive spring at the time of the even-numbered photographing in Embodiment 2 or 3.
Figure 32B:
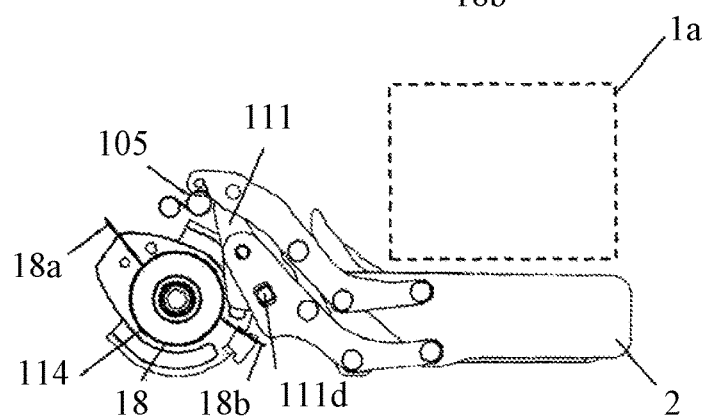

In a state of FIGS. 32A and 32B (timing J1), the drive spring 18 is in the charged state. Therefore, the cam gear 114 is biased by the drive spring 18 in the counterclockwise direction. As illustrated in FIGS. 32A and 32B, the blades 2a, 2b, and 2c open the aperture 1a at the timing J1. When a predetermined time elapses from the timing I1, the timing I1 is transferred to the timing A2, and the motor 19 is driven in the counterclockwise direction. Accordingly, the cam gear 115 rotates in the clockwise direction from the state of FIGS. 31C and 31D. Here, since the pinion gear 21 of the motor 19 and the gear portion 115b of the cam gear 115 are engaged with each other, the rotational direction of the motor 19 and the rotational direction of the cam gear 114 are opposite to each other.

When the cam gear 115 rotates in the clockwise direction from the state (timing I2) of FIGS. 31C and 31D, the notch 115d disposed on the cam gear 115 abuts on the arm portion 18b of the drive spring 18 and it rotates while charging. The drive circuit 313 starts energizing the motor 19 and rotates the cam gear 115 by the number of steps equal to or greater than the number of steps by which the movable end portion 115e of the cam gear 115 makes contact with the contact surface 117e of the holder member 117, and then it holds the motor 19 by the energization. Accordingly, the movable end portion 115e of the cam gear 115 comes into contact with the contact surface 117e of the holder member 117, and the rotation of the cam gear 115 is stopped.

Figure 32C:
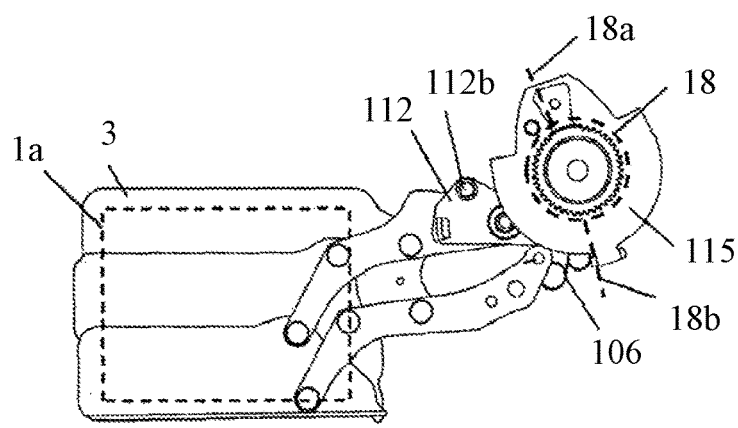
Figure 32D:
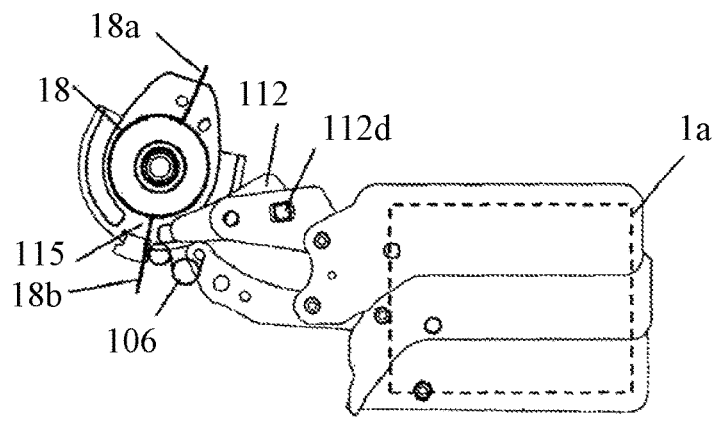

In the state (timing J2) of FIGS. 32C and 32D, the drive spring 18 is in the charged state. Therefore, the cam gear 115 is biased in the counterclockwise direction by the drive spring 18. As illustrated in FIGS. 32C and 32D, the blades 3a, 3b, and 3c close the aperture 1a at the timing J2. When the switch (SW1) 498 of the image capturing apparatus 400 is turned on at the timing I1, a distance measurer (focus detector) (not illustrated) measures a distance to the object, and the lens controller 491 performs the photographing preparation such as driving the image capturing lens to focus.

(Run-Up Drive)

At a timing K1 after the passage of a predetermined time since the switch (SW2) 499 is turned on, the motor 19 is energized in the direction opposite to that in charged state such that the cam gear 115 rotates so as to move the blades 3a, 3b, and 3c in the direction to open the aperture 1a. Further, at a timing K2 after the passage of a predetermined time, the motor 19 is energized in the direction opposite to that in charged state to start run-up drive such that the cam gear 114 rotates so as to move the blades 2a, 2b, and 2c in the direction to close the aperture 1a. In the run-up drive, the width of the predetermined drive pulse is gradually decreased to gradually increase the rotational speed of the motor 19.

When the energization to the motor 19 is started, the cam gear 115 receives the biasing force of the drive spring 18 and it rotates in the counterclockwise direction to start the run-up. The drive member 112 is biased in a direction where the second blade unit 3 closes the aperture 1a by the biasing force of the toggle spring 106 hooked on the hole 3i of the blade arm 3e. The cam gear 115 starts to accelerate while the second cam engagement pin 112c abuts on the second free-running drive cam surface 115h.

When the energization to the motor 19 is started, the cam gear 114 receives the biasing force of the drive spring 18 and it rotates in the counterclockwise direction to start the run-up. The drive member 111 is biased in a direction where the first blade unit 2 opens the aperture 1a by the biasing force of the toggle spring 105 hooked on the hole 2i of the blade arm 2e. The cam gear 114 starts to accelerate while the second cam engagement pin 111c abuts on the second free-running drive cam surface 114f. The image sensor 403 performs a reset scanning after the passage of a predetermined time (timing M) since the switch (SW2) 499 is turned on, and it starts accumulation for each line.

(Start Driving Blades)

The drive circuit 313 drives the cam gears 114 and 115 in the counterclockwise direction in a predetermined step (at timings N1 and N2) after timings K1 and K2. The cam gear 115 rotates in the counterclockwise direction from the state (timing K1) illustrated in FIGS. 32C and 32D. At this time, the second cam engagement pin 112c of the drive member 112 moves from the second free-running drive cam surface 115h, which is the concentric circular cam of the cam gear 115, to the second exposure drive cam surface 115i (timing N1). Thus, the second cam engagement pin 112c traces the exposure drive cam surface 115i to rotate the drive member 112, and therefore the second blade unit 3 moves the aperture 1a from the closed state to the open state.

Figure 33A:
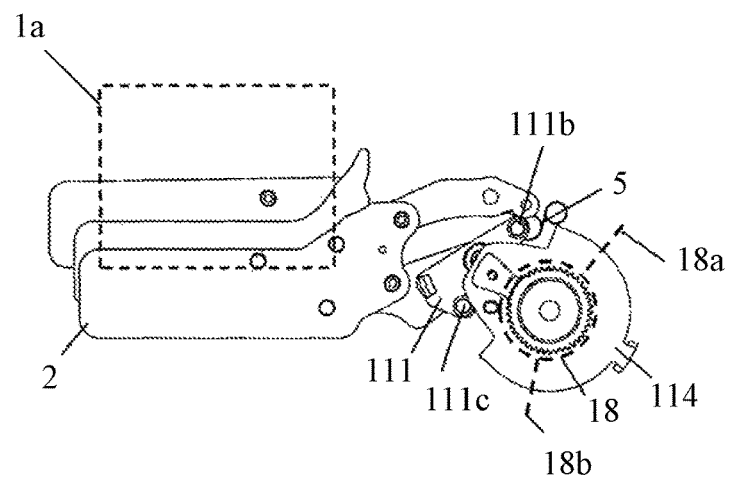
FIGS. 33A to 33D are front views and back views of illustrating the state where the drive member of the focal plane shutter is driven by the cam gear in the exposure motion at the time of the even-numbered photographing in Embodiment 2 or 3.
Figure 33B:
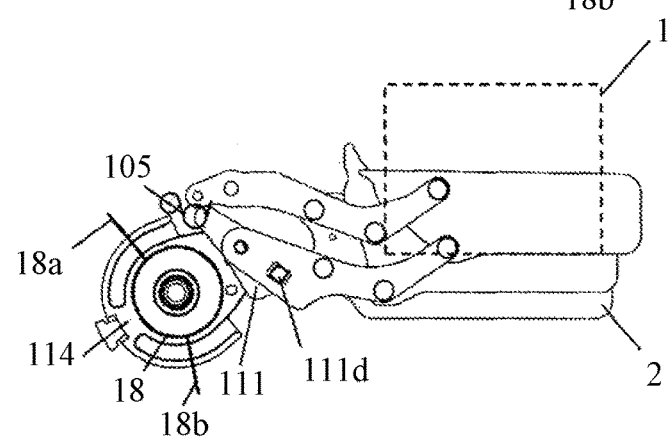
Figure 33C:
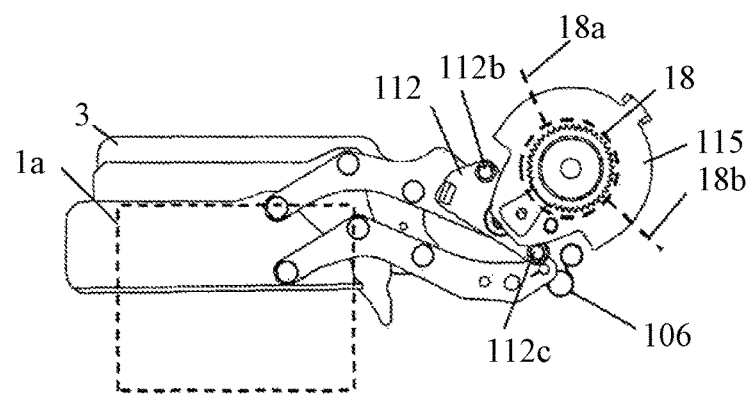
Figure 33D:
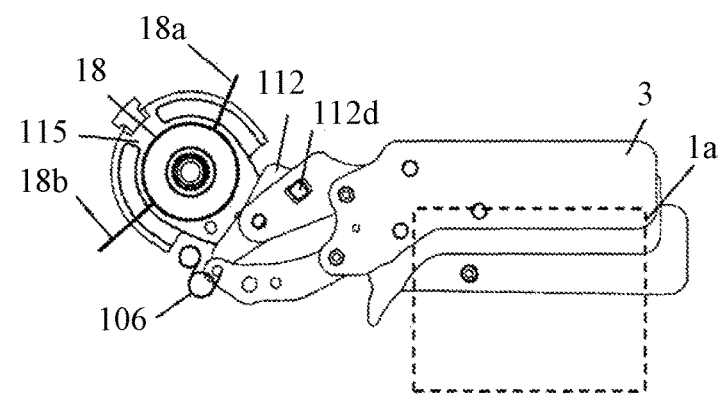

When the cam gear 115 further rotates in the counterclockwise direction from the state of FIGS. 33C and 33D, the second cam engagement pin 112c of the drive member 112 is separated from the second exposure drive cam surface 115i of the cam gear 115. Then, due to the inertia force of the drive member 112 and the second blade unit 3 rotating in conjunction with the drive member 112, the drive member 112 rotates in the direction where the second blade unit 3 opens the aperture 1a. At this time, the biasing force of the toggle spring 106 is switched, and the drive member 112 is biased by the biasing force of the toggle spring 106 hooked on the hole 3i of the blade arm 3e in the direction where the second blade unit 3 opens the aperture 1a. Therefore, the rotation speed of the drive member 112 and the second blade unit 3 rotating in conjunction with the drive member 112 does not decrease.

The cam gear 114 rotates in the counterclockwise direction from the state (timing K2) illustrated in FIGS. 32A and 32B. At this time, the second cam engagement pin 111c of the drive member 111 moves from the second free-running drive cam surface 114h, which is the concentric circular cam of the cam gear 114, to the second exposure drive cam surface 114i (timing N2). As a result, the second cam engagement pin 111c traces the exposure driving cam surface 114i to rotate the drive member 111, and thus the first blade unit 2 moves the aperture 1a from the open state to the closed state.

When the cam gear 114 further rotates in the counterclockwise direction from the state of FIGS. 33A and 33B, the second cam engagement pin 111c of the drive member 111 is separated from the second exposure drive cam surface 114i of the cam gear 114. Then, due to the inertia force of the drive member 111 and the first blade unit 2 rotating in conjunction with the drive member 111, the drive member 111 rotates in the direction where the first blade unit 2 closes the aperture 1a. At this time, the biasing force of the toggle spring 105 is switched, and the drive member 111 is biased by the biasing force of the toggle spring 105 hooked on the hole 2i of the blade arm 2e in the direction where the first blade unit 2 closes the aperture 1a. Therefore, the rotation speed of the drive member 111 and the first blade unit 2 rotating in conjunction with the drive member 111 does not decrease.

As described above, the blades 3a, 3b, and 3c which close the aperture 1a are opening the aperture 1a and the blades 2a, 2b, and 2c which open the aperture 1a are closing the aperture 1a. Thus, the first blade unit 2 and the second blade unit 3 perform exposure on the image sensor 403 at the shutter speed set by the user.

(Exposure Running Completed)

Figure 34A:
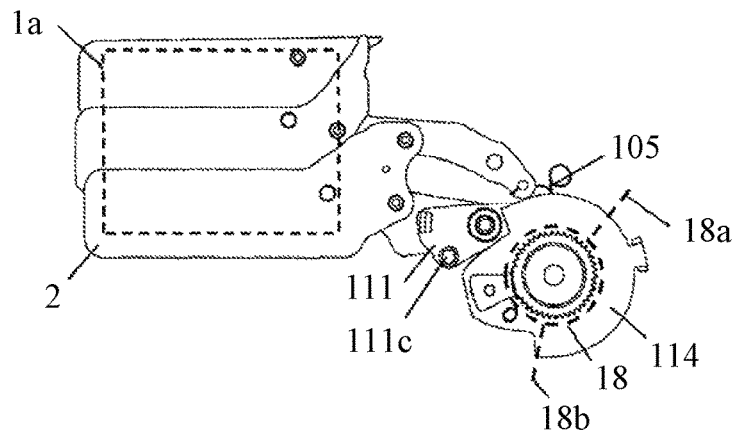
FIGS. 34A to 34D are front views and back views of illustrating the blade running completion state of the focal plane shutter at the time of the even-numbered photographing in Embodiment 2 or 3.
Figure 34B:
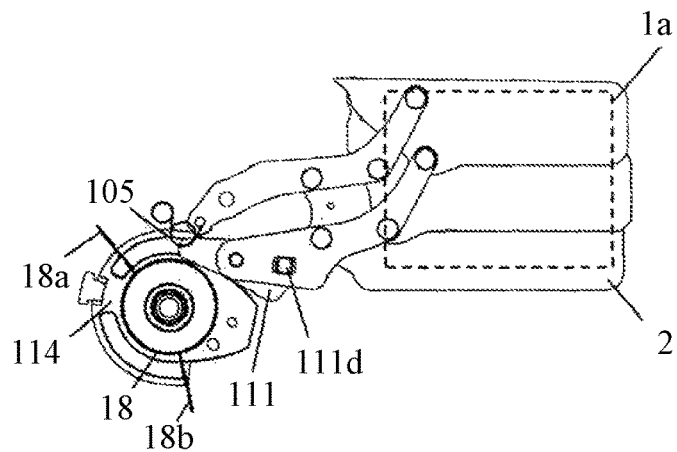
Figure 34C:
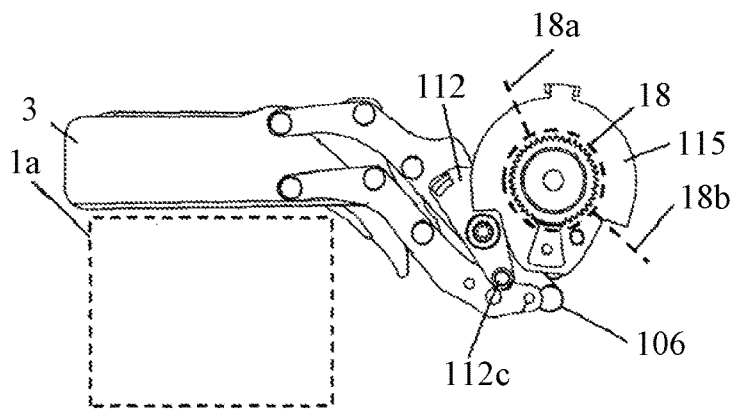
Figure 34D:
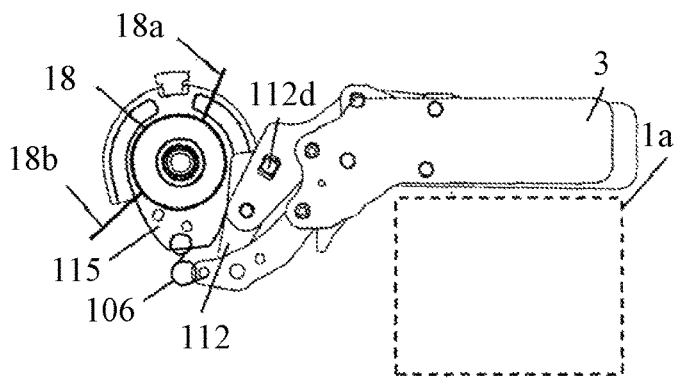

After the cam gear 115 rotates by a predetermined angle from the state of FIGS. 33C and 33D, the state transfers to the state (timing O1) illustrated in FIGS. 34C and 34D. At this time, the first cam engagement pin 112b of the drive member 112 abuts on the first exposure drive cam surface 115g of the cam gear 115, and it decelerates while tracing the first exposure drive cam surface 115g. Therefore, no great impact is applied to the drive member 112 and the second blade unit 3. Further, the first cam engagement pin 112b is induced by the first receiving cam surface 115k of the cam gear 115, and is slidably held by the first free-running drive cam surface 115f and the first holding cam surface 115j. Accordingly, transferring to a half-opened state caused by bounding is avoided.

After the cam gear 114 rotates by a predetermined angle from the state of FIGS. 33A and 33B, the state transfers to the state (timing O2) illustrated in FIGS. 34A and 34B. At this time, the first cam engagement pin 111b of the drive member 111 abuts on the first exposure drive cam surface 114g of the cam gear 114, and it decelerates while tracing the first exposure drive cam surface 114g. Therefore, no great impact is applied to the drive member 111 and the first blade unit 2. Further, the first cam engagement pin 111b is induced by the first receiving cam surface 114k of the cam gear 114, and is slidably held by the first free-running drive cam surface 114f and the first holding cam surface 114j. Accordingly, transferring to a half-opened state caused by bounding is avoided.

After the passage of a predetermined time since the completion of the exposure (at timing P), the image capturing apparatus 400 starts still-image readout scanning of the image sensor 403 since the image sensor 403 is shielded by the second blade unit 3.

As described above, in the odd-numbered photographing, the first exposure drive cam surface 114g of the cam gear 114 drives the first blade unit 2 from the expanded state to the overlapped state via the drive member 111 to move the aperture 1a from the closed state to the open state. After the passage of a predetermined time, the first exposure drive cam surface 115g of the cam gear 115 drives the second blade unit 3 via the drive member 112 from the overlapped state to the expanded state to move the aperture 1a from the open state to the closed state. Thus, the exposure is performed. In the even-numbered photographing, the second exposure drive cam surface 115i of the cam gear 115 drives the second blade unit 3 via the drive member 112 from the expanded state to the overlapped state to move the aperture 1a from the closed state to the open state. After the passage of a predetermined time, the second exposure drive cam surface 114i of the cam gear 114 drives the first blade unit 2 via the drive member 111 from the overlapped state to the expanded state to move the aperture 1a from the open state to the closed state. Thus, the exposure is performed. The drive member 111 traces the first exposure drive cam surface 114g and the second exposure drive cam surface 114i illustrated in the same cam diagram of FIG. 36, and the drive member 112 traces the first exposure drive cam surface 115g and the second exposure drive cam surface 115i. As a result, since the drive speeds of the first blade unit 2 and the second blade unit 3 are equal for the odd-numbered photographing and the even-numbered photographing, a stable reciprocating exposure operation can be performed.

In this embodiment, the cam surfaces are formed on the cam gears 114 and 115, and the cam engagement pins are formed on the drive members 111 and 112, but the present invention is not limited thereto. For example, the cam surfaces may be formed on the drive members 111 and 112, and the cam engagement pins may be formed on the cam gears 114 and 115.

Embodiment 3

Figure 35:
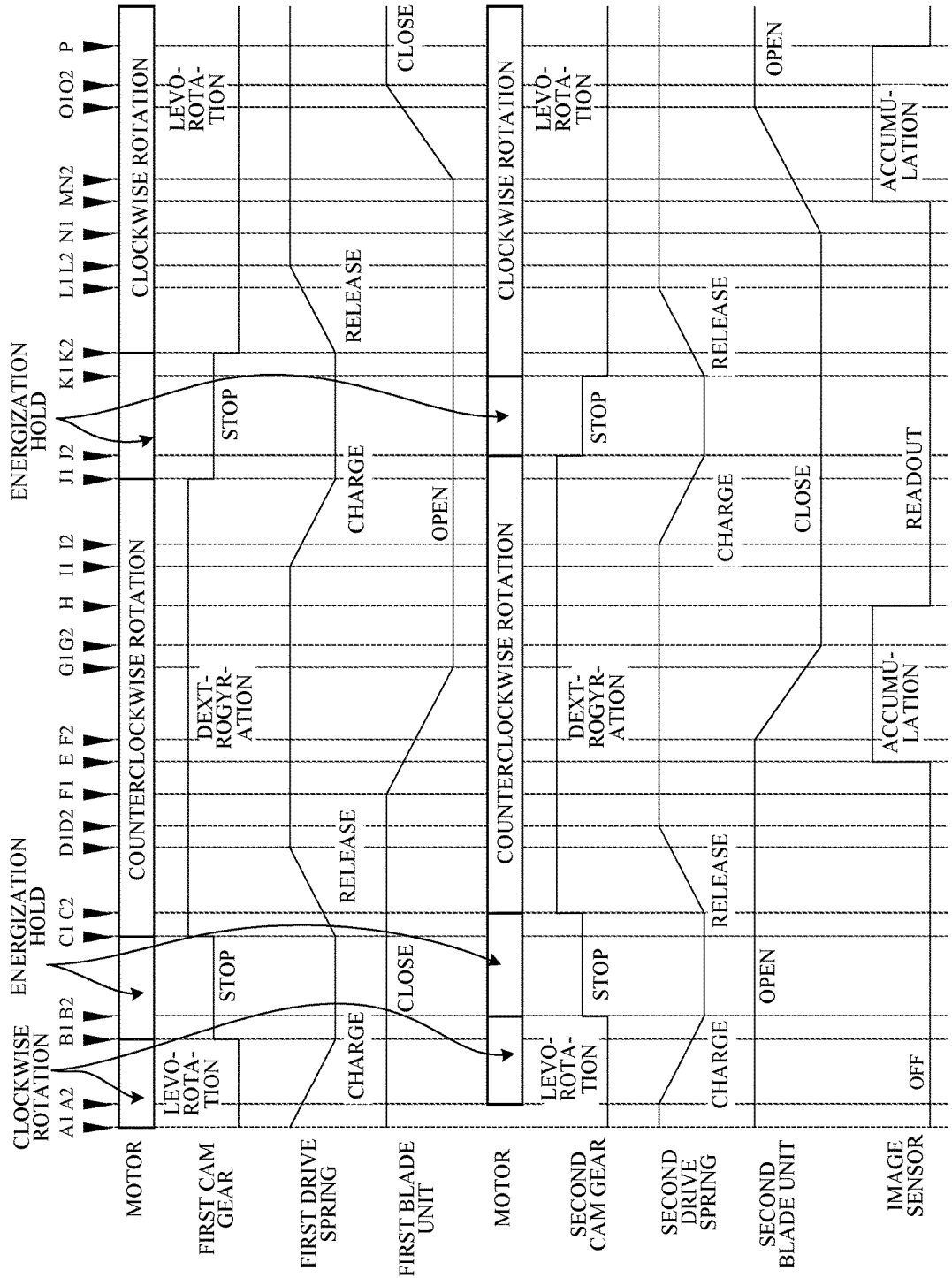
FIG. 35 is a motion timing of the focal plane shutter in Embodiment 3.

Next, referring to FIGS. 27A to 35, the operation of the focal plane shutter 113a in Embodiment 3 of the present invention will be described. FIG. 35 is a timing chart of describing the operation of the focal plane shutter 113a. While FIGS. 27A to 34D are explanatory diagrams of the state of the focal plane shutter 113a at the timing (timings A1 to P) illustrated in FIG. 35, descriptions common to those in the second embodiment will be omitted.

In this embodiment, the focal plane shutter 113a is a shutter device of an electronic front curtain system that performs an electronic front curtain shutter operation. The basic configuration of the focus plane shutter 113a is the same as that described in Embodiment 2 referring to FIGS. 22A and 22B. Further, in this embodiment, the motor 19 is a stepping motor capable of performing a step drive (open-loop drive) where the energization state of the coil is switched to be driven in accordance with a predetermined time interval and two types of feedback drives with different advance angle values.

<Odd-Numbered Photographing>

The photographing standby state, the charged state, the run-up drive, and the completion of the exposure running in the odd-numbered photographing are the same as those in Embodiment 2, respectively, and accordingly their descriptions are omitted.

(Start Driving Blades)

The drive circuit 313 drives the cam gears 114 and 115 in the clockwise direction in a predetermined step (at timings F1 and F2) after timings C1 and C2. The cam gear 114 rotates in the clockwise direction from the state (timing C1) in FIGS. 28A and 28B. At this time, the first cam engagement pin 111b of the drive member 111 moves from the first free-running drive cam surface 114f, which is the concentric circular cam of the cam gear 114, to the first exposure drive cam surface 114g (timing F1). The first cam engagement pin 111b traces the exposure drive cam surface 114g to rotate the drive member 111, and thus the first blade unit 2 moves the aperture 1a from the closed state to the open state.

When the cam gear 114 further rotates in the clockwise direction from the state of FIGS. 29A and 29B, the first cam engagement pin 111b of the drive member 111 is separated from the first exposure drive cam surface 114g of the cam gear 114. Then, due to the inertia force of the drive member 111 and the first blade unit 2 rotating in conjunction with the drive member 111, the drive member 111 rotates in the direction where the first blade unit 2 opens the aperture 1a. At this time, the biasing force of the toggle spring 105 is switched, and the drive member 111 is biased by the biasing force of the toggle spring 105 hooked on the hole 2i of the blade arm 2e in the direction where the first blade unit 2 opens the aperture 1a. Therefore, the rotation speed of the drive member 111 and the first blade unit 2 rotating in conjunction with the drive member 111 does not decrease.

In the period of time from turning on the switch (SW2) 499 to the timing E, the reset state of all pixels of the image sensor 403 is continued. At the timing E after the passage of a predetermined time since the switch (SW2) 499 is turned on, the CPU 409 controls the TG 408 to start the electronic front curtain scanning. Here, the electronic front curtain scanning is to start charge accumulation line by line with respect to the image sensor 403 where all the pixels are in the reset state. Specifically, the vertical scanning circuit 421 sequentially sets the signal tx_* to the low level from the first row to the nth row. As a result, the reset of the PD 441 of each row is sequentially released to be in an accumulation state. Since the scanning pattern for starting the charge accumulation on a line by line basis is a scanning pattern matching the running characteristics of the blades 3a, 3b, and 3c, a uniform accumulation time (exposure time) is obtained in any line of the image sensor 403.

The cam gear 115 rotates in the clockwise direction from the state (timing C2) of FIGS. 28C and 28D. At this time, the first cam engagement pin 112b of the drive member 112 moves from the first free-running drive cam surface 115f, which is the concentric circular cam of the cam gear 115, to the first exposure drive cam surface 115g (timing F2). As a result, the first cam engagement pin 112b traces the exposure driving cam surface 115g to rotate the drive member 112, and thus the second blade unit 3 moves the aperture 1a from the open state to the closed state.

When the cam gear 115 further rotates in the clockwise direction from the state of FIGS. 29C and 29D, the first cam engagement pin 112b of the drive member 112 is separated from the first exposure drive cam surface 115g of the cam gear 115. Then, due to the inertia force of the drive member 112 and the second blade unit 3 rotating in conjunction with the drive member 112, the drive member 112 rotates in the direction where the second blade unit 3 closes the aperture 1a. At this time, the biasing force of the toggle spring 106 is switched, and the drive member 112 is biased by the biasing force of the toggle spring 106 hooked on the hole 3i of the blade arm 3e in the direction where the second blade unit 3 closes the aperture 1a. Therefore, the rotation speed of the drive member 112 and the second blade unit 3 rotating in conjunction with the drive member 112 does not decrease.

The time from the electronic front curtain scanning until the blades 3a, 3b, and 3c shield the image sensor 403 corresponds to the exposure time. The exposure time is controlled by controlling a predetermined time of start of motor energization from the switch (SW2) 499 at the timing C1. In this embodiment, while the electronic front curtain scanning starts after the motor 19 is energized at the timing E, the motor 19 may be energized after the electronic front curtain scanning starts, which depends on the exposure time (for example, when the exposure time is long).

<Even-Numbered Photographing>

The photographing standby state, the charged state, the run-up drive, and the completion of the exposure running in the even-numbered photographing are the same as those in Embodiment 2, respectively, and accordingly their descriptions are omitted.

(Start Driving Blades)

The drive circuit 313 drives the cam gears 114 and 115 in the counterclockwise direction in a predetermined step (at timings N1 and N2) after timings K1 and K2. The cam gear 115 rotates in the counterclockwise direction from the state (timing K1) illustrated in FIGS. 32C and 32D. At this time, the second cam engagement pin 112c of the drive member 112 moves from the second free-running drive cam surface 115h, which is the concentric circular cam of the cam gear 115, to the second exposure drive cam surface 115i (timing N1). Thus, the second cam engagement pin 112c traces the exposure drive cam surface 115i to rotate the drive member 112, and therefore the second blade unit 3 moves the aperture 1a from the closed state to the open state.

When the cam gear 115 further rotates in the counterclockwise direction from the state of FIGS. 33C and 33D, the second cam engagement pin 112c of the drive member 112 is separated from the second exposure drive cam surface 115i of the cam gear 115. Then, due to the inertia force of the drive member 112 and the second blade unit 3 rotating in conjunction with the drive member 112, the drive member 112 rotates in the direction where the second blade unit 3 opens the aperture 1a. At this time, the biasing force of the toggle spring 106 is switched, and the drive member 112 is biased by the biasing force of the toggle spring 106 hooked on the hole 3i of the blade arm 3e in the direction where the second blade unit 3 opens the aperture 1a. Therefore, the rotation speed of the drive member 112 and the second blade unit 3 rotating in conjunction with the drive member 112 does not decrease.

In the period of time from turning on the switch (SW2) 499 to the timing M, the reset state of all pixels of the image sensor 403 is continued. At the timing M after the passage of a predetermined time since the switch (SW2) 499 is turned on, the CPU 409 controls the TG 408 to start the electronic front curtain scanning. Here, the electronic front curtain scanning is to start charge accumulation line by line with respect to the image sensor 403 where all the pixels are in the reset state. Specifically, the vertical scanning circuit 421 sequentially sets the signal tx_* to the low level from the first row to the nth row. As a result, the reset of the PD 441 of each row is sequentially released to be in the accumulation state. Since the scanning pattern for starting the charge accumulation on a line by line basis is a scanning pattern matching the running characteristics of the blades 2a, 2b, and 2c, a uniform accumulation time (exposure time) is obtained in any line of the image sensor 403.

The cam gear 114 rotates in the counterclockwise direction from the state (timing K2) illustrated in FIGS. 32A and 32B. At this time, the second cam engagement pin 111c of the drive member 111 moves from the second free-running drive cam surface 114h, which is the concentric circular cam of the cam gear 114, to the second exposure drive cam surface 114i (timing N2). As a result, the second cam engagement pin 111c traces the exposure driving cam surface 114i to rotate the drive member 111, and thus the first blade unit 2 moves the aperture 1a from the open state to the closed state.

When the cam gear 114 further rotates in the counterclockwise direction from the state of FIGS. 33A and 33B, the second cam engagement pin 111c of the drive member 111 is separated from the second exposure drive cam surface 114i of the cam gear 114. Then, due to the inertia force of the drive member 111 and the first blade unit 2 rotating in conjunction with the drive member 111, the drive member 111 rotates in the direction where the first blade unit 2 closes the aperture 1a. At this time, the biasing force of the toggle spring 105 is switched, and the drive member 111 is biased by the biasing force of the toggle spring 105 hooked on the hole 2i of the blade arm 2e in the direction where the first blade unit 2 closes the aperture 1a. Therefore, the rotation speed of the drive member 111 and the first blade unit 2 rotating in conjunction with the drive member 111 does not decrease.

The time from the electronic front curtain scanning until the blades 2a, 2b, and 2c shield the image sensor 403 corresponds to the exposure time. The exposure time is controlled by controlling a predetermined time of start of motor energization from the switch (SW2) 499 at the timing K1. In this embodiment, while the electronic front curtain scanning starts after the motor 19 is energized at the timing M, the motor 19 may be energized after the electronic front curtain scanning starts, which depends on the exposure time (for example, when the exposure time is long).

As described above, in the odd-numbered photographing, after a predetermined time of the electronic front curtain scanning, the first exposure drive cam surface 115g of the cam gear 115 drives the second blade unit 3 via the drive member 112 from the overlapped state to the expanded state to transfer the aperture 1a from the open state to the closed state to perform the exposure. In the even-numbered photographing, after a predetermined time of the electronic front curtain scanning, the second exposure drive cam surface 114i of the cam gear 114 drives the first blade unit 2 via the drive member 111 from the overlapped state to the expanded state to transfer the aperture 1a from the open state to the closed state to perform the exposure. According to the exposure performed by the electronic front curtain, the exposure time can be controlled without performing the charge operation and the run-up operation before driving the first blade unit 2 for the odd-numbered photographing and the charge operation and the run-up operation before driving the second blade unit 3 for the even-numbered photographing. Therefore, power consumption can be suppressed.

In this embodiment, the cam surfaces are formed on the cam gears 114 and 115, and the cam engagement pins are formed on the drive members 111 and 112, but the present invention is not limited thereto. For example, the cam surfaces may be formed on the drive members 111 and 112, and the cam engagement pins may be formed on the cam gears 114 and 115.

According to each of the embodiments, it is possible to provide a shutter device and an image capturing apparatus that can achieve stable blade running in a forward motion and a backward motion of a cam member.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-020827, filed on Feb. 8, 2017, which is hereby incorporated by reference herein in its entirety.

What is claimed is:

1. A shutter device comprising:
a shutter plate where an opening is formed;
a light shielding member movable reciprocally between a closed state where the opening is closed and an open state where the opening is open;
a motor;
a drive member including a cam engaging portion, rotatable in conjunction with the light shielding member; and
a cam member configured to be driven by the motor to rotate,
wherein the cam member engages with the cam engaging portion, and includes a first cam surface and a second cam surface, the first cam surface driving the drive member to move the light shielding member to the closed state, the second cam surface driving the drive member to move the light shielding member to the open state,
wherein the first cam surface and the second cam surface are formed symmetrically with respect to a straight line extending in a radial direction from a rotation center of the cam member,
wherein the motor is rotatable in a first direction and a second direction, and
wherein the cam member is configured to:
drive the drive member on the first cam surface according to rotation of the motor in the first direction, and
drive the drive member on the second cam surface according to rotation of the motor in the second direction.

2. The shutter device according to claim 1, further comprising a biasing member configured to bias the drive member, wherein the biasing member is configured to:
bias the drive member in a direction where the open state is maintained in the open state, and
bias the drive member in a direction where the closed state is maintained in the closed state.

3. The shutter device according to claim 1, wherein the cam member further includes a third cam surface and a fourth cam surface, the third cam surface slidably holding the drive member to be in the open state, the fourth cam surface slidably holding the drive member to be in the closed state.

4. The shutter device according to claim 3,
wherein when the light shielding member moves from the open state to the closed state, the drive member abuts on the first cam surface and does not abut on the second cam surface, and
wherein when the light shielding member moves from the closed state to the open state, the drive member abuts on the second cam surface and does not abut on the first cam surface.

5. The shutter device according to claim 1,
wherein the cam engaging portion includes a first cam engaging member and a second cam engaging member,
wherein while the first cam engaging member abuts on the first cam surface, the second cam engaging member does not abut on the second cam surface, and
wherein while the second cam engaging member abuts on the second cam surface, the first cam engaging member does not abut on the first cam surface.

6. The shutter device according to claim 5,
wherein after the drive member moves the light shielding member from the open state to the closed state, the second cam engaging member abuts on the second surface, and
wherein after the drive member moves the light shielding member from the closed state to the open state, the first cam engaging member abuts on the first cam surface.

7. The shutter device according to claim 1, wherein the first cam surface and the second cam surface are represented by symmetrical cam diagrams.

8. The shutter device according to claim 1, wherein the shutter device is an electronic front curtain system.

9. An image capturing apparatus comprising:
a shutter device; and
an image sensor configured to photoelectrically convert an optical image formed via an image capturing optical system,
wherein the shutter device includes:
a shutter plate where an opening is formed;
a light shielding member movable reciprocally between a closed state where the opening is closed and an open state where the opening is open;
a motor;
a drive member including a cam engaging portion, rotatable in conjunction with the light shielding member; and
a cam member configured to be driven by the motor to rotate,
wherein the cam member engages with the cam engaging portion, and includes a first cam surface and a second cam surface, the first cam surface driving the drive member to move the light shielding member to the closed state, the second cam surface driving the drive member to move the light shielding member to the open state,
wherein the first cam surface and the second cam surface are formed symmetrically with respect to a straight line extending in a radial direction from a rotation center of the cam member,
wherein the motor is rotatable in a first direction and a second direction, and
wherein the cam member is configured to:
drive the drive member on the first cam surface according to rotation of the motor in the first direction, and
drive the drive member on the second cam surface according to rotation of the motor in the second direction.

* * * * *